United States Patent
Seo et al.

(10) Patent No.: US 10,120,415 B2
(45) Date of Patent: Nov. 6, 2018

(54) FOLDABLE DEVICE

(71) Applicant: SAMSUNG ELECTRONICS CO., LTD., Suwon-si (KR)

(72) Inventors: Ho-seong Seo, Suwon-si (KR); Kyung-wan Park, Suwon-si (KR); Ga-eun Lee, Suwon-si (KR); Ji-hyun Jung, Yongin-si (KR); Shi-yun Cho, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/676,234

(22) Filed: Aug. 14, 2017

(65) Prior Publication Data

US 2017/0364123 A1    Dec. 21, 2017

Related U.S. Application Data

(62) Division of application No. 14/627,694, filed on Feb. 20, 2015, now Pat. No. 9,798,359.

(30) Foreign Application Priority Data

Feb. 21, 2014  (KR) ........................ 10-2014-0020749
Sep. 23, 2014  (KR) ........................ 10-2014-0127191

(51) Int. Cl.
   *G06F 1/16*         (2006.01)
(52) U.S. Cl.
   CPC .......... *G06F 1/1652* (2013.01); *G06F 1/1681* (2013.01)

(58) Field of Classification Search
   CPC . H04M 1/0216; H04M 1/0268; G06F 1/1652; G06F 1/1681
   See application file for complete search history.

(56) References Cited

U.S. PATENT DOCUMENTS

| | | | |
|---|---|---|---|
| 7,990,513 | B2 | 8/2011 | Belyaev |
| 8,248,764 | B2 | 8/2012 | Hassemer et al. |
| 8,711,566 | B2 | 4/2014 | O'Brien |
| 8,804,324 | B2 * | 8/2014 | Bohn ................. G06F 1/1616 345/1.1 |
| 8,867,200 | B2 | 10/2014 | Suzuki et al. |

(Continued)

FOREIGN PATENT DOCUMENTS

| | | |
|---|---|---|
| CN | 1744803 A | 3/2006 |
| CN | 101480023 A | 7/2009 |

(Continued)

OTHER PUBLICATIONS

Communication dated Aug. 21, 2017 by the European Patent Office in counterpart European Application No. 15752893.6.

(Continued)

*Primary Examiner* — Anthony Q Edwards
(74) *Attorney, Agent, or Firm* — Sughrue Mion, PLLC

(57) ABSTRACT

A foldable device includes first and second bodies that respectively support a first part and a second part of a flexible display device and are foldably connected to each other between a folded position and an unfolded position, and a movable support member that continuously near-supports a third part of the flexible display device between the first part and the second part when the first body and the second body change from the folded position to the unfolded position.

10 Claims, 41 Drawing Sheets

(56) References Cited

U.S. PATENT DOCUMENTS

| | | | |
|---|---|---|---|
| 9,235,239 B2 | 1/2016 | van Dijk et al. | |
| 2006/0050169 A1 | 3/2006 | Misawa | |
| 2006/0146488 A1 | 7/2006 | Kimmel | |
| 2007/0117600 A1* | 5/2007 | Robertson, Jr. | H04M 1/0216 455/575.3 |
| 2007/0222935 A1 | 9/2007 | Belyaev | |
| 2007/0297125 A1 | 12/2007 | Maatta | |
| 2012/0002360 A1 | 1/2012 | Seo et al. | |
| 2012/0307423 A1* | 12/2012 | Bohn | G06F 1/1641 361/679.01 |
| 2012/0314399 A1 | 12/2012 | Bohn et al. | |
| 2013/0010405 A1 | 1/2013 | Rothkopf et al. | |
| 2013/0021762 A1* | 1/2013 | van Dijk | G06F 1/1652 361/749 |
| 2013/0037228 A1 | 2/2013 | Verschoor et al. | |
| 2013/0222998 A1 | 8/2013 | Cho et al. | |
| 2013/0342090 A1 | 12/2013 | Ahn et al. | |
| 2013/0342094 A1 | 12/2013 | Walters et al. | |
| 2014/0042293 A1* | 2/2014 | Mok | G06F 1/1652 248/682 |
| 2014/0126121 A1* | 5/2014 | Griffin | H04M 1/0216 361/679.01 |
| 2014/0226275 A1* | 8/2014 | Ko | G06F 1/1626 361/679.27 |
| 2015/0022436 A1 | 1/2015 | Cho et al. | |
| 2015/0077917 A1* | 3/2015 | Song | G06F 1/1652 361/679.27 |
| 2015/0176317 A1* | 6/2015 | Lee | E05D 3/06 16/251 |
| 2016/0143162 A1 | 5/2016 | Van Dijk et al. | |
| 2016/0334836 A1 | 11/2016 | Hong et al. | |

FOREIGN PATENT DOCUMENTS

| | | |
|---|---|---|
| CN | 201733537 U | 2/2011 |
| CN | 103034293 A | 4/2013 |
| EP | 1 635 313 A2 | 3/2006 |
| KR | 10-0867608 B1 | 11/2008 |
| KR | 10-2011-0100936 A | 9/2011 |
| KR | 10-2013-0073331 A | 7/2013 |
| KR | 10-1346146 B1 | 12/2013 |
| KR | 10-2014-0001376 A | 1/2014 |
| RU | 2 318 230 C2 | 2/2008 |

OTHER PUBLICATIONS

Communication dated Sep. 20, 2017 by the State Intellectual Property Office of China in counterpart Chinese Application No. 201580003222.1.

Communication dated Nov. 21, 2017 by the Korean Intellectual Property Office in counterpart Korean Patent Application No. 10-2017-0047180.

Communication dated Apr. 23, 2015 issued by the International Searching Authority in counterpart International Application No. PCT/KR2015/000773 (PCT/ISA/210/220/237).

Communication dated Jul. 31, 2016, issued by the Korean Intellectual Property Office in corresponding Korean Application No. 10-2014-0127191.

Communication dated Jul. 31, 2016, issued by the Korean Intellectual Property Office in corresponding Korean Application No. 10-2016-0029865.

Communication dated May 11, 2018, issued by the European Patent Office in counterpart European Application No. 15752893.6.

Communication dated Jul. 9, 2018, issued by the Korean Intellectual Property Office in counterpart Korean Application No. 10-2018-0057446.

Communication dated Jul. 18, 2018, issued by the Russian Patent Office in counterpart Russian Application No. 2016137482.

* cited by examiner

FOLDABLE DEVICE

CROSS-REFERENCE TO RELATED APPLICATIONS

This application is a Divisional application of U.S. application Ser. No. 14/627,694, filed Feb. 20, 2015, in the U.S. Patent and Trademark Office, which claims priority from Korean Patent Application No. 10-2014-0127191, filed on Sep. 23, 2014 in the Korean Intellectual Property Office, and Korean Patent Application No. 10-2014-0020749, filed on Feb. 21, 2014 in the Korean Intellectual Property Office, the disclosures of which are incorporated herein in their entireties by reference.

BACKGROUND

1. Field

Apparatuses and methods consistent with exemplary embodiments relate to a foldable device including a flexible display device.

2. Description of the Related Art

A portable foldable device (hereinafter, referred to as a mobile device) such as a communication terminal, a game player, a multimedia device, a portable computer, a personal digital assistant, a photographing apparatus, etc., includes a display device that displays image information and an input unit such as a keypad. Many mobile devices include a foldable structure that may fold into a smaller size in order to improve portability. In such mobile devices, two bodies are connected to each other by using the foldable structure. Since a related art display device may not fold, the related art display device may be disposed on one of the two bodies. Hence, it is difficult to apply a large display device to a mobile device including a foldable structure.

As a flexible display device that may be bent develops, attempts have been made to apply the flexible display device to a mobile device including a foldable structure. In this case, since the flexible display device may be disposed over two bodies to cross the foldable structure, a large screen may be provided. However, although the flexible display device may be bent, if the flexible display device is sharply bent, the flexible display device itself may be damaged. Hence, a curved portion having a predetermined curvature is formed at the center of the flexible display device when the flexible display device folds. When the flexible display device folds for a long time and then unfolds, the curved portion may not be spread flat.

SUMMARY

Aspects of one or more exemplary embodiments provide a foldable device including a flexible display device that may be spread flat in an unfolded state.

Aspects of one or more exemplary embodiments include a foldable device that may be maintained at a predetermined unfolding angle.

Additional aspects will be set forth in part in the description which follows and, in part, will be apparent from the description, or may be learned by practice of exemplary embodiments.

According to an aspect of an exemplary embodiment, there is provided a foldable device including: a flexible display device including a first part, a second part, and a third part between the first part and the second part; a first body and a second body that respectively support the first part and the second part and are foldably connected to each other between a folded position and an unfolded position; and a movable support member configured to continuously support the third part when the first body and the second body change from the folded position to the unfolded position.

When the first body and the second body change between the unfolded position and the folded position, the movable support member may be configured to move between a support position that supports the third part of the flexible display device and a retreat position that retreats from the support position in order to receive a curved portion formed in the third part.

The first body and the second body may respectively include a first support and a second support that respectively support the first part and the second part of the flexible display device, and a first receiver and a second receiver that respectively retreat from the first support and the second support.

When the movable support member is located at the retreat position, the third part may be received in a receiving space defined by the first receiver, the second receiver, and the movable support member.

The movable support member may include slots that extend in a folding/unfolding direction of the first body and the second body; a pair of guide portions that are insertable into the slots may be provided on the first body and the second body to face each other; and when the first body and the second body move between the folded position and the unfolded position, the pair of guide portions may slide in the slots so that the movable support member moves between the support position and the retreat position.

The first body and the second body may respectively include a first support and a second support that respectively support the first part and the second part of the flexible display device, and a first receiver and a second receiver that are respectively provided in the first support and the second support to move between a first position that supports the third part of the flexible display device and a second position that receives the curved portion.

The first receiver and the second receiver may be configured to move between the first position and the second position as the movable support member moves between the support position and the retreat position.

The foldable device may further include a first pivot lever and a second pivot lever having first ends that are pivotably connected to the movable support member and second ends that are connected to the first receiver and the second receiver, wherein the first pivot lever and the second pivot lever may move the first receiver and the second receiver to the first position when the movable support member moves to the support position, and allow the first receiver and the second receiver to be pushed by the flexible display device to move to the second position when the movable support member moves to the retreat position.

The foldable device may further include stoppers that, when the first receiver and the second receiver reach the first position, support the first pivot lever and the second pivot lever so that the first receiver and the second receiver are not separated from the flexible display device.

The foldable device may further include an elastic unit configured to apply a tensile force to the flexible display device at the unfolded position.

The elastic unit may be configured to apply an elastic force to the first body and the second body so that the first body and the second body unfold at the unfolded position.

The elastic unit may apply the elastic force to the first body and the second body so that the first body and the second body are maintained at the unfolded position.

The elastic unit may include: a facing arm provided on the second body and including a facing portion; and an elastic arm provided on the first body, configured to contact the facing arm to be elastically deformed when the first body and the second body change between the folded position and the unfolded position, and including a first contact portion that may be configured to elastically contact the facing portion at the unfolded position.

The elastic arm may further include a second contact portion that is inclined with respect to the first contact portion; and the second contact potion may be configured to elastically contact the facing portion at a predetermined unfolding angle between the folded position and the unfolded position.

The first contact portion and the second contact portion have planar shapes, and the facing portion may have a planar shape and may surface-contact the first contact portion and the second contact portion.

The elastic arm may include a boundary portion that projects most, from the elastic arm, toward the second body; and the first contact portion and the second contact portion may have curved shapes and may be distinguished from each other by the boundary portion.

The first body and the second body may respectively include a first base cover and a second base cover that define an outer appearance, and a first frame and a second frame that are respectively disposed in the first base cover and the second base cover and respectively support the first part and the second part of the flexible display device; and the elastic arm may be integrally formed with the first frame and the facing arm may be integrally formed with the second frame.

The elastic arm may have a leaf spring shape and may be coupled to the first body.

The facing arm may contact the elastic arm to be elastically deformed when the first body and the second body change between the folded position and the unfolded position.

The facing arm may have a leaf spring shape and may be coupled to the second body.

The foldable device may further include: a magnetic member in the first body; and an attachment member in the second body, wherein the magnetic member and the attachment member may be configured to attach to each other due to a magnetic force when the first body and the second body are in the folded position.

The magnetic member may include a permanent magnet and a magnetic shielding member that surrounds surfaces of the permanent magnet other than a surface that faces the attachment member.

The foldable device may further include a cover member that covers adjacent edges of the first body and the second body.

At least one of the first part and the second part of the flexible display device may be supported on at least one of the first body and the second body to move in a longitudinal direction.

The first body and the second body may be configured to pivot about a first central axis and a second central axis that are spaced apart from each other and are foldably connected to each other between the folded position and the unfolded position.

The foldable device may further include a first gear and a second gear that engage with each other are respectively provided along the first central axis and the second central axis.

According to an aspect of another exemplary embodiment, there is provided a foldable device including: a flexible display device including a first part, a second part, and a third part between the first part and the second part; a first body and a second body that respectively support the first part and the second part and are foldably connected to each other between a folded position and an unfolded position; and an elastic unit configured to apply a tensile force to the flexible display device at the unfolded position.

The foldable device may further include a first gear and a second gear that engage with each other and are respectively provided along a first central axis and a second central axis, wherein the first body and the second body may synchronously pivot about the first central axis and the second central axis, and wherein the first central axis and the second central axis may be spaced apart from each other.

The foldable device may further include a movable support member configured to continuously supports the third part when the first body and the second body change from the folded position to the unfolded position.

As the first body and the second body change between the folded and to the unfolded position, the movable support member may be configured to move between a support position that supports the third part of the flexible display device and a retreat position that retreats from the support position in order to receive a curved portion formed in the third part.

The movable support member may include slots that extend in a folding/unfolding direction of the first body and the second body; a pair of guide portions that are insertable into the slots may be provided on the first body and the second body to face each other; and when the first body and the second body move between the folded position and the unfolded position, the pair of guide portions may slide in the slots so that the movable support member moves between the support position and the retreat position.

The elastic unit may be configured to apply an elastic force to the first body and the second body so that the first body and the second body unfold at the unfolded position.

When the first body and the second body change between the unfolded position and the folded position, a direction of the elastic force may change from a direction obstructing position change of the first body and the second body to a direction allowing position change of the first body and the second body.

The elastic unit may include: a facing arm provided on the second body and including a facing portion; and an elastic arm on the first body, configured to contact the facing arm to be elastically deformed when the first body and the second body change between the folded position and the unfolded position, and including a first contact portion that may be configured to elastically contact the facing portion at the unfolded position and a second contact portion that is inclined with respect to the first contact portion and elastically contacts the facing portion at a predetermined unfolding angle between the folded position and the unfolded position.

The first contact portion and the second contact portion may have planar shapes; and the facing portion may have a planar shape and may surface-contact the first contact portion and the second contact portion.

The elastic arm further may include a boundary portion that projects most, from the elastic arm, toward the second body; and the first contact portion and the second contact portion may have curved shapes and may be distinguished from each other by the boundary portion.

The elastic arm may have a leaf spring shape and may be coupled to the first body.

The facing arm may have a leaf spring shape, and may be configured to contact the elastic arm to be elastically deformed when the first body and the second body change between the folded position and the unfolded position.

According to an aspect of another exemplary embodiment, there is provided a foldable device including: a flexible display device including a first part, a second part, and a third part between the first part and the second part; a body including a first body and a second body that respectively support the first part and the second part and are foldably connected to each other between a folded position and an unfolded position; a hinge between the first body and the second body foldably connecting the first body and the second body; and a flexible guide member on the body and crossing the hinge, and configured to elastically bend to reduce a stress applied to the flexible display device when the first body and the second body change from the folded position to the unfolded position.

The flexible guide member may be between neutral surfaces of the flexible display device and the hinge.

The hinge may be connected to at least one of the first body and the second body to move relative to the at least one of the first body and the second body; and the flexible guide member may be connected to at least one of the first body and the second body to move relative to the at least one of the first body and the second body.

The flexible guide member and the hinge may be connected to the body to satisfy $\Delta L2/\Delta L3 = C2$, where C2 is a constant and $\Delta L2$ and $\Delta L3$ are respectively amounts of movement of the flexible guide member and the hinge relative to the body when the first body and the second body change from the folded position to the unfolded position.

The flexible guide member and the hinge may be connected to the body to satisfy $d23 = d13 - d12 = C1$, where C1 is a constant, C2 is a constant, NS1 is a neutral surface of the flexible display device, NS2 is a neutral surface of the flexible guide member, NS3 is a neutral surface of the hinge, and d12, d23, and d13 are respectively distances between the neutral surface NS1 and the neutral surface NS2, between the neutral surface NS2 and the neutral surface NS3, and between the neutral surface NS1 and the neutral surface NS3.

The foldable device may further include a movement amount controller configured to connect the hinge and the flexible guide member to the body so that a ratio of an amount of movement of the hinge and an amount of movement of the flexible guide member relative to the body is constant.

The movement amount controller may include: a first lever that pivots about a shaft provided on the hinge and may include a first post, a first slot in the body and into which the first post is inserted, a second lever coupled to the first post, pivots along with the first lever, and may include a second post, and a second slot in the flexible guide member and into which the second post is inserted, wherein a distance between the shaft and the first post may be greater than a distance between the first post and the second post.

The movement amount controller may be configured to satisfy $d12/d13 = RA2/RA1$, where a distance between the shaft and the first post is RA1, a distance between the first post and the second post is RA2, a distance between the neutral surface of the flexible display device and the neutral surface of the flexible guide member is d12, and a distance between the neutral surface of the flexible display device and the neutral surface of the hinge is d13.

The hinge may be connected to the first body and the second body to move relative to the first body and the second body, and the flexible guide member may be connected to the first body and the second body to move relative to the first body and the second body.

The hinge may be connected to the first body and the second body to move relative to the first body and the second body.

The hinge may be configured to move in a symmetric matter relative to the first body and the second body.

The hinge may include a first connection portion and a second connection portion that are respectively connected to the first body and the second body; the flexible guide member may include a first guide member and a second guide member that are spaced apart from each other in a width direction perpendicular to a folding/unfolding direction; an end portion of the first guide member may be fixed to the first body and another end portion of the first guide member may be connected to the second connection portion to move relative to the second body along with the hinge; and an end portion of the second guide member may be fixed to the second body and another end portion of the second guide member may be connected to the first connection portion to move relative to the first body along with the hinge.

The flexible guide member may be configured to satisfy $d12 = d23$, where a distance between a neutral surface of the flexible display device and a neutral surface of the first guide member and the second guide member is d12, and a distance between the neutral surface of the first guide member and the second guide member and a neutral surface of the hinge is d23.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
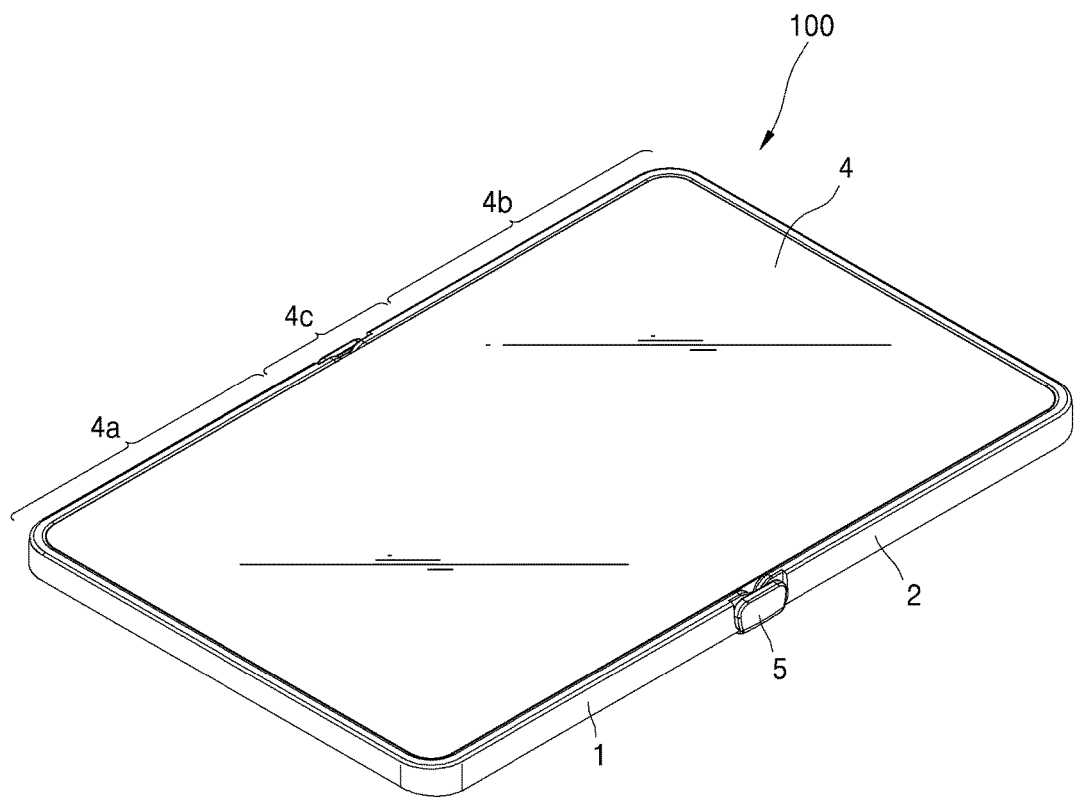
FIG. 1 is a perspective view illustrating an outer appearance of a foldable device according to an exemplary embodiment.

Reference will now be made in detail to exemplary embodiments, examples of which are illustrated in the accompanying drawings, wherein like reference numerals denote like elements throughout and sizes or thicknesses of elements may be exaggerated for clarity.

As used herein, the term "and/or" includes any and all combinations of one or more of the associated listed items. Expressions such as "at least one of," when preceding a list of elements, modify the entire list of elements and do not modify the individual elements of the list.

<First Exemplary Embodiment>

Figure 2:
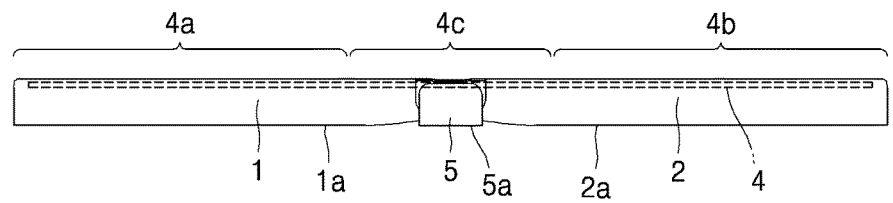
FIG. 2 is a side view illustrating a state where the foldable device of FIG. 1 unfolds, according to an exemplary embodiment.
Figure 3:
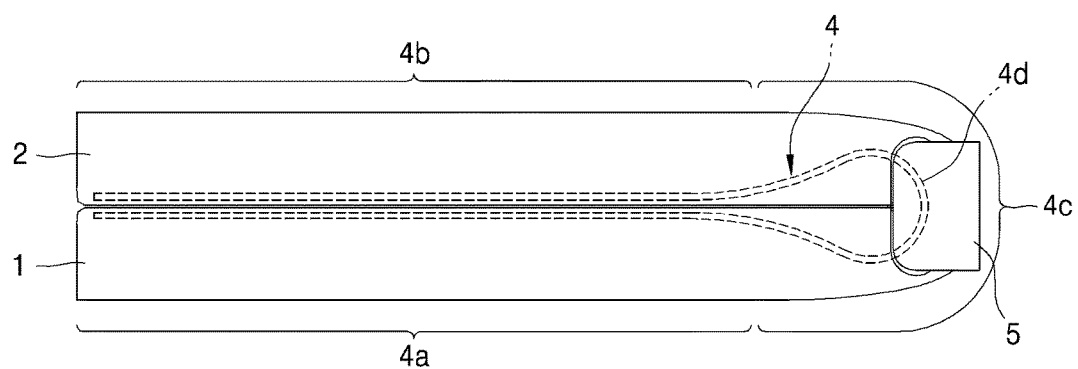
FIG. 3 is a side view illustrating a state where the foldable device of FIG. 1 folds, according to an exemplary embodiment.

FIG. 1 is a perspective view illustrating an outer appearance of a foldable device 100 according to an exemplary embodiment. FIG. 2 is a side view illustrating a state where the foldable device 100 of FIG. 1 unfolds, according to an exemplary embodiment. FIG. 3 is a side view illustrating a state where the foldable device 100 of FIG. 1 folds, according to an exemplary embodiment.

Referring to FIGS. 1 through 3, the foldable device 100 includes a first body 1, a second body 2, and a flexible display device 4. The first body 1 and the second body 2 are connected to each other to change between an unfolded position (or flat position or open position) of FIG. 2 and a folded position of FIG. 3.

The flexible display device 4 is supported by the first body 1 and the second body 2. The flexible display device 4 may be divided into a first part 4a that is supported by the first body 1, a second part 4b that is supported by the second body 2, and a third part 4c between the first body 1 and the second body 2. For example, the flexible display device 4 may be adhered to the first body 1 and the second body 2 by using an adhesive unit such as an adhesive or a double-sided tape. The third part 4c of the flexible display device 4 may not be supported by the first body 1 or the second body 2. That is, the third part 4c is not adhered to the first body 1 and the second body 2. When the first body 1 and the second body 2 are in the folded position of FIG. 3, the third part 4c forms a curved portion 4d having a predetermined radius of curvature. Accordingly, since the flexible display device 4 may not be sharply bent and the third part 4c is bent by forming the curved portion 4d or is spread, the first body 1 and the second body 2 may change between the folded position and the unfolded position.

The foldable device 100 may be a portable mobile device such as a communication terminal, a game player, a multimedia device, a portable computer, a persona digital assistance, a photographing apparatus, etc. However, it is understood that one or more other exemplary embodiments are not limited thereto, and the foldable device 100 may be any device including the first body 1 that supports the first part 4a of the flexible display device 4 and the second body 2 that supports the second part 4b of the flexible display device 4 and is foldably connected to the first body 1.

Figure 4:
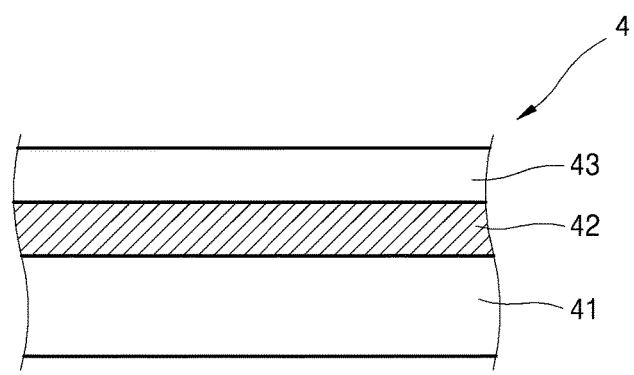
FIG. 4 is a cross-sectional view illustrating a flexible display device according to an exemplary embodiment.

FIG. 4 is a cross-sectional view illustrating the flexible display device 4 according to an exemplary embodiment. Referring to FIG. 4, the flexible display device 4 may include a flexible display panel 41 that displays an image and a transparent protective panel 43 that is disposed outside the flexible display panel 41. The flexible display panel 41 may be, for example, an organic light-emitting diode (OLED) panel. When the flexible display panel 41 is an OLED panel, an organic emission layer may be disposed between an upper substrate and a lower substrate. A polarization plate may be disposed on the upper substrate from which light is emitted. Also, the flexible display device 4 may further include a touch panel 42 as an input unit (e.g., inputter or input device). The touch panel 42 may be disposed between the transparent protective panel 43 and the flexible display panel 41. The flexible display panel 41, the touch panel 42, and the transparent protective panel 43 may be adhered to one another by using an optically-clear adhesive (OCA) layer. However, it is understood that one or more other exemplary embodiments are not limited thereto, and the flexible display device 4 may further include any of various other optical panels or optical films.

A processing unit (e.g., processor) and an input/output unit (e.g., input/output device) for performing operations according to the use of the foldable device 100 may be provided on the first body 1 and the second body 2. When the foldable device 100 is a multimedia terminal that provides images and music to a user, the processing unit may include an image/audio information processing unit (e.g., image/audio information processor). When the foldable device 100 is a communication terminal, the processing unit may include a communication module (e.g., communicator). The input/output unit may include an image/audio input/output unit (e.g., image/audio input/output device) and a manipulation unit (e.g., manipulator or manipulation device) for user manipulation. The manipulation unit may be realized by using the touch panel 42 of the flexible display device 4.

Figure 5:
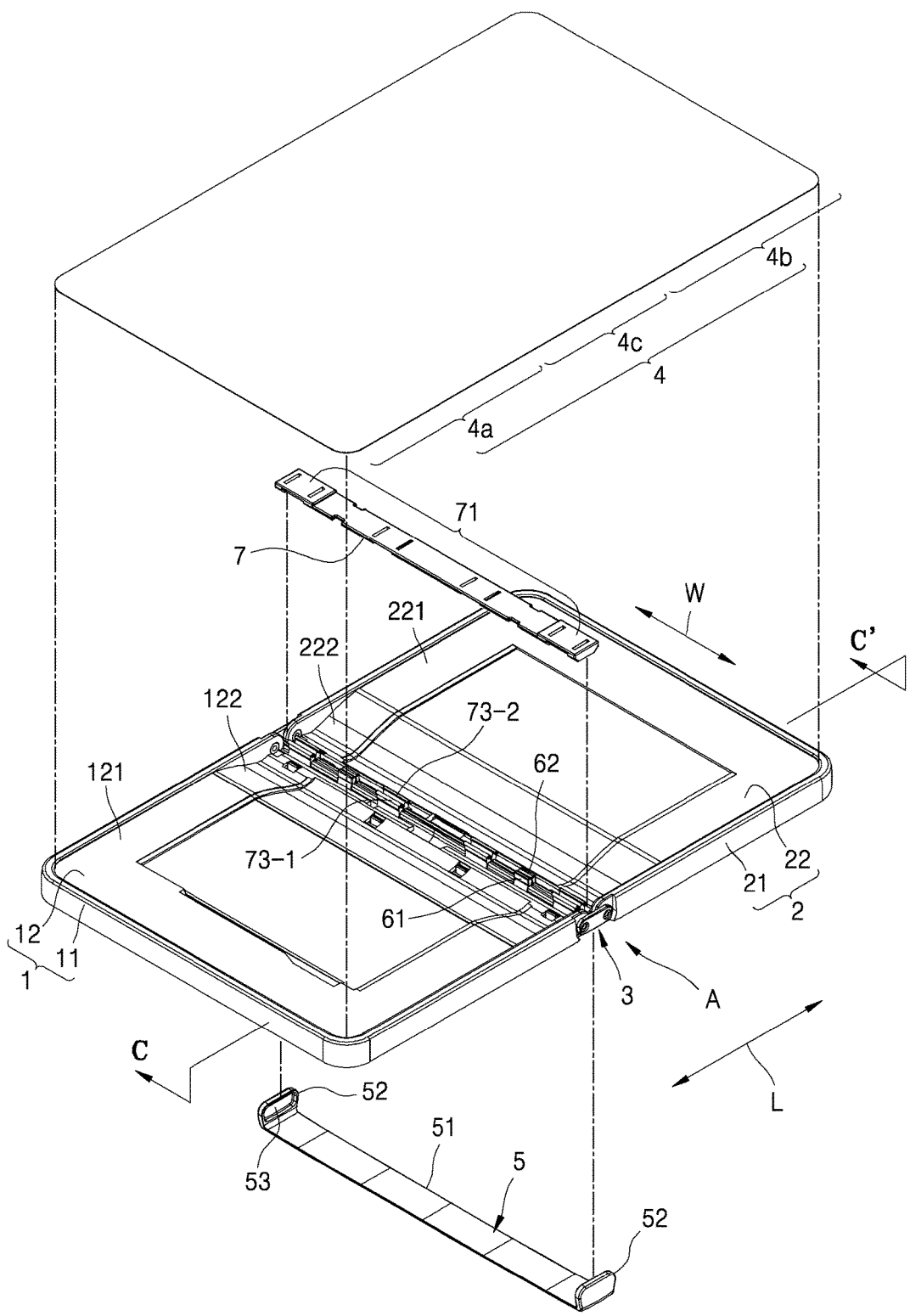
FIG. 5 is an exploded perspective view illustrating the foldable device of FIG. 1, according to an exemplary embodiment.
Figure 6:
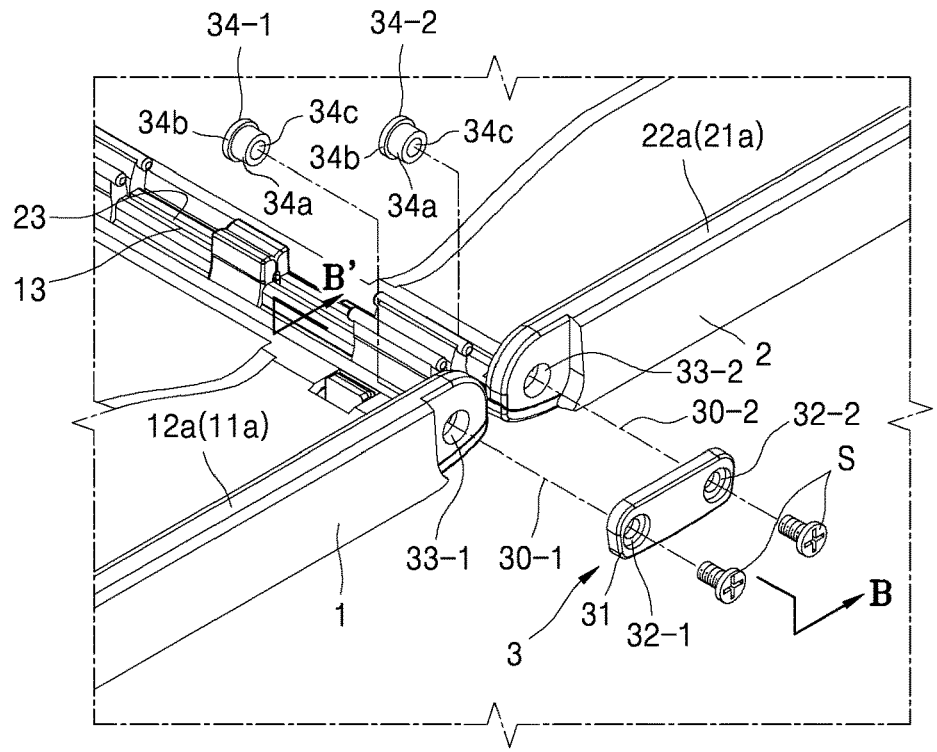
FIG. 6 is a detailed perspective view illustrating a portion "A" of FIG. 5, according to an exemplary embodiment.
Figure 7:
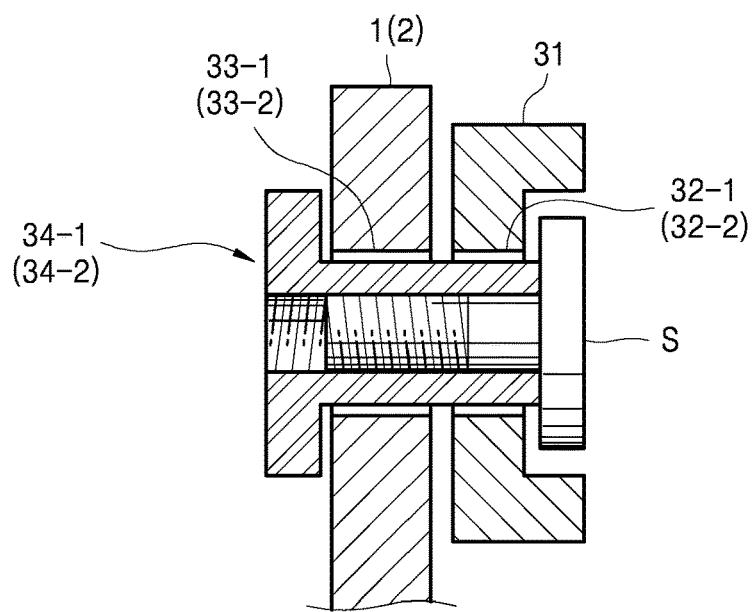
FIG. 7 is a cross-sectional view taken along line B-B' of FIG. 6, according to an exemplary embodiment.

FIG. 5 is an exploded perspective view illustrating the foldable device 100 of FIG. 1, according to an exemplary embodiment. FIG. 6 is a detailed perspective view illustrating a portion "A" of FIG. 5, according to an exemplary embodiment. FIG. 7 is a cross-sectional view taken along line B-B' of FIG. 6, according to an exemplary embodiment.

Referring to FIG. 5, the first body 1 includes a first base cover 11 and a first frame 12. The first base cover 11 defines an outer appearance of the first body 1. The first frame 12 is received or accommodated in the first base cover 11. The first frame 12 includes a first support 121 that supports the first part 4a of the flexible display device 4 and a first receiver 122 that is inclined downward from the first support 121. The first receiver 122 corresponds to the third part 4c of the flexible display device 4. The second body 2 includes a second base cover 21 and a second frame 22. The second base cover 21 defines an outer appearance of the second body 2. The second frame 22 is received or accommodated in the second base cover 21. The second frame 22 includes a second support 221 that supports the second part 4b of the flexible display device 4 and a second receiver 222 that is inclined downward from the second support 221. The second receiver 222 corresponds to the third part 4c of the flexible display device 4.

The first receiver 122 and the second receiver 222 face each other when the first body 1 and the second body 2 are in the folded position of FIG. 3, to form a receiving space in which the curved portion 4d is received. To this end, the first receiver 122 and the second receiver 222 are respectively inclined downward from the first support 121 and the second support 221 to be far from the third part 4c of the flexible display device 4. When the first body 1 and the second body 2 begin to change from the unfolded position to the folded position, the third part 4c of the flexible display device 4 tends to be slightly bent downward. Since the first receiver 122 and the second receiver 222 are inclined downward from the first support 121 and the second support 221, the third part 4c of the flexible display device 4 may be naturally bent downward. Accordingly, a stress applied to the flexible display device 4 when the first body 1 and the second body 2 change from the unfolded position to the folded position may be reduced and the risk of damage to the flexible display device 4 may be reduced. If the first support 121 and the second support 221 extend to the first receiver 122 and the second receiver 222, the third part 4c of the flexible display device 4 may be bent upward, instead of downward, thereby increasing the risk of damage to the third part 4c of the flexible display device 4.

Referring to FIGS. 5 and 6, a hinge unit 3 (e.g., hinge) foldably connects the first body 1 and the second body 2. In the foldable device 100 of the present exemplary embodiment, the first body 1 and the second body 2 respectively pivot about two central axes 30-1 and 30-2 that are spaced apart from each other. The hinge unit 3 may include a connection bracket 31 in which one pair of first connection holes 32-1 and 32-2 are formed, and one pair of hinge members 34-1 and 34-2 that pass through second connection holes 33-1 and 33-2 respectively formed in the first body 1 and the second body 2 and are inserted into the one pair of first connection holes 32-1 and 32-2. The second connection holes 33-1 and 33-2 may be respectively formed in both side walls 12a and 22a of the first frame 12 and the second frames 22 or both side walls 11a and 21a of the first base cover 11 and the second base cover 21.

Referring to FIG. 7, each of the hinge members 34-1 and 34-2 includes an insertion portion 34a that has a cylindrical shape and is inserted into each of the second connection holes 33-1 and 33-2 and each of the first connection holes 32-1 and 32-2, and a step portion 34b that has a greater outer diameter than that of the insertion portion 34a. The insertion portions 34a provide the central axes 30-1 and 30-2 about which the first body 1 and the second body 2 pivot. The step portions 34b are supported in the first body 1 and the second body 2. Screw holes 34c are axially formed in the insertion portions 34a, respectively. In a state where the insertion portions 34a of the hinge members 34-1 and 34-2 pass through the second connection holes 33-1 and 33-2 and are inserted into the first connection holes 32-1 and 32-2, screws S are inserted into the screw holes 34c from the opposite side of the step portion 34b. Accordingly, the first body 1 and the second body 2 may be coupled to the connection bracket 31 so that the first body 1 and the second body 2 may pivot about the insertion portions 34a of the hinge members 34-1 and 34-2. In this configuration, the first body 1 and the second body 2 may be connected to each other to change between the unfolded position of FIG. 2 and the folded position of FIG. 3.

Referring back to FIGS. 5 and 6, a cover member 5 surrounds a connecting portion between the first body 1 and the second body 2 to prevent the inside of the foldable device 100 from being exposed to the outside. For example, the cover member 5 may include an extending portion 51 that extends along facing edges 13 and 23 of the first body 1 and the second body 2 and side walls 52 that are located on both ends of the extending portion 51. Recesses 53 that are sunken from inner surfaces of the side walls 52 are formed (e.g., provided) in the inner surfaces of the side walls 52. The recesses 53 are shaped so that the connection bracket 31 may be inserted into each of the recesses 53. The cover member 5 may be coupled to the first body 1 and the second body 2 by slightly widening outward the side walls 52 and inserting the connection bracket 31 into the recesses 53. When the first body 1 and the second body 2 are in the folded position, the facing edges 13 and 23 of the first body 1 and the second body 2 may be spaced apart from each other, and the inside of the foldable device 100 may be exposed through a space between the facing edges 13 and 23 that are spaced apart from each other. The cover member 5 covers the space between the facing edges 13 and 23 in order to prevent the inside of the foldable device 100 from being exposed. Accordingly, the outer appearance of the foldable device 100 may be improved (e.g., aesthetically improved).

Referring back to FIG. 2, when the first body 1 and the second body 2 unfold, a bottom surface 5a of the cover member 5 does not project beyond bottom surfaces 1a and 2a of the first body 1 and the second body 2. That is, the bottom surface 5a of the cover member 5 is more inwardly curved than the bottom surfaces 1a and 2a of the first body 1 and the second body 2. If the bottom surface 5a of the cover member 5 projects beyond the bottom surfaces 1a and 2a of the first body 1 and the second body 2, the foldable device 100 may unstably move like a seesaw by using the bottom surface 5a of the cover member 5 as a support point. In the configuration of FIG. 2, when the first body 1 and the second body 2 unfold, the bottom surfaces 1a and 2a of the first body 1 and the second body 2 may be simultaneously stably supported on, for example, a table.

Referring to FIG. 3, thicknesses of connecting portions of the first body 1 and the second body 2 that are close to the hinge unit 3 are less than those of the opposite portions. That is, thicknesses of the first body 1 and the second body 2 decrease toward the hinge unit 3. In this configuration, a structure in which the bottom surface 5a of the cover member 5 does not project beyond the bottom surfaces 1a and 2a of the first body 1 and the second body 2 may be easily formed (e.g., provided).

Figure 8A:
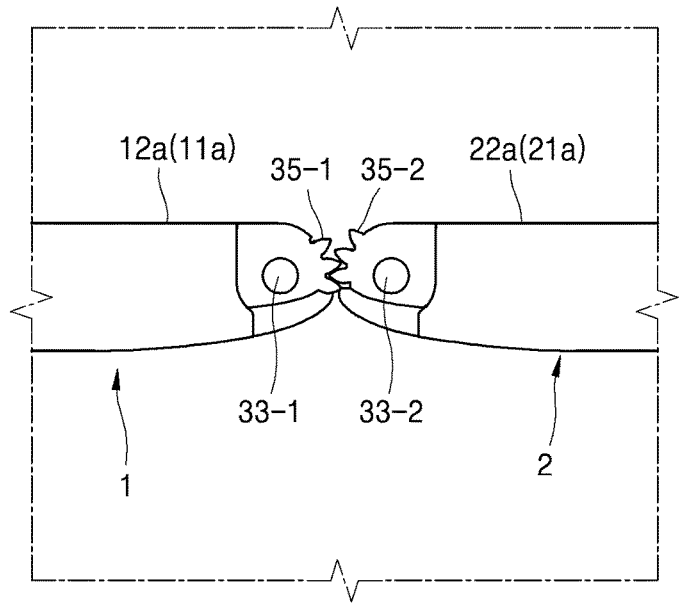
FIG. 8A is a side view illustrating a gear connection structure that is a modification of a structure for foldably connecting first and second bodies.
Figure 8B:
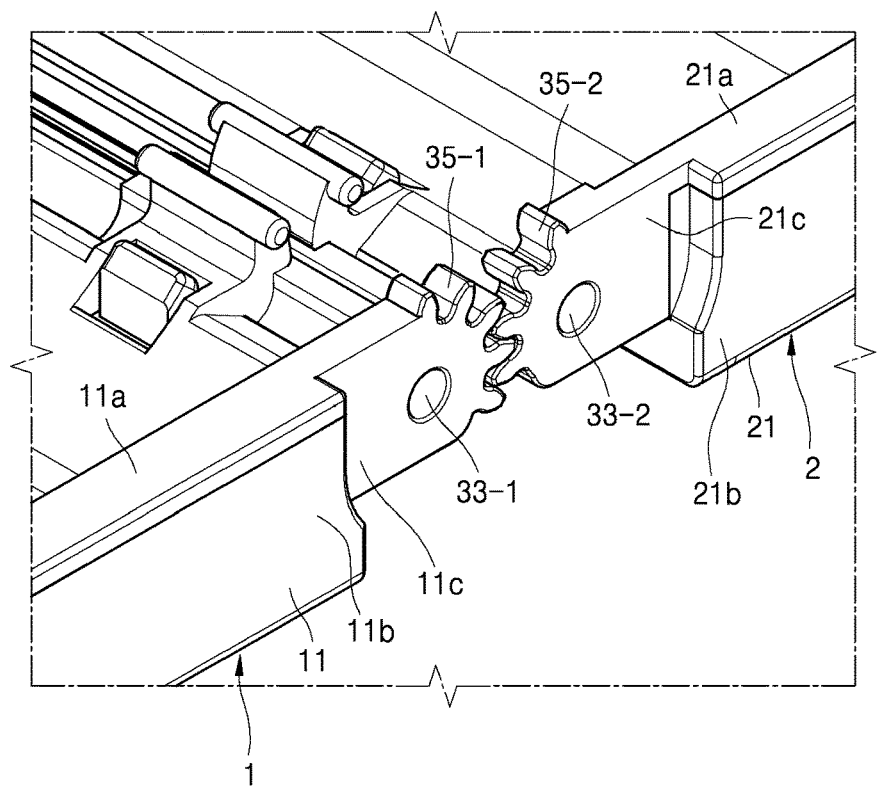
FIG. 8B is a partial exploded perspective view illustrating the gear connection structure of FIG. 8A, according to an exemplary embodiment.
Figure 8C:
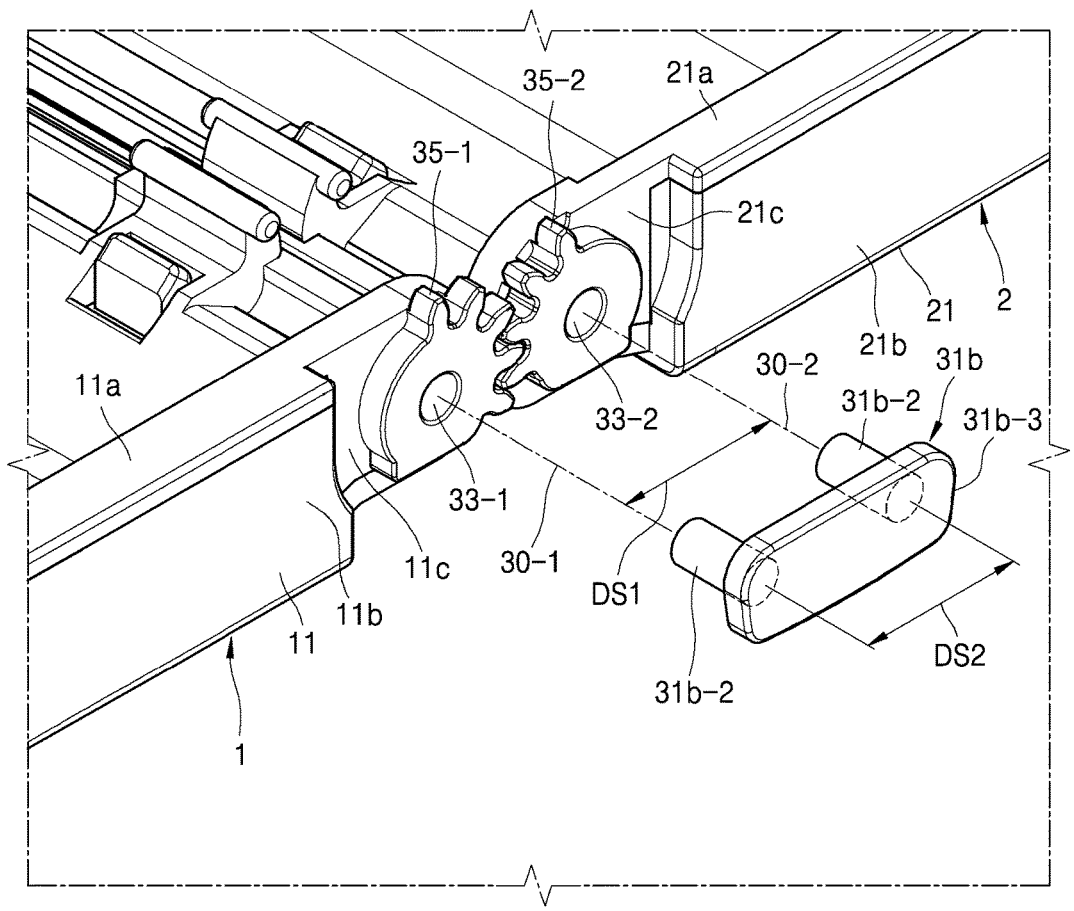
FIG. 8C is a partial exploded perspective view illustrating the gear connection structure of FIG. 8A, according to another exemplary embodiment.
Figure 8D:
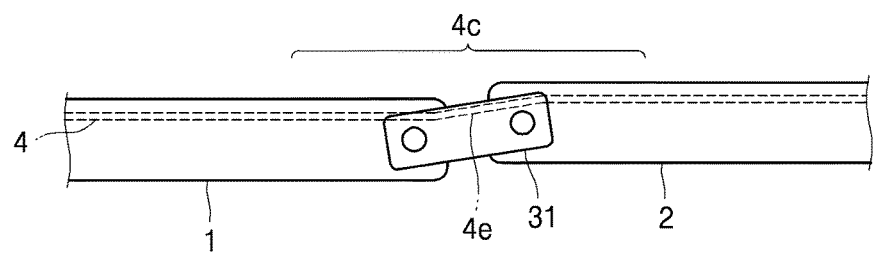
FIG. 8D is a side view illustrating a state where the first body and the second body are misaligned with each other in an unfolded state.

It is understood that a structure for foldably connecting the first body 1 and the second body 2 is not limited to a structure of FIGS. 6 and 7 in one or more other exemplary embodiments. FIG. 8A is a side view illustrating a gear connection structure that is a modification of a structure for foldably connecting the first body 1 and the second body 2. FIG. 8B is a partial exploded perspective view illustrating the gear connection structure of FIG. 8A, according to an exemplary embodiment. FIG. 8C is a partial exploded perspective view illustrating the gear connection structure of FIG. 8A, according to another exemplary embodiment. FIG. 8D is a side view illustrating a state where the first body 1 and the second body 2 are misaligned with each other in an unfolded state. The gear connection structure of FIGS. 8A through 8C may be obtained by adding gears to the structure of FIG. 6.

Referring to FIGS. 8A and 8B, a first gear 35-1 and a second gear 35-2 that engage with each other are respectively provided on the first body 1 and the second body 2. Centers of the first gear 35-1 and the second gear 35-2 respectively correspond to centers of the second connection holes 33-1 and 33-2. In the present exemplary embodiment, the first gear 35-1 and the second gear 35-2 are formed on the both side walls 11a and 21a of the first base cover 11 and the second base cover 21, respectively. Alternatively, the first gear 35-1 and the second gear 35-2 may be formed on the both side walls 12a and 22a of the first frame 12 and the second frame 22, respectively. When the hinge members 34-1 and 34-2 of FIG. 6 pass through the second connection holes 33-1 and 33-2 and are inserted into the first connection holes 32-1 and 32-2, screws S are inserted into the screw holes 34c from the connection bracket 31. Accordingly, the first body 1 and the second body 2 may be coupled to the connection bracket 31 so that the first body 1 and the second body 2 may pivot about the insertion portions 34a of the hinge members 34-1 and 34-2. The cover member 5 covers the connection bracket 31 and the first gear 35-1 and the second gear 35-2. For example, the recesses 53 that are sunken from the side walls 52 of the cover member 5 are shaped to receive the connection bracket 31, the first gear 35-1, and the second gear 35-2.

Referring to FIG. 8C, recesses 11c and 21c that are sunken inward from outer surfaces 11b and 21b may be formed in both side walls 11a and 21a of the first base cover 11 and the second base cover 21 and the first gear 35-1 and the second gear 35-2 may be provided in the recesses 11c and 21c. In the present exemplary embodiment, a connection member 31b in which the first and second hinge members 34-1 and 34-2 and the connection bracket 31 are integrally formed is used. That is, the connection member 31b is formed so that the insertion portions 34a are integrally formed with the connection bracket 31. Referring to FIG. 8C, the connection member 31b includes a bracket portion 31b-3 that is disposed outside the first gear 35-1 and the second gear 35-2, and insertion shafts 31b-1 and 31b-2 that extend from the bracket portion 31b-3 and are inserted into centers of the first gear 35-1 and the second gear 35-2, that is, into the second connection holes 33-1 and 33-2. After the first body 1 and the second body 2 are disposed parallel to each other so that the first gear 35-1 and the second gear 35-2 engage with each other, the insertion shafts 31b-1 and 31b-2 are respectively inserted into the second connection holes 33-1 and 33-2. Next, the cover member 5 may be coupled to the first body 1 and the second body 2 by slightly widening outward the side walls 52 and inserting the connection member 31b into the recesses 53 (see FIG. 5). Accordingly, the side walls 52 of the cover member 5 may prevent the connection member 31b from being separated outward and a state where the insertion shafts 31b-1 and 31b-2 are inserted into the second connection holes 33-1 and 33-2 may be maintained. The first gear 35-1 and the second gear 35-2 are covered by the side walls 52 of the cover member 56. To this end, the recesses 53 may be shaped to receive even the first gear 35-1 and the second gear 35-2. The connection member 31b of the present exemplary embodiment may also be applied to the gear connection structure of FIG. 8B.

In order for the first gear 35-1 and the second gear 35-2 to smoothly engage with each other, an interaxial distance DS1, that is, a distance between the central axes 30-1 and 30-2, is to be maintained. The interaxial distance DS1 depends on a distance DS2 between the insertion shafts 31b-1 and 31b-2 provided on the connection member 31b and a difference between diameters of the insertion shafts 31b-1 and 31b-2 and diameters of the second connection holes 33-1 and 33-2. During a manufacturing process, a tolerance of the distance DS2 between the insertion shafts 31b-1 and 31b-2 and a tolerance of the difference between the diameters of the insertion shafts 31b-1 and 31b-2 and the second connection holes 33-1 and 33-2 may negatively affect the interaxial distance DS2. The diameters of the insertion shafts 31b-1 and 31b-2 are to be less than the diameters of the second connection holes 33-1 and 33-1. Hence, the diameters of the insertion shafts 31b-1 and 31b-2 have a (−) tolerance and the diameters of the second connection holes 33-1 and 33-2 have a (+) tolerance. In this state, when the distance DS2 between the insertion shafts 31b-1 and 31b-2 has a (+) tolerance, the first body 1 and the second body 2 may be spaced apart from each other in a longitudinal direction L by the difference between the diameters of the insertion shafts 31b-1 and 31b-2 and the diameters of the second connection holes 33-1 and 33-2, thereby accordingly reducing the amount of engagement between the first gear 35-1 and the second gear 35-2. In this regard, in the present exemplary embodiment, the distance DS2 between the insertion shafts 31b-1 and 31b-2 has a (−) tolerance. That is, the distance DS2 between the insertion shafts 31b-1 and 31b-2 is less than the interaxial distance DS1. In this configuration, the amount of spacing between the first body 1 and the second body 2 in the longitudinal direction L may be reduced, the amount of engagement between the first gear 35-1 and the second gear 35-2 may be prevented from being reduced, and thus the first body 1 and the second body 2 may smoothly fold and unfold. This configuration may also be applied to an interval between the first connection hole 32-1 and the second connection hole 32-2 of the connection bracket 31 that is applied to the gear connection structure of FIG. 8B.

In a connection structure not including the first gear 35-1 and the second gear 35-2, since pivoting of the first body 1 and the second body 2 may not be synchronized during a folding/unfolding process, the first body 1 and the second body 2 may be misaligned with each other in an unfolded state, as shown in FIG. 8D. The first body 1 and the second body 2 may be misaligned with each other even due to an elastic force applied from an elastic unit that will be described below. Once the first body 1 and the second body 2 are misaligned with each other, a level difference 4e may occur in the third part 4c of the flexible display device 4. In the connection structure of FIG. 8A, since the first gear 35-1 and the second gear 35-2 engage with each other, the first body 1 and the second body 2 synchronously pivot during a folding/unfolding process. Hence, the first body 1 and the second body 2 are not misaligned with each other during a folding/unfolding process. Also, the elastic unit may stably operate.

Figure 9:
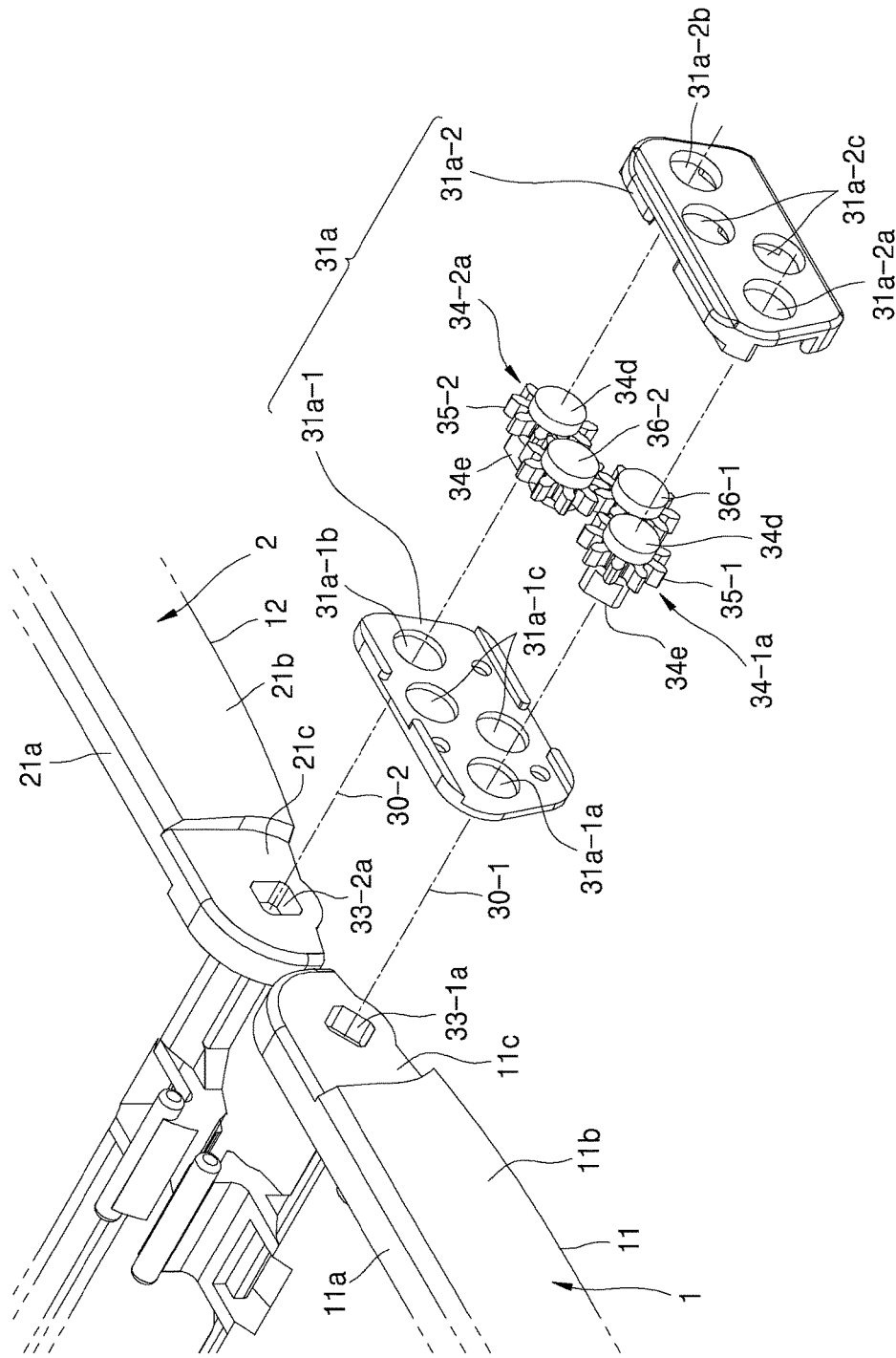
FIG. 9 is an exploded perspective view illustrating a modification of a hinge unit for foldably connecting the first body and the second body.

FIG. 9 is an exploded perspective view illustrating a modification of the hinge unit 3 for foldably connecting the first body 1 and the second body 2. Referring to FIG. 9, the hinge unit 3 includes one pair of hinge members 34-1a and 34-2a on which the first gear 35-1 and the second gear 35-2 are formed and one pair of idle gears 36-1 and 36-2 that connect the first gear 35-1 and the second gear 35-2. The one pair of hinge members 34-1a and 34-2a are respectively connected to the first body 1 and the second body 2. A connection bracket 31a may include one pair of brackets 31a-1 and 31a-2 that are coupled to each other and form a space in which the first gear 35-1 and the second gear 35-2 and the idle gears 36-1 and 36-2 are received.

For example, the hinge member 34-1a includes a shaft 34d that extends along the central axis 30-1 and the first gear 35-1 that is provided on the shaft 34d. An insertion portion 34e that is inserted into the first body 1, for example, a connection hole 33-1a formed in the side wall 11a of the first base cover 11, is provided on one end portion of the shaft 34d. Shapes of the connection hole 33-1a and the insertion portion 34e are determined or provided so that the hinge member 34-1a rotates along with the first body 1. For example, referring to FIG. 9, the connection hole 33-1a and the insertion portion 34e have quadrangular cross-sectional shapes. Likewise, the hinge member 34-2a includes the shaft 34d that extends along the central axis 30-2 and the second gear 35-2 that is provided on the shaft 34d. The insertion portion 34e that is inserted into the second body 2, for example, a connection hole 33-2a formed in the side wall 21a of the second base cover 21, is provided on one end portion of the shaft 34d. Shapes of the connection hole 33-2a and the insertion portion 34e are determined so that the hinge member 34-2a rotates along with the second body 2. For example, referring to FIG. 9, the connection hole 33-2a and the insertion portion 34e have quadrangular cross-sectional shapes.

The insertion portions 34e of the one pair of hinge members 34-1a and 34-2a may pass through support-holes 31a-1a and 31a-1b of the bracket 31a-1 and may be respectively inserted into the connection holes 33-1a and 33-2a formed in the side walls 11a and 21a, and the bracket 31a-2 may be coupled to the bracket 31a-1. The hinge member 34-1a passes through the support holes 31a-1a and 31a-2a of the brackets 31a-1 and 31a-2, and the hinge member 34-2a passes through the support holes 31a-1b and 31a-2b of the brackets 31a-1 and 31a-2. Accordingly, the connection bracket 31a may be pivotably connected to the one pair of hinge members 34-1a and 34-2a. The idle gears 36-1 and 36-2 are pivotably supported in support holes 31a-1c and 31a-2c formed in the one pair of brackets 31a-1 and 31a-2.

Figure 10:
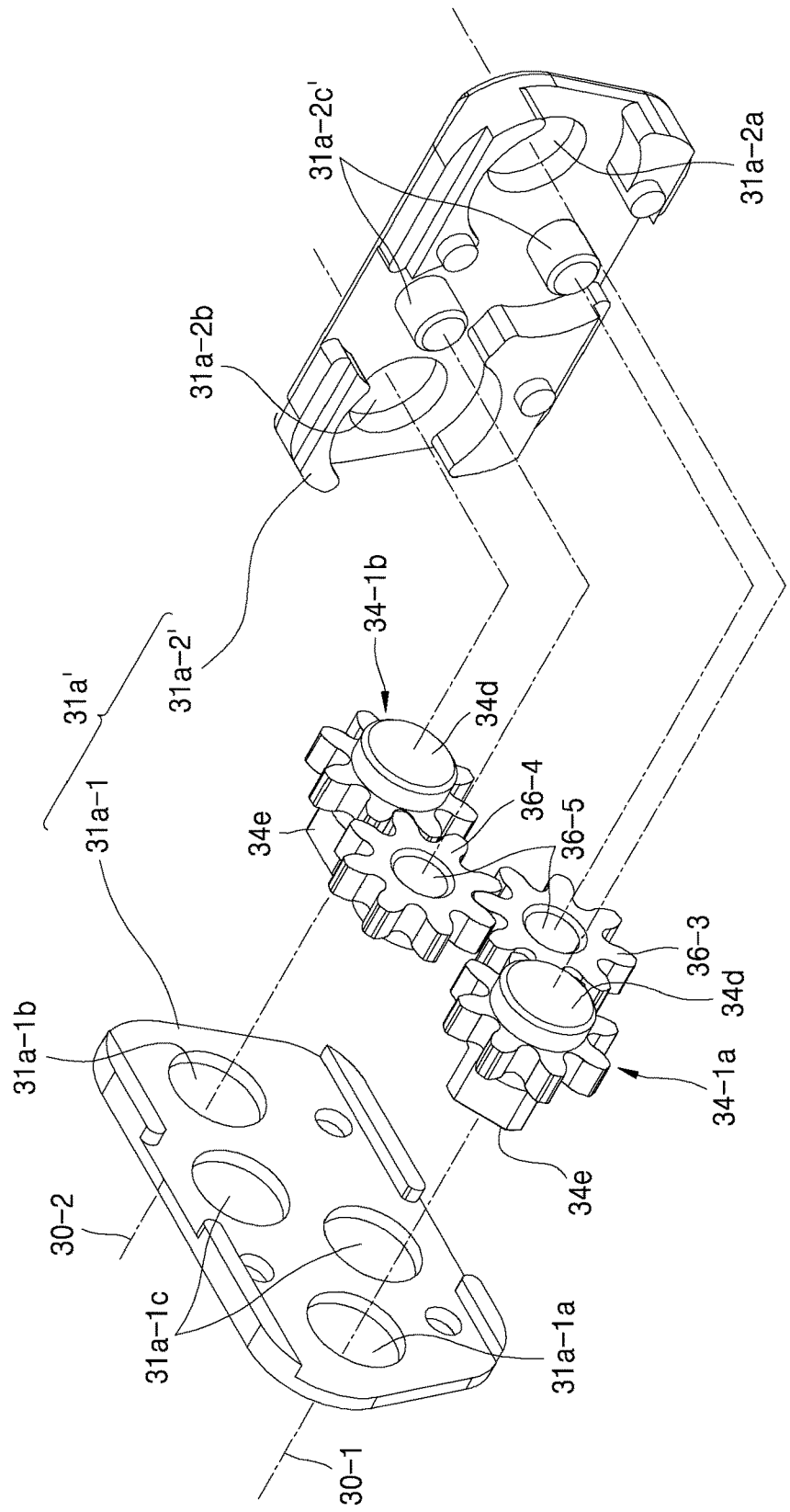
FIG. 10 is an exploded perspective view illustrating another modification of the hinge unit for foldably connecting the first body and the second body.

FIG. 10 is an exploded perspective view illustrating another modification of the hinge unit 3 for foldably connecting the first body 1 and the second body 2. The hinge unit 3 of FIG. 10 is similar to the hinge unit 3 of FIG. 9, though the connection bracket 31a of FIG. 9 is replaced with a connection bracket 31a'. That is, the bracket 31a-2 including the support holes 31a-2c of FIG. 9 is replaced with a bracket 31a-2' including support posts 31a-2c'. Also, concave portions 36-5 into which the support posts 31a-2c' are inserted are formed in the idle gears 36-3 and 36-4.

In this configuration, the first body 1 and the second body 2 may be connected to each other to change between the unfolded position of FIG. 2 and the folded position of FIG. 3. Also, since the first gear 35-1 and the second gear 35-2 are received in the connection bracket 31a or 31a', a lubricant applied to the first gear 35-1 and the second gear 35-2 may be prevented from being exposed to the outside and from being contaminated with dust. The cover member 5 covers the connection bracket 31a or 31a'. For example, the recesses 53 formed in the side walls 52 of the cover member 5 are shaped to receive the connection bracket 31a.

Figure 11:
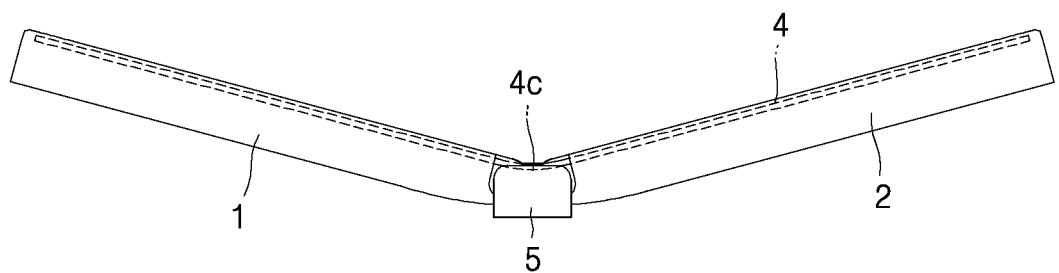
FIG. 11 is a perspective view illustrating a state where the first body and the second body slightly fold at the unfolded position due to elasticity of a curved portion of the flexible display device, according to an exemplary embodiment.

The foldable device 100 may be carried and stored in the folded state of FIG. 3, and may be changed to the unfolded state of FIG. 2 while being used. In the unfolded state, the third part 4c of the flexible display device 4 may warp downward due to gravity and may be temporarily deformed. Also, when the flexible display device 4 is maintained in the folded state for a long time, the third part 4c may be permanently deformed. A plurality of thin-film layers constituting the flexible display device 4 are adhered to one another by using an adhesive layer. A relatively long time (delay time) is taken for the adhesive layer to return from a bent state to a completely unfolded state according to mobility of an adhesive. During the delay time, the flexible display device 4 tends to be bent. Due to such temporal or permanent deformation and the delay time of the adhesive layer, even when the first body 1 and the second body 2 unfold, the flexible display device 4 may not be completely spread flat, thereby obstructing an image displayed on the entire flexible display device 4. Also, when the flexible display device 4 fails to be completely spread flat, the first body 1 and the second body 2 also fail to completely unfold. Even when a user applies an external force to the first body 1 and the second body 2 to try to make the first body 1 and the second body 2 completely unfold, the first body 1 and the second body 2 may slightly fold as shown in FIG. 11 due to a restoring force caused by mobility of the adhesive layer and temporal or permanent deformation of the flexible display device 4. Hence, the user has to inconveniently use the foldable device 100 in a state where a force is applied to the first body 1 and the second body 2 to make the first body 1 and the second body 2 completely unfold.

According to the foldable device 100 of the present exemplary embodiment, an elastic unit for applying an elastic force to the first body 1 and the second body 2 is used in order to maintain the first body 1 and the second body 2 in a completely unfolded state. In the completely unfolded state, the elastic unit applies an elastic force to the first body 1 and the second body 2 so that the first body 1 and the second body 2 are far away from each other or are spread apart. Due to the elastic force, a tensile force may be applied to the flexible display device 4 and the third part 4c of the flexible display device 4 may be spread flat. When the first body 1 and the second body 2 change between the folded position and the unfolded position, a direction of the elastic force applied by the elastic unit may be changed from a direction obstructing position change of the first body 1 and the second body 2 to a direction allowing position change of the first body 1 and the second body 2.

In an exemplary embodiment, referring to FIG. 5, the elastic unit may include an elastic arm 61 that is provided on the first body 1 and a facing arm 62 that faces the elastic arm 61. The elastic arm 61 and the facing arm 62 may be located adjacent to the facing edges 13 and 23 of the first body 1 and the second body 2. The elastic arm 61 and the facing arm 62 are spaced apart from each other when the first body 1 and the second body 2 are in the folded position. When the first body 1 and the second body 2 are located at the unfolded position, the elastic arm 61 contacts the facing arm 62 to be elastically deformed, and thus applies an elastic force to the facing arm 62 so that the first body 1 and the second body 2 are located at the unfolded position. Due to the elastic force of the elastic arm 61, the second body 2 is forced to be spaced apart from the first body 1, and thus the third part 4c of the flexible display device 4 is spread flat.

The elastic arm 61 and the facing arm 62 may be integrally formed with the first base cover 11 and the second base cover 21 or the first frame 12 and the second frame 22. In the present exemplary embodiment, the elastic arm 61 and the facing arm 62 are integrally formed with the first frame 12 and the second frame 22, respectively.

Figure 12:
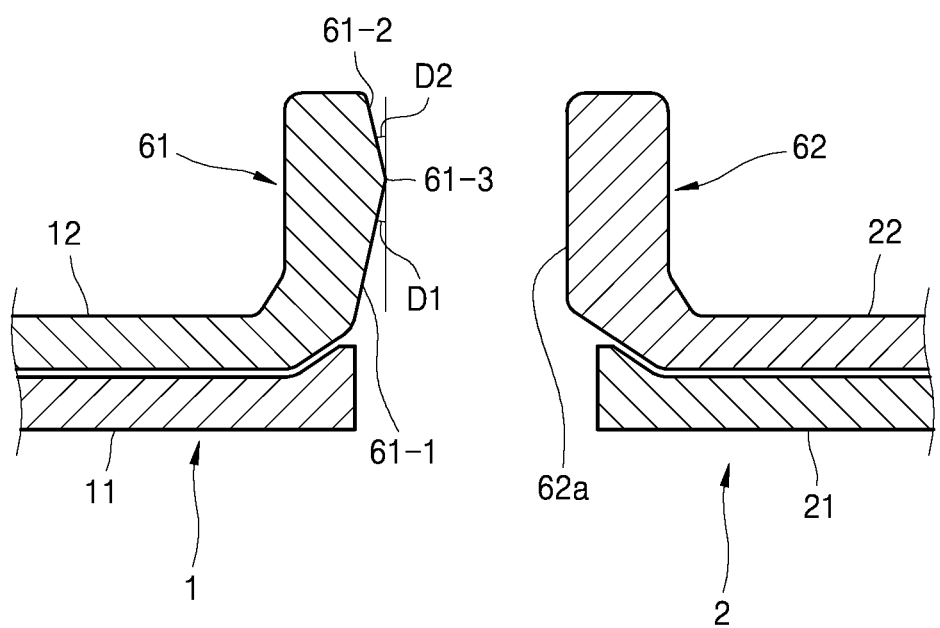
FIG. 12 is a cross-sectional view taken along line C-C' of FIG. 5, according to an exemplary embodiment.

FIG. 12 is a cross-sectional view taken along line C-C' of FIG. 5, according to an exemplary embodiment. Referring to FIG. 12, the elastic arm 61 and the facing arm 62 respectively extend from the first base cover 11 and the second base cover 21 and face each other. The elastic arm 61 includes a first contact portion 61-1 that contacts a facing portion 62a of the facing arm 62 when the first body 1 and the second body 2 are in the unfolded position. The first contact portion 61-1 and the facing portion 62a of the present exemplary embodiment have planar shapes. The first contact portion 61-1 is inclined at an angle D1 with respect to the facing portion 62a. The angle D1 may be determined so that when the first body 1 and the second body 2 are in the unfolded position and the elastic arm 61 is pushed by the facing arm 62 to be deformed, the first contact portion 61-1 is parallel to the facing portion 62a. Accordingly, when the first body 1 and the second body 2 are in the unfolded position, the first contact portion 61-1 and the facing portion 62a surface-contact each other, and thus the first body 1 and the second body 2 may be maintained in the unfolded state. The first contact portion 61-1 may contact the facing portion 62a at at least two positions that are spaced apart from each other in a pivoting direction of the first body 1 and the second body 2 when the first body 1 and the second body 2 are in the unfolded position. The expression 'surface-contact' corresponds to even a state where the first contact portion 61-1 contacts the facing portion 62a at at least two positions that are spaced apart from each other in the pivoting direction of the first body 1 and the second body 2.

Figure 13:
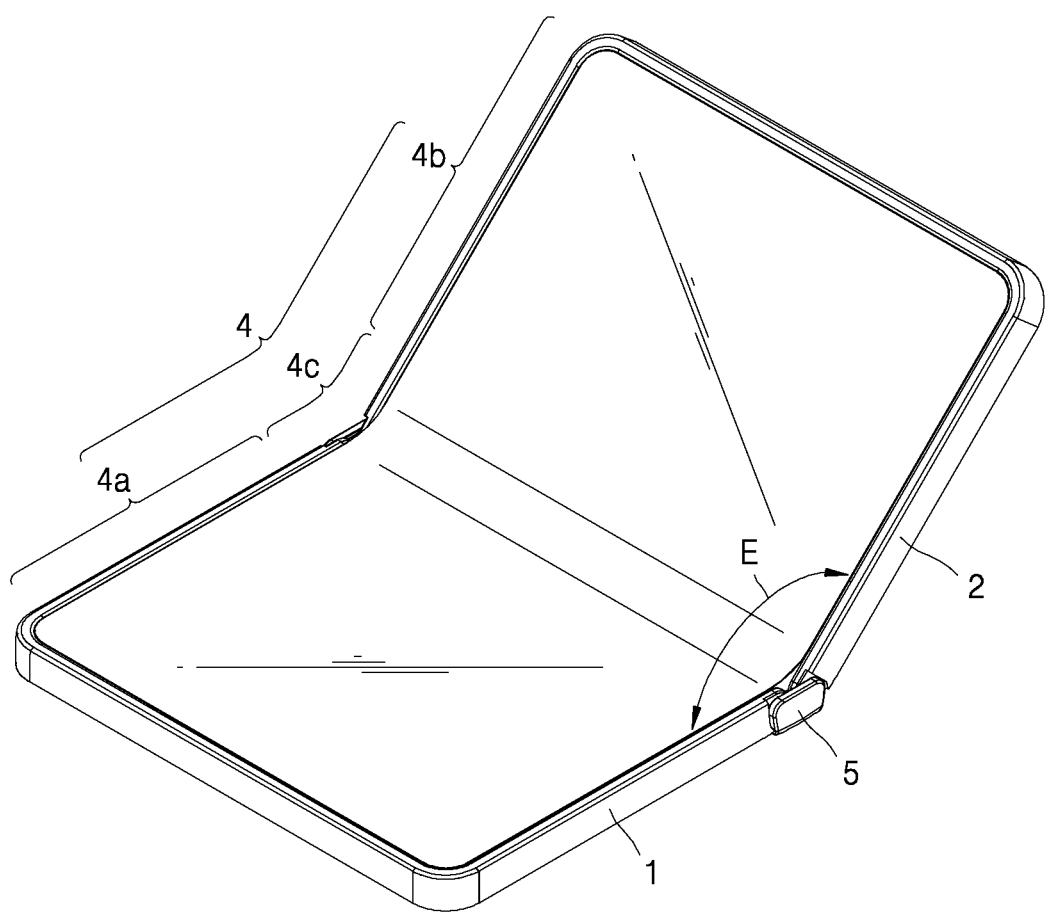
FIG. 13 is a perspective view illustrating a state where the first body and the second body are stopped at a predetermined unfolding angle, according to an exemplary embodiment.

FIG. 13 is a perspective view illustrating a state where the first body 1 and the second body 2 are at an unfolding angle E, according to an exemplary embodiment. Referring to FIG. 13, the first body 1 and the second body 2 may be stopped at at least one position between the folded state and the completely unfolded state. The unfolding angle E between the first body 1 and the second body 2 may range from about 90° to about 180°, for example, from about 90° to about 120°. An angle at which the foldable device 100 may be most naturally used in the state of FIG. 13 is the unfolding angle E ranging from about 90° to about 120°. In this configuration, for example, an input unit such as a keyboard or an input icon may be displayed on the second part 4b of the flexible display device 4 and a screen responding to a command input through the input unit may be displayed on the first part 4a of the flexible display device 4.

Referring back to FIG. 12, the elastic arm 61 may further include a second contact portion 61-2 that is inclined with respect to the first contact portion 61-1. The second contact portion 61-2 of the present exemplary embodiment has a planar shape. The second contact portion 61-2 is inclined at an angle D2 with respect to the facing portion 62a. The second contact portion 61-2 is distinguished from the first contact portion 61-1 by a boundary portion 61-3 that projects the most toward the second body 2. The angle D2 may be determined so that when the first body 1 and the second body 2 are located at a position having the unfolding angle E and the elastic arm 61 is pushed by the facing arm 62 to be deformed, the second contact portion 61-2 is parallel to the facing portion 62a. Accordingly, the second contact portion 61-2 may surface-contact the facing portion 62a and the first body 1 and the second body 2 may be stopped and maintained in a state having the unfolding angle E.

FIGS. 14A, 14B, 14C, and 14D are cross-sectional views respectively illustrating a state where the first body 1 and the second body 2 are in the folded position, an initial state where the first body 1 and the second body 2 begin to unfold and the elastic arm 61 contacts the facing arm 62, a state where the first body 1 and the second body 2 are maintained at a predetermined unfolding angle, and a state where the first body 1 and the second body 2 completely unfold. How the first body 1 and the second body 2 fold and unfold will now be explained with reference to FIGS. 14A through 14D.

Figure 14A:
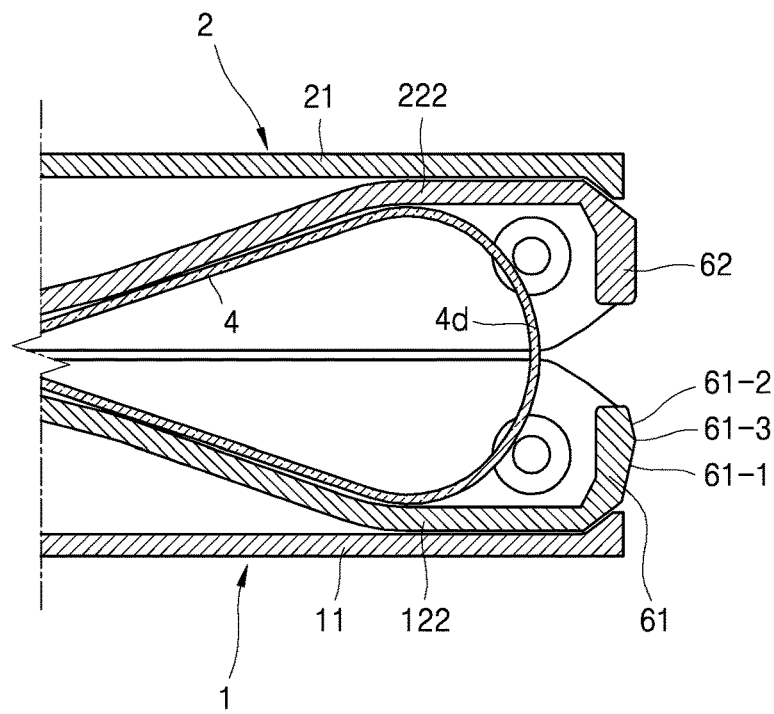
FIG. 14A is a cross-sectional view illustrating a state where the first body and the second body are in the folded position, according to an exemplary embodiment.

Referring to FIG. 14A, when the first body 1 and the second body 2 are in the folded position, the elastic arm 61 and the facing arm 62 are spaced apart from each other. The curved portion 4d of the flexible display device 4 is received between the first receiver 122 and the second receiver 222.

Figure 14B:
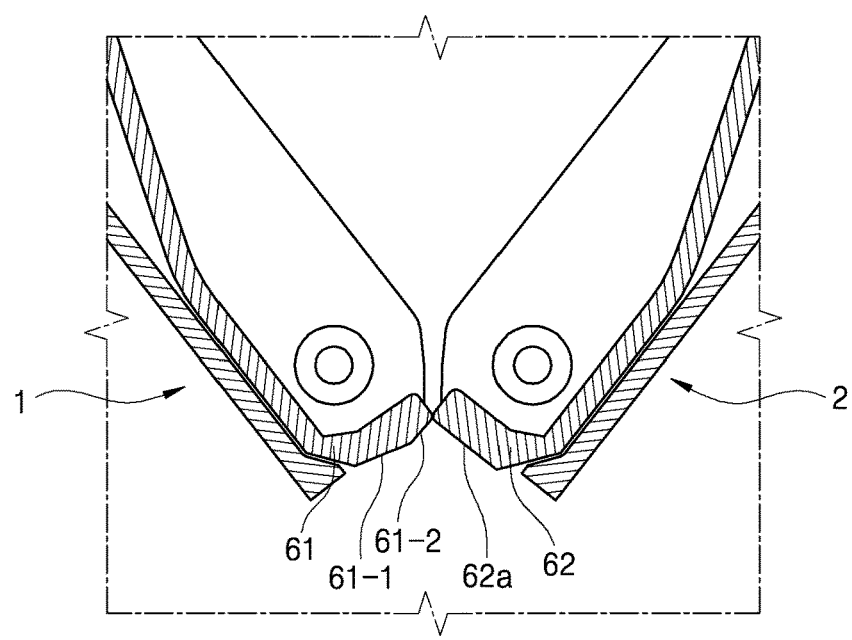
FIG. 14B is a cross-sectional view illustrating an initial state where the first body and the second body begin to unfold and an elastic arm contacts a facing arm, according to an exemplary embodiment.

In this state, when the first body 1 and the second body 2 unfold, as shown in FIG. 14B, the elastic arm 61 contacts the facing arm 62. When the first body 1 and the second body 2 further unfold, the elastic arm 61 is pushed by the facing arm 62 to be elastically deformed. In this case, an elastic force of the elastic arm 61 is applied so that position change of the first body 1 and the second body 2 is obstructed. In this state, when the first body 1 and the second body 2 further unfold, the elastic force of the elastic arm 61 is changed and applied so that the first body 1 and the second body 2 unfold. Even when an external force is removed, the first body 1 and the second body 2 rapidly change to the position having the unfolding angle E due to the elastic force.

Figure 14C:
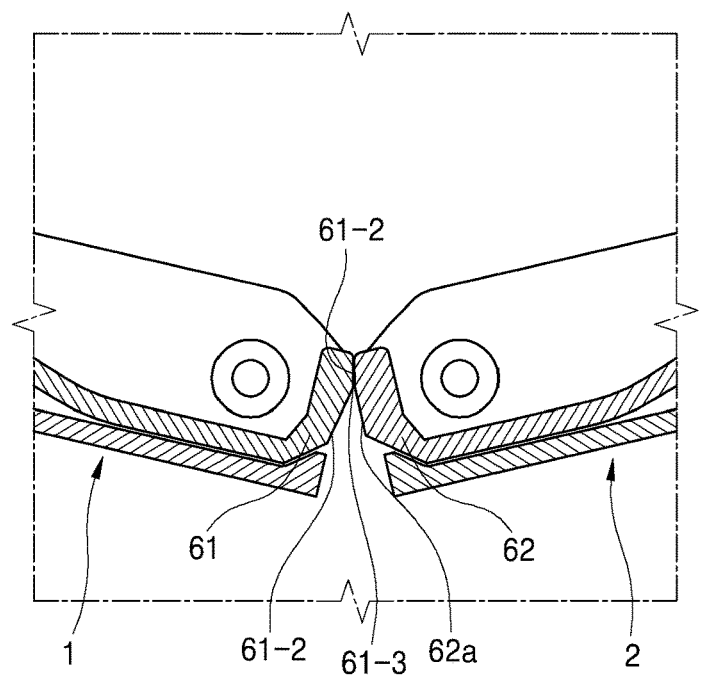
FIG. 14C is a cross-sectional view illustrating a state where the first body and the second body are maintained at the predetermined unfolding angle, according to an exemplary embodiment.

When an angle between the first body 1 and the second body 2 reaches the unfolding angle E, as shown in FIG. 14C, the second contact portion 61-2 of the elastic arm 61 contacts the facing portion 62a of the facing arm 62. Even when an external force for making the first body 1 and the second body 2 unfold is removed, the angle between the first body 1 and the second body 2 is maintained at the unfolding angle E. Also, even when a force for making the first body 1 and the second body 2 further unfold or fold is applied to the first body 1 and the second body 2, unless the angle between the first body 1 and the second body 2 reaches an angle at which contact between the second contact portion 61-2 and the facing portion 62a completely ends, the first body 1 and the second body 2 return to the state having the unfolding angle E due to the elastic force of the elastic arm 61.

Figure 14D:
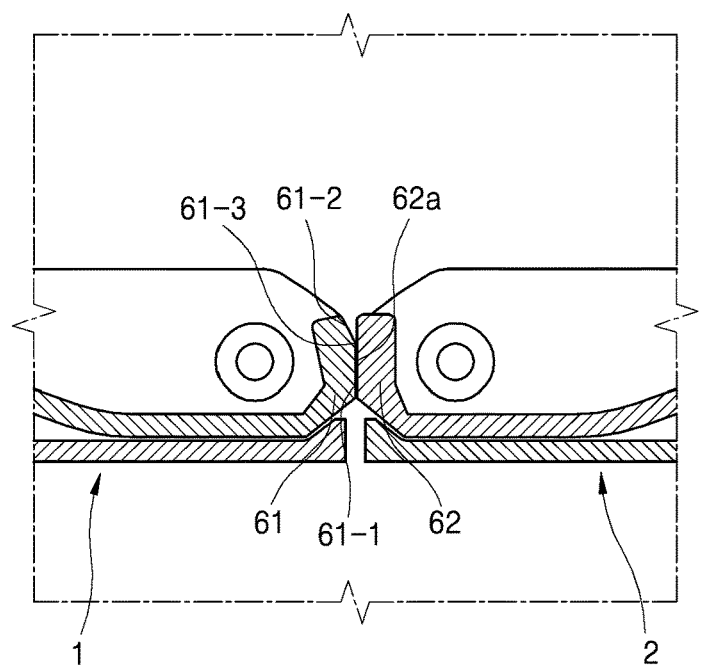
FIG. 14D is a cross-sectional view illustrating a state where the first body and the second body completely unfold, according to an exemplary embodiment.

In the state of FIG. 14C, when the first body 1 and the second body 2 further unfold, contact between the second contact portion 61-2 and the facing portion 62a ends and, as shown in FIG. 14D, the first contact portion 61-1 surface-contacts the facing portion 62a. In this case, a direction of the elastic force of the elastic arm 61 is changed from a direction obstructing position change of the first body 1 and the second body 2 to a direction allowing position change of the first body 1 and the second body 2. Even when an external force for making the first body 1 and the second body 2 unfold is removed, the first body 1 and the second body 2 are maintained in the completely unfolded state. Also, even when a force for making the first body 1 and the second body 2 fold is applied to the first body 1 and the second body 2, unless the angle between the first body 1 and the second body 2 reaches an angle at which contact between the first contact portion 61-1 and the facing portion 62a completely ends, the first body 1 and the second body 2 return to the completely unfolded state due to the elastic force of the elastic arm 61. In this state, the elastic arm 61 elastically contacts the facing arm 62 and applies the elastic force so that the first body 1 and the second body 2 are spaced apart from each other. Due to the elastic force, the third part 4c of the flexible display device 4 is spread flat.

The first body 1 and the second body 2 that are in the unfolded position of FIG. 14D may be maintained at the unfolding angle E of FIG. 14C and may change to the folded position of FIG. 14A in reverse order.

Since the elastic unit is used as described above, the third part 4c of the flexible display device 4 may be spread flat when the first body 1 and the second body 2 unfold and, even when an external force is removed, the first body 1 and the second body 2 may be maintained at the completely unfolded position. Also, the first body 1 and the second body 2 may be maintained at the position having the unfolding angle E. Additionally, the elastic unit applies an elastic force so that the first body 1 and the second body 2 fold or unfold during a folding/unfolding process. Accordingly, the first body 1 and the second body 2 easily fold or unfold.

Figure 15:
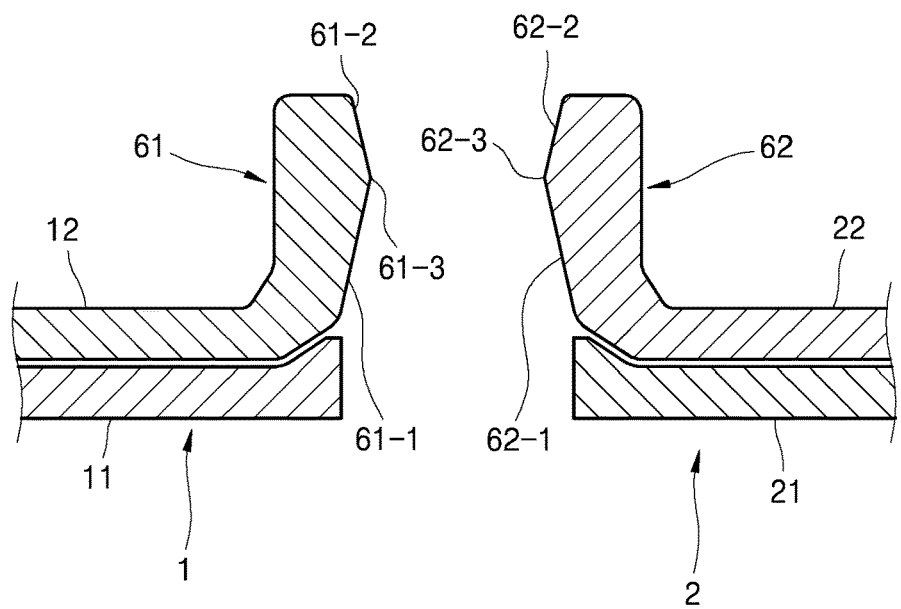
FIG. 15 is a cross-sectional view illustrating the elastic unit according to another exemplary embodiment.

FIG. 15 is a cross-sectional view illustrating the elastic unit according to another exemplary embodiment. Referring to FIG. 15, the facing arm 62 may contact the elastic arm 61 and may be elastically deformed. Hereinafter, the elastic arm 61 and the facing arm 62 are respectively referred to as a first elastic arm 61 and a second elastic arm 62. The first elastic arm 61 is the same as the elastic arm 61 of FIG. 12. For example, the second elastic arm 62 may be integrally formed with the second frame 22 of the second body 2. The facing portion 62a may include a first facing portion 62-1 and a second facing portion 62-2 having planar shapes and respectively corresponding to the first contact portion 61-1 and the second contact portion 61-2. The second facing portion 62-2 is distinguished from the first facing portion 62-1 by a boundary portion 62-3 that projects most toward the first body 1. When the first body 1 and the second body 2 are in the position having the unfolding angle E of FIG. 13, the second contact portion 61-2 and the second facing portion 62-2 surface-contact each other, and the first elastic arm 61 and the second elastic arm 62 are elastically deformed to push each other. When the first body 1 and the second body 2 are located at the completely unfolded position, the first contact portion 61-1 and the first facing portion 62-1 may surface-contact each other to push each other, the flexible display device 4 may be spread flat, and the first body 1 and the second body 2 may be maintained at the completely unfolded position.

Figure 16:
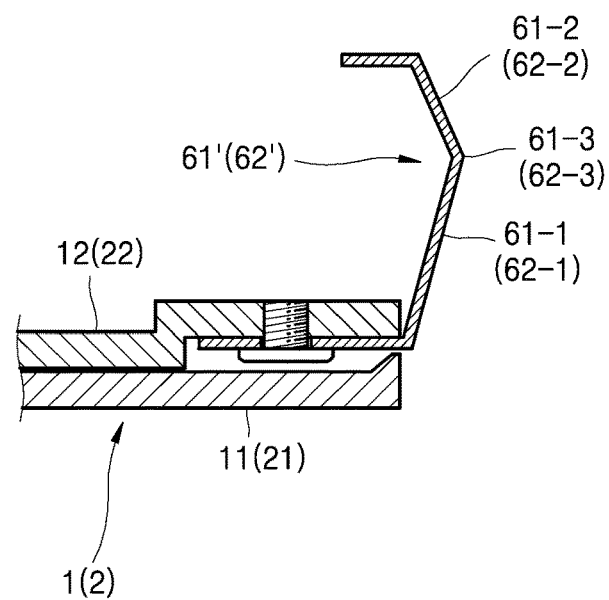
FIG. 16 is a cross-sectional view illustrating the elastic unit according to another exemplary embodiment.

Although the first elastic arm 61 and the second elastic arm 62 are integrally formed with the first body 1 and the second body 2 in the present exemplary embodiment, it is understood that one or more other exemplary embodiments are not limited thereto. FIG. 16 is a cross-sectional view illustrating the elastic unit according to another exemplary embodiment. As shown in FIG. 16, a first elastic arm 61' having a leaf spring shape and including the first contact portion 61-1 and the second contact portion 61-2 may be coupled to the first body 1, for example, the first frame 12. Also, a second elastic arm 62' having a leaf spring shape and including the first facing portion 62-1 and the second facing portion 62-2 may be coupled to the second body 2, for example, the second frame 22.

Figure 17:
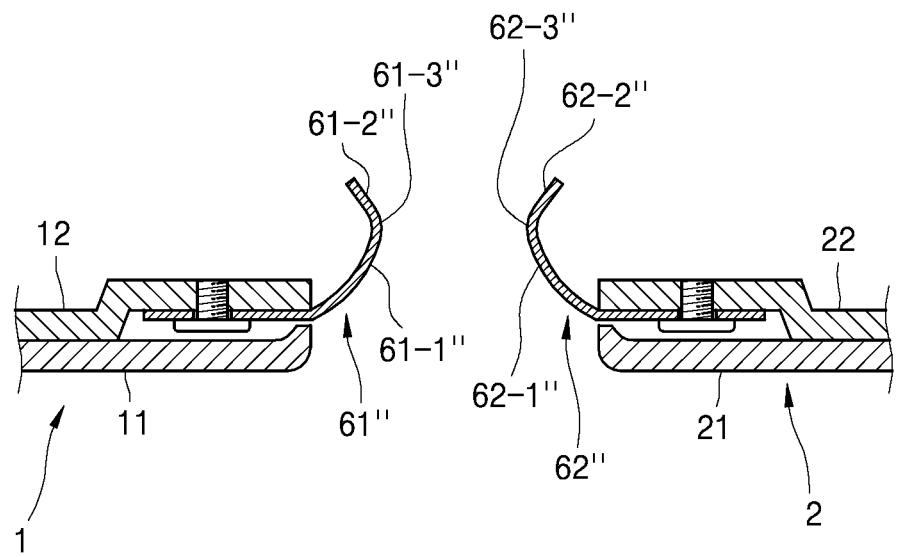
FIG. 17 is a cross-sectional view illustrating the elastic unit according to another exemplary embodiment.

Although the first contact portion 61-1 and the second contact portion 61-2 and the first facing portion 62-1 and the second facing portion 62-2 having planer shapes are used as the elastic unit in the present exemplary embodiment, it is understood that one or more other exemplary embodiments are not limited thereto. The first contact portion 61-1 and the second contact portion 61-2 or both the first contact portion 61-1 and the second contact portion 61-2 and the first facing portion 62-1 and the second facing portion 62-2 may have curved shapes. FIG. 17 is a cross-sectional view illustrating the elastic unit according to another exemplary embodiment.

Referring to FIG. 17, an elastic arm (first elastic arm) 61" including a first contact portion 61-1" and a second contact portion 61-2" having curved shapes is elastic, has a leaf spring shape, and is coupled to the first body 1, for example, the first frame 21. The first contact portion 61-1" and the second contact portion 61-2" are distinguished from each other by a boundary portion 61-3" that projects most toward the second body 2. A facing arm (second elastic arm) 62" including a first facing portion 62-1" and a second facing portion 62-2" having curved shapes respectively corresponding to the first contact portion 61-1" and the second contact portion 61-2" is elastic, has a leaf spring shape, and is coupled to the second body 2, for example, the second frame 22. The first facing portion 62-1" and the second facing portion 62-2" are distinguished from each other by a boundary portion 62-3" that projects most toward the first body 1.

Figure 18A:
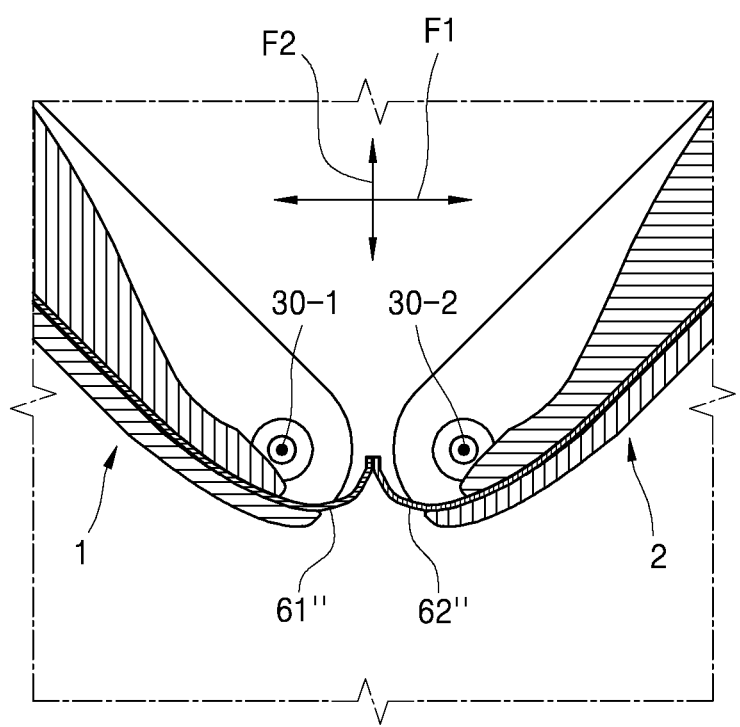
FIG. 18A is a cross-sectional view illustrating an initial state where the first body and the second body begin to unfold and the elastic arm contacts the facing arm, according to an exemplary embodiment.
Figure 18B:
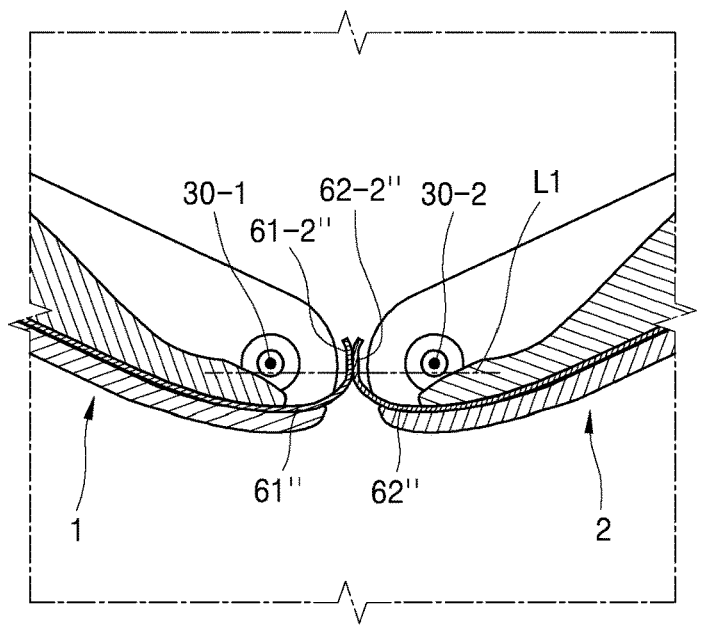
FIG. 18B is a cross-sectional view illustrating a state where the first body and the second body are maintained at the predetermined unfolding angle, according to an exemplary embodiment.
Figure 18C:
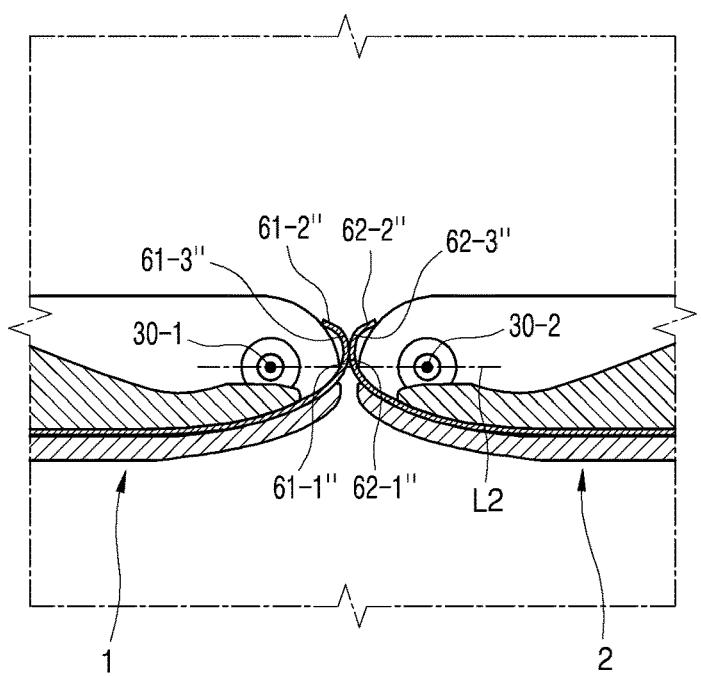
FIG. 18C is a cross-sectional view illustrating a state where the first body and the second body completely unfold, according to an exemplary embodiment.

FIGS. 18A, 18B, and 18C are cross-sectional views illustrating an initial state where the first body 1 and the second body 2 begin to unfold and the elastic arm 61" contacts the facing arm 62", a state where the first body 1 and the second body 2 are maintained at a predetermined unfolding angle, and a state where the first body 1 and the second body 2 completely unfold. How the first body 1 and the second body 2 fold and unfold will now be explained with reference to FIGS. 18A through 18C.

When the first body 1 and the second body 2 are in the folded position, the elastic arm 61" and the facing arm 62" are spaced apart from each other. In this state, when the first body 1 and the second body 2 unfold, as shown in FIG. 18A, the elastic arm 61" contacts the facing arm 62". When the elastic arm 61" begins to contact the facing arm 62", the elastic arm 61" and the facing arm 62 may surface-contact each other. Accordingly, the problem that the first body 1 and the second body 2 are misaligned with each other as shown in FIG. 8D in the connection structure not including the first gear 35-1 and the second gear 35-2 may be reduced by minimizing a vertical component F2 of an elastic force and maximizing a horizontal component F1 of the elastic force.

When the first body 1 and the second body 2 further unfold, the elastic arm 61" is pushed by the facing arm 62" and begins to be elastically deformed.

When an angle between the first body 1 and the second body 2 reaches the unfolding angle E, as shown in FIG. 18B, the second contact portion 61-2" contacts the second facing portion 62-2". Since a line L1 along which an elastic force is applied due to deformation of the elastic arm 61" and the facing arm 62" is under the central axes 30-1 and 30-2 of the first body 1 and the second body 2, the elastic force is applied so that the first body 1 and the second body 2 fold. However, a stiffness of the flexible display device 4 and the elastic force applied due to the deformation of the elastic arm 61" and the facing arm 62" are balanced, and thus even when an external force for making the first body 1 and the second body 2 unfold is removed, the angle between the first body 1 and the second body 2 is maintained at the unfolding angle E. Even when the first body 1 and the second body 2 further unfold, unless the first body 1 and the second body 2 unfold at an angle exceeding the boundary portions 61-3" and 62-3", the first body 1 and the second body 2 return to the unfolding angle E due to the elastic force of the elastic arm 61" and the facing arm 62".

In the state of FIG. 18B, when the first body 1 and the second body 2 further unfold, the first body 1 and the second body 2 unfold at an angle exceeding the boundary portions 61-3" and 62-3" and the first contact portion 61-1" contacts the first facing portion 62-2". Since a line L2 along which an elastic force is applied due to deformation of the elastic arm 61" and the facing arm 62" is over the central axes 30-1 and 30-2 of the first body 1 and the second body 2, the elastic force is applied so that the first body 1 and the second body 2 unfold. Hence, even when an external force for making the first body 1 and the second body 2 unfold is removed, the third part 4c of the flexible display device 4 is spread flat due to the elastic force applied due to the deformation of the elastic arm 61" and the facing arm 62" and the first body 1 and the second body 2 are maintained in the completely unfolded state. Even when a force for making the first body 1 and the second body 2 fold is applied to the first body 1 and the second body 2, unless the first body 1 and the second body 2 fold at an angle exceeding the boundary portions 61-3" and 62-3", the first body 1 and the second body 2 return to the completely unfolded state due to the elastic force of the elastic arm 61" and the facing arm 62".

According to the connection structure including the first gear 35-1 and the second gear 35-2 of FIGS. 8A, 8B, 8C, 9, and 10, the first body 1 and the second body 2 synchronously pivot during a folding/unfolding process. Hence, the elastic arm 61' or 61" and the facing arm 62' or 62" are symmetric with each other about a center of a line that connects the central axes 30-1 and 30-2 of the first body 1 and the second body 2. Hence, the elastic arm 61' or 61" and the facing arm 61' or 61" are not misaligned with each other, stably contact each other, and thus may be elastically deformed in desired directions.

Referring back to FIG. 5, in order to make the third part 4c of the flexible display device 4 spread flat when the first body 1 and the second body 2 are located at the unfolded position, the foldable device 100 may further include a movable support member 7 (e.g., movable supporter). The movable support member 7 includes movable supports 71 that support the third part 4c of the flexible display device 4. The movable supports 71 may be disposed on both sides in a width direction W and may partially support the third part 4c of the flexible display device 4. The movable support member 7 is located at a support position where the movable supports 71 support the third part 4c of the flexible display device 4 when the first body 1 and the second body 2 are in the unfolded position. The movable support member 7 supports the third part 4c of the flexible display device 4 between the first receiver 122 and the second receiver 222. When the first body 1 and the second body 2 change to the folded position, the movable support member 7 is located at a retreat position to form the receiving space of the curved portion 4d. That is, the movable support member 7 moves between the retreat position and the support position as the first body 1 and the second body 2 change between the folded position and the unfolded position. As such, when the first body 1 and the second body 2 are in the unfolded position, since the third part 4c of the flexible display device 4 is supported by the movable support member 7, the third part 4c may be spread flat. As the foldable device 100 changes from the folded position to the unfolded position, the movable support member 7 may be raised from the retreat position to the support position to continuously near-support the third part 4c of the flexible display device 4. The expression 'continuously near-support' means that while the foldable device 100 folds/unfolds, the movable support member 7 continuously supports the third part 4c of the flexible display device 4 or is raised/retreated to the position that supports the third part 4c of the flexible display device 4 that is bent or spread.

Figure 19:
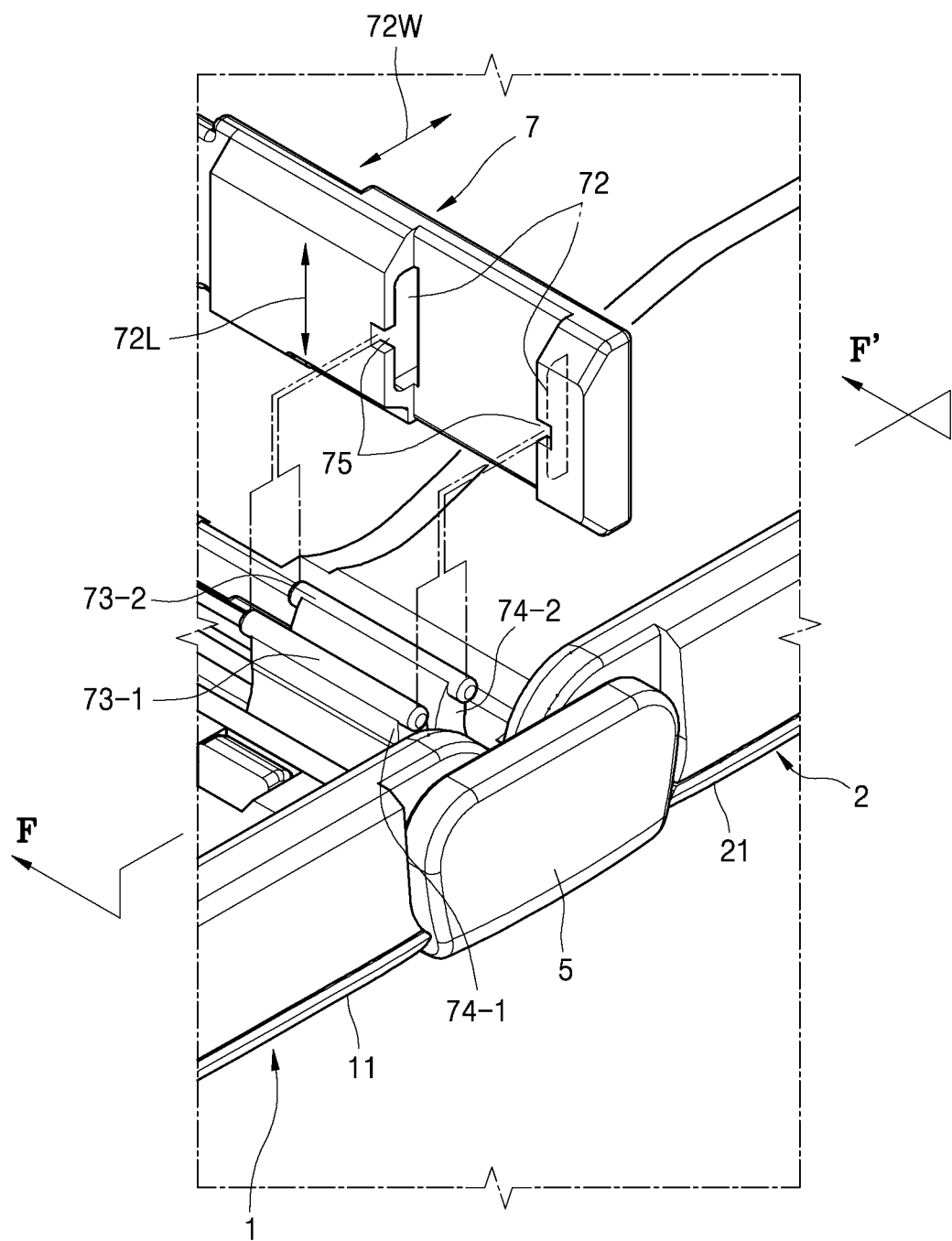
FIG. 19 is an exploded perspective view illustrating a structure for moving a movable support member between a support position and a retreat position, according to an exemplary embodiment.

FIG. 19 is an exploded perspective view illustrating a structure for moving the movable support member 7 between the support position and the retreat position, according to an exemplary embodiment. Referring to FIG. 19, slots 72 that extend in a folding/unfolding direction in which the first body 1 and the second body 2 fold/unfold are formed in the movable support member 7. One pair of guide portions 73-1 and 73-2 that are inserted into the slots 72 are formed around facing edges of the first body 1 and the second body 2 that are adjacent to the hinge unit 3. For example, the guide portions 73-1 and 73-2 may be respectively provided on upper ends of ribs 74-1 and 74-2 that respectively extend upward from the first frame 12 and the second frame 22. Insertion grooves 75 for inserting the guide portions 73-1 and 73-2 into the slots 72 are formed in the movable support member 7. The insertion grooves 75 are formed at central portions of the slots 72 in a longitudinal direction 72L of the slots 72. While the first body 1 and second body 2 fold/unfold, the guide portions 73-1 and 73-2 move in the longitudinal direction 72L of the slots 72. However, the guide portions 73-1 and 73-2 do not move to overlap with the insertion grooves 72. Accordingly, while the movable support member 7 is elevated after the guide portions 73-1 and 73-2 are inserted into the slots 72, the guide portions 73-1 and 73-2 are not separated from the slots 72 through the insertion grooves 75.

Figure 20A:
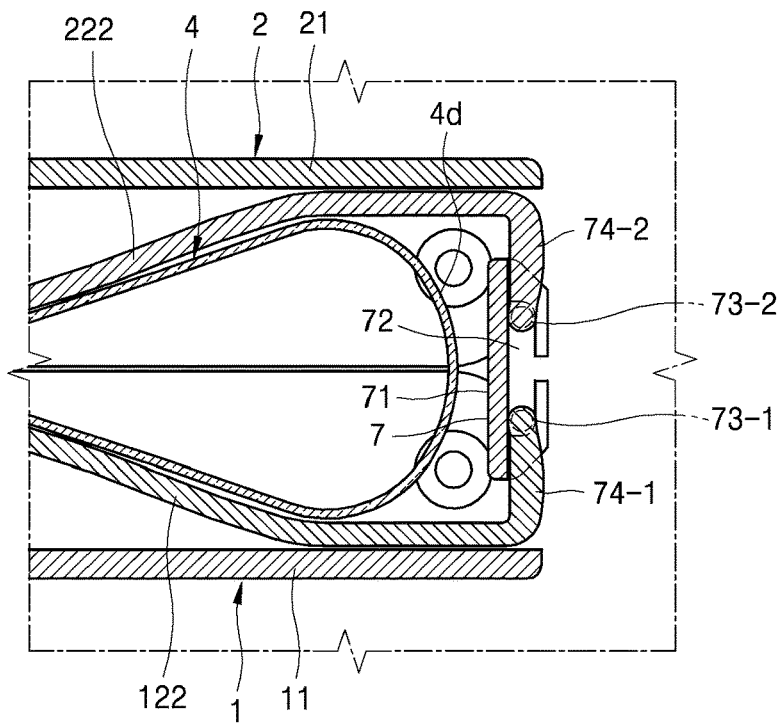
FIG. 20A is a cross-sectional view taken along line F-F' of FIG. 19, illustrating a state where the movable support member is located at the support position, according to an exemplary embodiment.
Figure 20B:
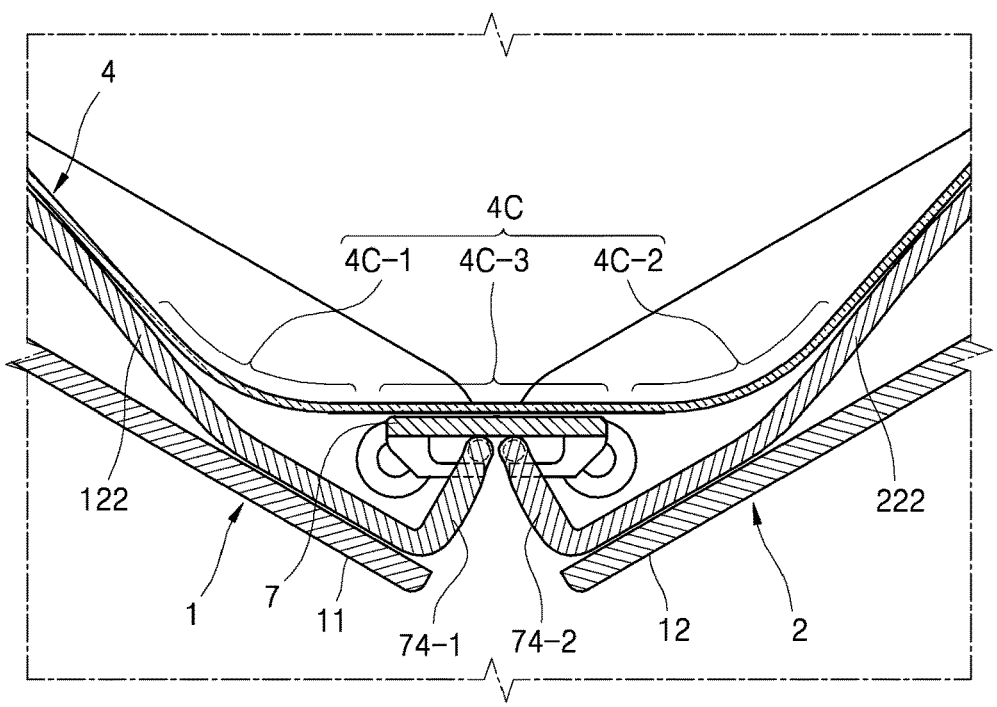
FIG. 20B is a cross-sectional view taken along line F-F' of FIG. 19, illustrating a state where the movable support member is located between the support position and the retreat position, according to an exemplary embodiment.
Figure 20C:
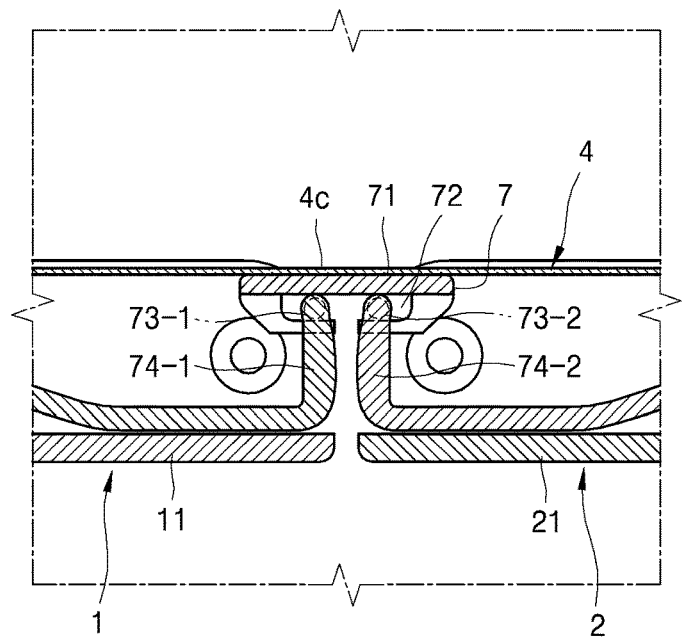
FIG. 20C is a cross-sectional view taken along line F-F' of FIG. 19, illustrating a state where the movable support member is located at the retreat position, according to an exemplary embodiment.

FIGS. 20A, 20B, and 20C are cross-sectional views taken along line F-F' of FIG. 19, illustrating respectively states where the movable support member 7 is located at the support position and the retreat position, according to an exemplary embodiment. Referring to FIG. 20A, the first body 1 and the second body 2 are in the folded position. The guide portions 73-1 and 73-2 are farthest away from each other, and the movable support member 7 is located at the retreat position. The curved portion 4d of the flexible display device 4 is received in a space formed by the first receiver 122, the second receiver 222, and the movable support member 7.

In the state of FIG. 20A, when the first body 1 and the second body 2 unfold, the guide portions 73-1 and 73-2 slide into the slots 72 to approach each other and the movable support member 7 is raised toward the flexible display device 4 to continuously near-support the third part 4c of the flexible display device 4.

When the first body 1 and the second body 2 completely unfold as shown in FIG. 20C, the movable support member 7 is located at the support position and the third part 4c of the flexible display device 4 is stably supported by the movable support 71.

Referring to FIGS. 20B and 20C, portions of the third part 4c of the flexible display device 4 corresponding to the first receiver 122 and the second receiver 222 between the first support 121 and the second support 221 and the movable support member 7 are not supported by another member when the first body 1 and the second body 2 are located at the unfolded position. That is, the third part 4c of the flexible display device 4 includes a central portion 4c-3 that is supported by the movable support member 7 and both side portions 4c-1 and 4c-2 that are not supported by another member. When the first body 1 and the second body 2 change from the unfolded position to the folded position, the third part 4c of the flexible display device 4 tends to be bent downward, that is, convexly toward the first body 1 and the second body 2. When the third part 4c of the flexible display device is bent, the central portion 4c-3 is supported by the movable support member 7 and both portions 4c-1 and 4c-2 are received in the first receiver 122 and the second receiver 222 that are concave. Also, while the first body 1 and the second body 2 change from the unfolded position to the folded position, although the amount of the third part 4c of the flexible display device 4 that is bent is less than the amount of the movable support member 7 that retreats, the third part 4c may be naturally bent to be received in the first receiver 122 and the second receiver 222. Accordingly, while the first body 1 and the second body 2 change from the unfolded position to the folded position, the problem that the third part 4c is not convexly bent downward but is convexly bent upward due to a lack of the amount of the movable support member 7 that retreats may be solved.

In this configuration, when the first body 1 and the second body 2 are located at the unfolded position, the third part 4c of the flexible display device 4 may be supported by the movable support member 7 and thus may be spread flat. Also, when the first body 1 and the second body 2 are in the folded position, a space in which the curved portion 4d may be received may be secured due to retreat of the movable support member 7 from the flexible display device 4. Additionally, when the first body 1 and the second body 2 change from the unfolded position to the folded position, the flexible display device 4 may be naturally bent downward to form the curved portion 4d. Furthermore, even when the first body 1 and the second body 2 change from the folded position to the unfolded position, the first receiver 122 and the second receiver 222 allow the third part 4c to be maintained in the downwardly bent state.

According to a connection structure including the first gear 35-1 and the second gear 35-2 of FIGS. 8A, 8B, 8C, 9, and 10, the first body 1 and the second body 2 synchronously pivot during a folding/unfolding process. Hence, the movable support member 7 may also be stably elevated without being inclined to any side during the folding/unfolding process. Also, since the elastic unit applies an elastic force so that the first body 1 and the second body 2 unfold or fold, the movable support member 7 may be naturally elevated due to the elastic force of the elastic unit.

The guide portions 73-1 and 73-2 and the slots 72 may be provided at at least two positions in the width direction W of the foldable device 100 in order not to tilt the movable support member 7 when the movable support member 7 is elevated. The guide portions 73-1 and the slots 72 are provided at four positions in the width direction W of the foldable device 100 of the present exemplary embodiment. At least one elastic unit is used, and two elastic units may be used in order to keep balance in the width direction in the present exemplary embodiment.

A movement of the guide portions 73-1 and 73-2 in a width direction 72W of the slots 72 is blocked and a movement of the guide portions 73-1 and 73-2 in the longitudinal direction 72L of the slots 72 is allowed. That is, a movement of the movable support member 7 in an elevation direction is blocked by the guide portions 73-1 and 73-2. Accordingly, when the movable support member 7 is elevated, the movable support member 7 may be stably elevated without being shaken in the elevation direction. Also, even when the first body 1 and the second body 2 are in the unfolded position, the movable support 71 of the movable support member 7 may not be inclined and may stably and evenly support the third part 4c of the flexible display device 4.

Figure 21A:
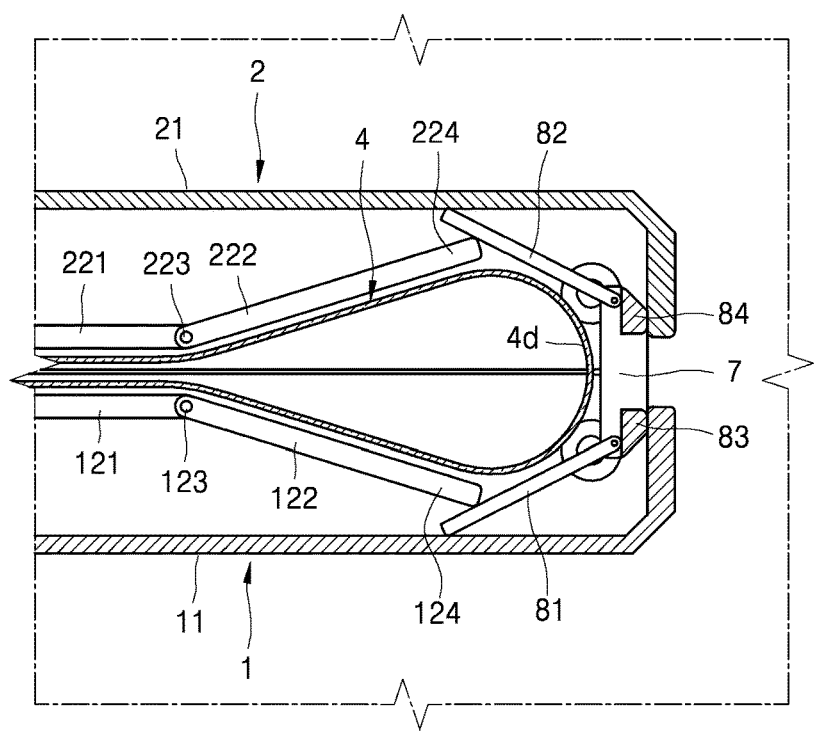
FIG. 21A is a side view of the foldable device, illustrating a state where the first body and the second body are in the folded position, according to an exemplary embodiment.
Figure 21B:
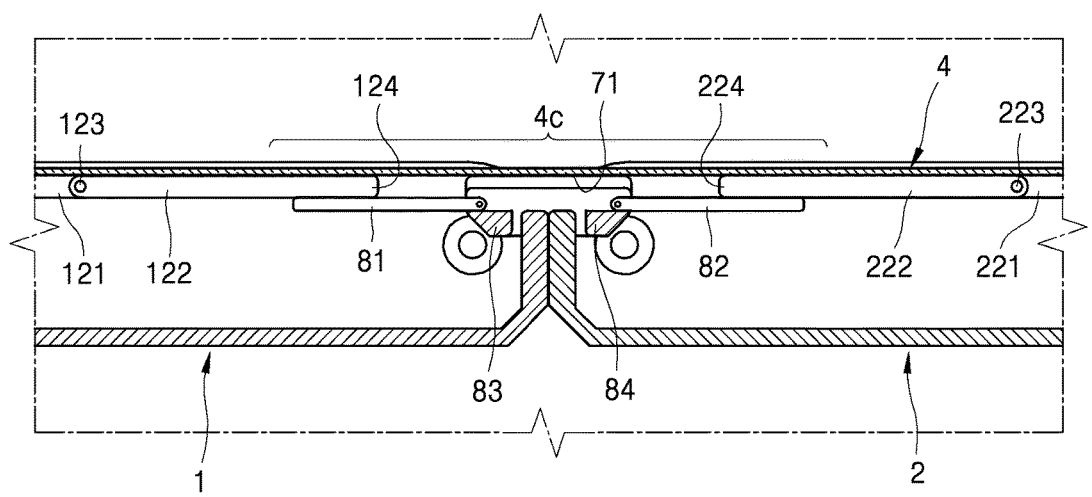
FIG. 21B is a side view of the foldable device, illustrating a state where the first body and the second body are located at the unfolded position, according to an exemplary embodiment.

FIGS. 21A and 21B are side views illustrating the foldable device 100 according to another exemplary embodiment. FIG. 21A illustrates a state where the first body 1 and the second body 2 are in the folded position and FIG. 21B illustrates a state where the first body 1 and the second body 2 are in the unfolded position.

Referring to FIGS. 21a and 21B, the first receiver 122 and the second receiver 222 are pivotably coupled to the first support 121 and the second support 221. When the first body 1 and the second body 2 are in the folded position, the first receiver 122 and the second receiver 222 are in a first position that retreats from the flexible display device 4 in order to receive the curved portion 4d of the flexible display device 4. When the first body 1 and the second body 2 are in the unfolded position, the first receiver 122 and the second receiver 222 are in a second position that supports the third part 4c of the flexible display device 4. As the first body 1 and the second body 2 change between the folded position and the unfolded position, the first receiver 122 and the second receiver 222 pivot between the first position and the second position. According to the foldable device 100 of the present exemplary embodiment, the first receiver 122 and the second receiver 222 move between the first position and the second position as the movable support member 7 moves. Pivot levers 81 and 82 for moving the first receiver 122 and the second receiver 222 between the first position and the second position when the first body 1 and the second body 2 change between the folded position and the unfolded position may be provided on the movable support member 7. First end portions of the pivot levers 81 and 82 are pivotably supported on the movable support member 7 and the other (i.e., second) end portions of the pivot levers 81 and 82 are connected to the first receiver 122 and the second receiver 222.

Referring to FIG. 21A, when the first body 1 and the second body 2 are in the folded position, the movement support member 7 is in the retreat position. The curved portion 4d is formed in the third part 4c of the flexible display device 4 and the first receiver 122 and the second receiver 222 are in the first position due to elasticity of the curved portion 4d.

In the state of FIG. 21A, when the first body 1 and the second body 2 unfold, the movable support member 7 approaches toward the flexible display device 4 due to operations of the slots 72 and the guide portions 73-1 and 73-2. As the movable support member 7 approaches toward the flexible display device 4, distal end portions 124 and 224 of the first receiver 122 and the second receiver 222 that are far from hinges 123 and 223 are slowly raised due to the first pivot lever 81 and the second pivot lever 82 and the first receiver 122 and the second receiver 222 approach toward the flexible display device 4.

As shown in FIG. 21B, when the first body 1 and the second body 2 reach the unfolded position, the movable support member 7 reaches the support position and the first receiver 122 and the second receiver 222 are pushed by the first pivot lever 81 and the second pivot lever 82 to pivot about the hinges 123 and 223 and to be located at the second position. In this state, since the first pivot lever 81 and the second pivot lever 82 are supported by stoppers 83 and 84 that are provided on the movable support member 7, the first pivot lever 81 and the second pivot lever 82 no longer pivot. Accordingly, the first receiver 122 and the second receiver 222 are not spaced apart from the flexible display device 4 and are in the second position. The movable support member 7 supports the third part 4c of the flexible display device 4 between the first receiver 122 and the second receiver 222.

In the state of FIG. 21B, when the first body 1 and the second body 2 fold, the movable support member 7 begins to be spaced apart from the flexible display device 4 and the first pivot lever 81 and the second pivot lever 82 are also spaced apart from the flexible display device 4. In this case, the curved portion 4d is slowly formed in the third part 4c of the flexible display device 4 and the first receiver 122 and the second receiver 222 are pushed by the curved portion 4c to begin to pivot about the hinges 123 and 223 toward the first position. Accordingly, a space in which the curved portion 4d is received is formed in the first body 1 and the second body 2. When the first body 1 and the second body 2 reach a position of FIG. 21A, the movable support member 7 reaches the retreat position and the first receiving position 122 and the second receiving position 222 reach the first position.

In this configuration, when the first body 1 and the second body 2 are located at the unfolded position, since the third part 4c of the flexible display device 4 is supported by the movable support member 7 and the first receiver 122 and the second receiver 222, the flexible display device 4 may be stably supported. Also, the third part 4c of the flexible display device 4 may be spread flat.

Figure 22:
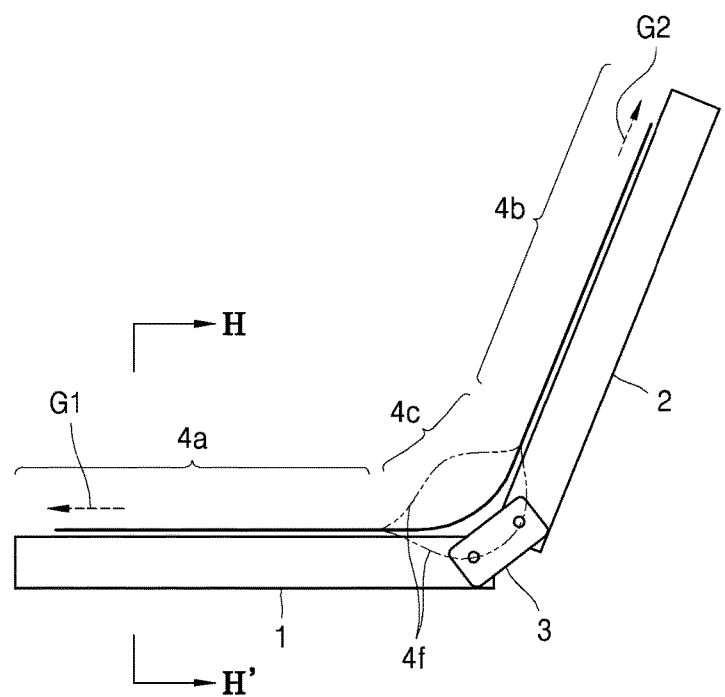
FIG. 22 is a side view illustrating the foldable device according to another exemplary embodiment.
Figure 23:
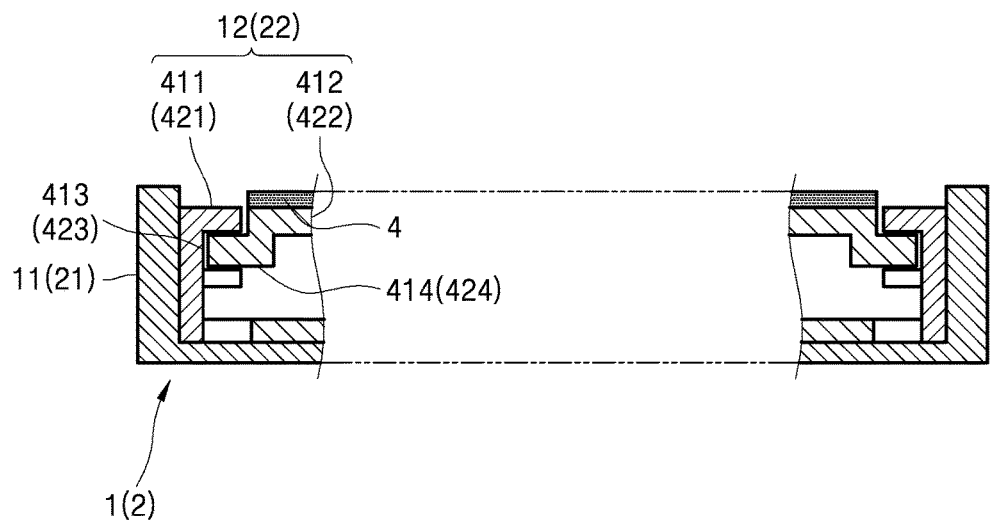
FIG. 23 is a cross-sectional view taken along line H-H' of FIG. 22, according to an exemplary embodiment.

In order to reduce a compressive force or a tensile force applied to the flexible display device 4 during a folding/unfolding process, the first part 4a and/or the second part 4b of the flexible display device 4 may not be bound to the first body 1 and the second body 2. FIG. 22 is a side view illustrating the foldable device 100 according to another exemplary embodiment. FIG. 23 is a cross-sectional view taken along line H-H' of FIG. 22, according to an exemplary embodiment. Referring to FIG. 22, the first part 4a or the second part 4b may be supported on the first body 1 or the second body 2 to move in directions G1 and G2. For example, referring to FIG. 23, the first frame 12 may include a first fixed frame 411 that is fixed to the base cover 11 and a first movable frame 412 that is provided on the first fixed frame 411 to slide in the direction G1. A guide rail 413 may be provided on the first fixed frame 411 and a guide protrusion 414 that is inserted into the guide rail 413 may be provided on the first movable frame 412. Elements of the hinge unit 3, elements of the elastic unit, and the first receiver 122 may be provided on the first fixed frame 411. The first support 121 that supports the first part 4a of the flexible display device 4 may be provided on the first movable frame 412.

In this configuration, since the first part 4a of the flexible display device 4 acts as a free end during a folding/unfolding process, a compressive force or a tensile force applied to the flexible display device 4 may be reduced. Accordingly, the possibility that the third part 4c of the flexible display device 4 tends to be deformed to have a concave or convex shape 4f of FIG. 22 may be reduced.

The second part 4b of the flexible display device 4 may also act as a free end. To this end, as shown in FIG. 23, the second frame 22 may include a second fixed frame 421 that is fixed to the second base cover 21 and a second movable frame 422 that is provided on the second fixed frame 421 to slide in the direction G2. A guide rail 423 may be provided on the second fixed frame 421 and a guide protrusion 424 that is inserted into the guide rail 423 may be provided on the second movable frame 422. Elements of the hinge unit 3, elements of the elastic unit, and the second receiver 222 may be provided on the second fixed frame 421. The second support 221 that supports the second part 4b of the flexible display device 4 may be provided on the second movable frame 422.

Figure 24:
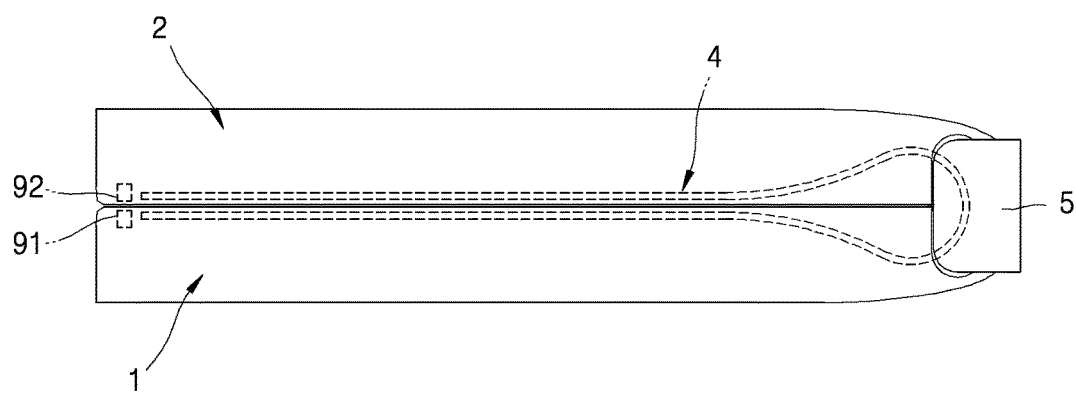
FIG. 24 is a side view illustrating the foldable device according to another exemplary embodiment.
Figure 25:
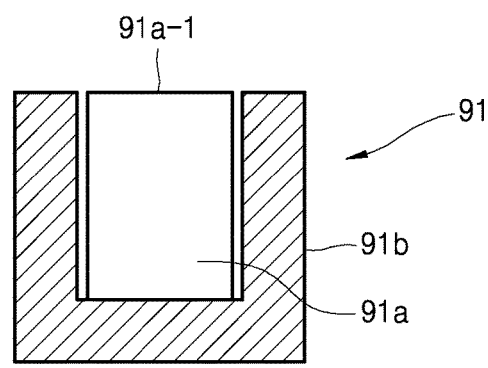
FIG. 25 is a cross-sectional view illustrating a magnetic member according to an exemplary embodiment.

Since the flexible display device 4 is elastic, even when the first body 1 and the second body 2 fold as shown in FIG. 3, the first body 1 and the second body 2 may not completely fold due to a restoring force of the curved portion 4d of the flexible display device 4. The foldable device 100 of the present exemplary embodiment maintains the first body 1 and the second body 2 at the folded position due to a magnetic force. FIG. 24 is a side view illustrating the foldable device 100 according to another exemplary embodiment. FIG. 25 is a cross-sectional view illustrating a magnetic member 91 according to an exemplary embodiment. Referring to FIG. 24, the magnetic member 91 is provided in the first body 1, and an attachment member 92 that faces the magnetic member 91 at the folded position and is attached to the magnetic member 91 due to a magnetic force is provided in the second body 2.

In this configuration, since the magnetic member 91 and the attachment member 92 are attached to each other when the first body 1 and the second body 2 are in the folded position, the first body 1 and the second body 2 may be maintained in the folded state, thereby improving portability and storage.

Referring to FIG. 25, the magnetic member 91 may include a permanent magnet 91a and a magnetic shielding member 91b that surround surfaces of the permanent magnet 91a other than a surface 91a-1a that faces the attachment member 92. The magnetic shielding member 91b may be, for example, a ferromagnetic member. In this configuration, a magnetic force of the permanent magnet 91a may not affect neighboring electrical and electronic circuits. Since the magnetic shielding member 91b functions as a yoke of a magnetic circuit, the magnetic shielding member 91b may concentrate a magnetic force of the permanent magnet 91a on the attachment member 92 to increase a magnetic attachment force.

The attachment member 92 may be formed of any material if it may be attached to the magnetic member 91. For example, the attachment member 92 may be formed of a metal. Also, the attachment member 92 may have the same structure as that of the magnetic member 91 of FIG. 23.

<Second Exemplary Embodiment>

One or more exemplary embodiments include a foldable device that may stably support a flexible display device. Also, one or more exemplary embodiments include a foldable device that may reduce a stress applied to a flexible display device during a folding/unfolding process. Also, one or more exemplary embodiments include a foldable device that may have an improved an outer appearance.

According to one or more exemplary embodiments, a foldable device includes: a body that includes first and second bodies; a flexible display device that is supported on the first body and the second body; a hinge unit that is disposed between the first body and the second body and foldably connects the first body and the second body; and a flexible guide member that is disposed on the body to cross the hinge unit and is elastically bent during a folding/unfolding process to reduce a stress applied to the flexible display device.

The guide member may be disposed between neutral surfaces of the flexible display device and the hinge unit.

The hinge unit may be connected to at least one of the first body and the second body to move relative to the at least one of the first body and the second body, and the guide member may be connected to at least one of the first body and the second body to move relative to the at least one of the first body and the second body.

When ΔL2 and ΔL3 are respectively the amounts of movement of the guide member and the hinge unit relative to the body during the folding/unfolding process, the guide member and the hinge unit may be connected to the body to satisfy ΔL2/ΔL3=C2 (where C2 is a constant).

When NS1 is a neutral surface of the flexible display device, NS2 is a neutral surface of the guide member, NS3 is a neutral surface of the hinge unit, and d12, d23, and d13 are respectively distances between the neutral surface NS1 and the neutral surface NS2, between the neutral surface NS2 and the neutral surface NS3, and between the neutral surface NS1 and the neutral surface NS3, it may be satisfied that d23=d13−d12=C1 (where C1 is a constant), d12/d13=ΔL2/ΔL3=C2 (where C2 is a constant), d13=C1/(1−C2).

The foldable device may include a movement amount control unit (e.g., movement amount controller) that connects the hinge unit and the guide member to the body so that a ratio of the amount of movement of the hinge unit and the amount of movement of the guide member relative to the body is constant.

The movement amount control unit may include: a first lever that pivots about a shaft provided on the hinge unit and includes a first post; a first slot that is formed (e.g., included) in the body and into which the first post is inserted; a second lever that is coupled to the first post, pivots along with the first lever, and includes a second post; and a second slot that is formed in the guide member and into which the second post is inserted, wherein a distance between the shaft and the first post is greater than a distance between the first post and the second post.

When a distance between the shaft and the first post is RA1, a distance between the first post and the second post is RA2, a distance between the neutral surface of the flexible display device and the neutral surface of the guide member is d12, and a distance between the neutral surface of the flexible display device and the neutral surface of the hinge unit is d13, it may be satisfied that d12/d13=RA2/RA1.

The hinge unit may be connected to the first body and the second body to move relative to the first body and the second body, and the guide member may be connected to the first body and the second body to move relative to the first body and the second body.

The hinge unit may be connected to the first body and the second body to move relative to the first body and the second body.

The hinge unit may move in a symmetric matter relative to the first body and the second body.

The hinge unit may include a first connection portion and a second connection portion that are respectively connected to the first body and the second body, the guide member may include first and second guide members that are spaced apart from each other in a width direction perpendicular to a folding/unfolding direction, one end portion of the first guide member may be fixed to the first body and the other end portion of the first guide member may be connected to the second connection portion to move relative to the second body along with the hinge unit, and one end portion of the second guide member may be fixed to the second body and the other end portion of the second guide member may be connected to the first connection portion to move relative to the first body along with the hinge unit.

When a distance between the neutral surface of the flexible display device and a neutral surface of the first guide member and the second guide member is d12 and a distance between the neutral surface of the first guide member and the second guide member and the neutral surface of the hinge unit is d23, it may be satisfied that d12=d23.

According to one or more exemplary embodiments, a foldable device includes: a first body and a second body; a flexible display device that is supported on the first body and the second body; a hinge unit that is disposed between the first body and the second body, foldably connects the first body and the second body, and is connected to the first body and the second body to move relative to the first body and the second body; and a movement limiting unit that maintains the first body and the second body symmetric with each other about the hinge unit during a folding/unfolding process.

The hinge unit may include a first connection portion and a second connection portion that are respectively connected to the first body and the second body, and the movement limiting unit may include a first guide member whose one end portion is fixed to the first body and whose other end portion is connected to the second connection portion and moves relative to the second body along with the hinge unit, and a second guide member that is spaced apart from the first guide member in a width direction perpendicular to a folding/unfolding direction and whose one end portion is fixed to the second body and whose other end portion is connected to the first connection portion and moves relative to the first body along with the hinge unit.

The first guide member and the second guide member may be spaced apart from each other in the width direction that intersects the folding/unfolding direction.

The first guide member and the second guide member may have sheet shapes that may be elastically bent.

When a distance between a neutral surface of the flexible display device and a neutral surface of the first guide member and the second guide member is d12 and a distance between the neutral surface of the first guide member and the second guide member and a neutral surface of the hinge unit is d23, it may be satisfied that d12=d23.

A second exemplary embodiment of the foldable device will now be explained in detail.

Figure 26:
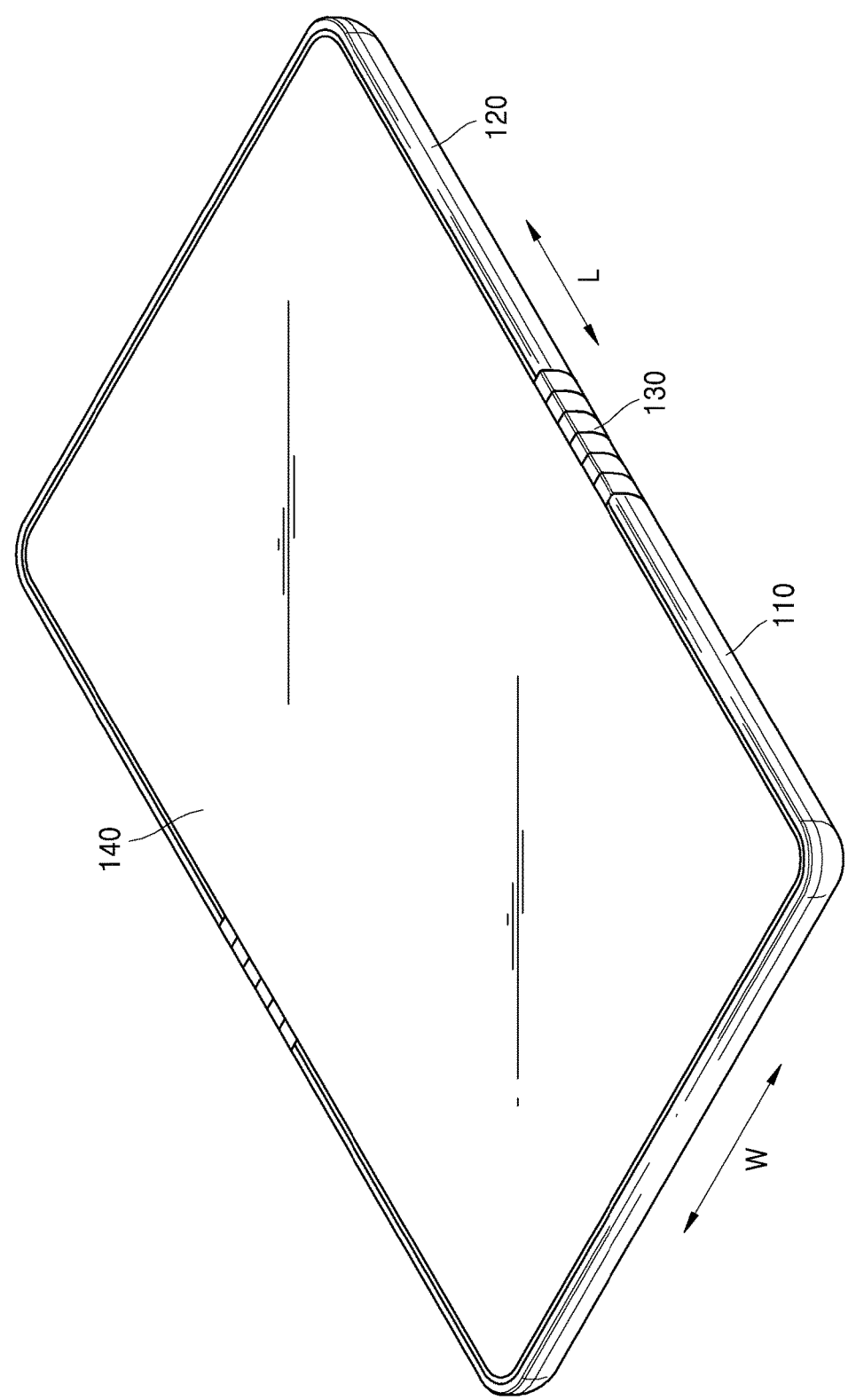
FIG. 26 is a perspective view illustrating an outer appearance of a foldable device according to an exemplary embodiment.
Figure 27:
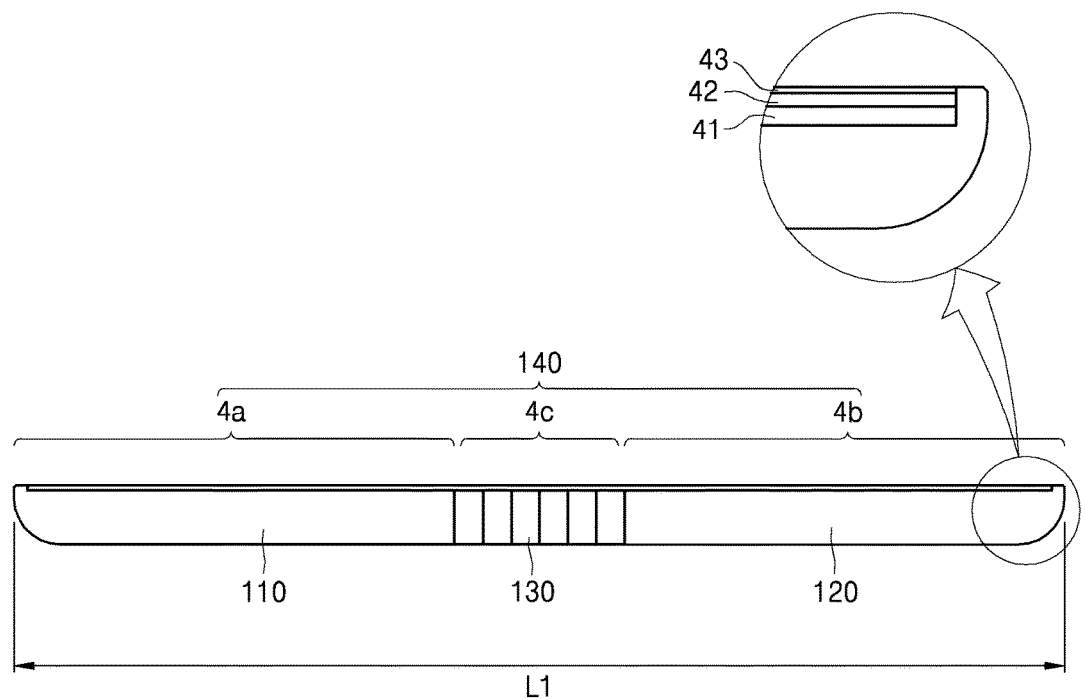
FIG. 27 is a side view illustrating a state where the foldable device of FIG. 26 unfolds, according to an exemplary embodiment.
Figure 28:
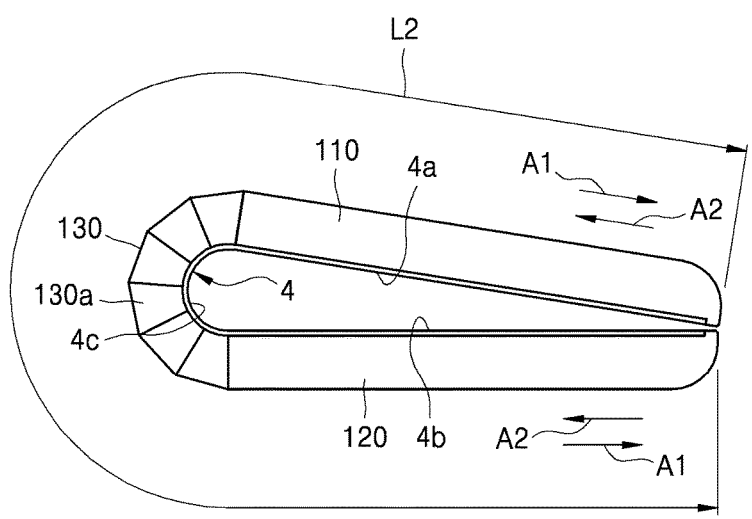
FIG. 28 is a side view illustrating a state where the foldable device of FIG. 26 folds, according to an exemplary embodiment.

FIG. 26 is a perspective view illustrating an outer appearance of a foldable device according to an exemplary embodiment. FIG. 27 is a side view illustrating a state where the foldable device of FIG. 26 unfolds, according to an exemplary embodiment. FIG. 28 is a side view illustrating a state where the foldable device of FIG. 26 folds, according to an exemplary embodiment.

Referring to FIGS. 26 through 28, the foldable device includes a body, a flexible display device 140, and a hinge unit 130. The body includes a first body 110 and a second body 120. The flexible display device 140 is supported by the first body 110 and the second body 120. For example, the flexible display device 140 may be adhered to the first body 110 and the second body 120 by using an adhesive unit such as an adhesive or a double-sided tape. The hinge unit 130 is disposed between the first body 110 and the second body 120 and foldably connects the first body 110 and the second body 120. A folding/unfolding direction of the first body 110 and the second body 120 is the longitudinal direction L.

The foldable device may be a portable mobile device such as a communication terminal, a game player, a multimedia device, a portable computer, a personal digital assistant, a photographing apparatus, etc. However, it is understood that one or more other exemplary embodiments are not limited thereto, and the foldable device may be any device including the first body 110 that supports the first part 4a of the flexible display device 140 and the second body 120 that supports the second part 4b of the flexible display device 140, wherein the first body 110 and the second body 120 are foldably connected to each other by using the hinge unit 130.

The flexible display device 140 may include the flexible display panel 41 that displays an image and the transparent protective panel 43 that is disposed outside the flexible display panel 41. Also, the flexible display device 140 may further include the touch panel 42 as an input unit. The touch panel 42 may be disposed between the transparent protective panel 43 and the flexible display panel 41. However, it is understood that one or more other exemplary embodiments are not limited thereto, and the flexible display device 4 may further include any of various other optical panels or optical films.

A processing unit (e.g., processor) and an input/output unit (e.g., input/output device) for performing operations according to the use of the foldable device may be provided on the first body 110 and the second body 120. When the foldable device is a multimedia terminal that provides images and music to a user, the processing unit may include an image/audio information processing unit. When the foldable device is a communication terminal, the processing unit may include a communication module. The input/output unit may include an image/audio input/output unit (e.g., image/audio input/output device) and a manipulation unit (e.g., manipulator or manipulation device) for user manipulation. The manipulation unit may be realized by using the touch panel 42 of the flexible display device 140

The flexible display device 140 may be divided into the first part 4a that is coupled to the first body 110, the second part 4b that is coupled to the second body 120, and the third part 4c between the first body 110 and the second body 120. For example, the flexible display device 140 may be adhered to the first body 110 and the second body 120 by using an adhesive unit such as an adhesive or a double-sided tape. The third part 4c of the flexible display device 140 is not fixed to the hinge unit 130. When the third part 4c of the flexible display device 140 is bent, the foldable device may fold as shown in FIG. 28. When the foldable device folds, the hinge unit 130 is disposed outside the flexible display device 140 to form a curved portion 130a having a predetermined curvature as shown in FIG. 28. In this state, the hinge unit 130 may no longer be bent and the third part 4c of the flexible display device 140 may be protected from being further bent. The hinge unit 130 may have any of various structures for foldably connecting the first body 110 and the second body 120. For example, the hinge unit 130 may have a chain structure in which a plurality of segment members are pivotably connected to one another or a structure that is elastically bent.

When the foldable device changes from an unfolded state of FIG. 27 to a folded state of FIG. 28, a length of the flexible display device 140 does not change. When a member having a planar shape is bent, an inner surface is compressed and an outer surface is in tension, about a boundary surface between the inner surface and the outer surface of the member. The boundary surface whose length remains constant is referred to as a neutral surface. In principle, a sum of horizontal forces applied to the neutral surface is '0'. When a stress $\sigma_i$ applied to the neutral surface is integrated with respect to an area A over which the stress $\sigma_i$ is applied, $$\sum_i \int_i \sigma_i dA = 0$$

and a surface having a value of '0' becomes the neutral surface.

A length of a neutral surface of the flexible display device 140 does not change whereas lengths of an inner surface and an outer surface of the flexible display device 140 change. However, since a thickness of the flexible display device 140 is small, the lengths of the inner surface and the outer surface very slightly change. Accordingly, it may be assumed that a length of the flexible display device 140 does not change.

When the foldable device folds as shown in FIG. 28, the flexible display device 140 is located inside and the hinge unit 130 is located outside. Accordingly, a length L2 (see FIG. 28) of the first body 110 and the second body 120 and the hinge unit 130 in the folded state is greater than a length L1 (see FIG. 27) of the first body 110 and the second body 120 and the hinge unit 130 in the unfolded state. Hence, assuming that a length of the flexible display device 140 does not change, when the foldable device changes from the unfolded state to the folded state, the hinge unit 130 that is located outside moves in a direction A2 relative to the first body 110 and the second body 120. In contrast, when the foldable device changes from the folded state to the unfolded state, the hinge unit 130 moves in a direction A1 relative to the first body 110 and the second body 120. In this regard, the hinge unit 130 is connected to the first body 110 and the second body 120 to slide in the longitudinal direction L. A movement of the hinge unit 130 in the directions A1 and A2 relative to the first body 110 and the second body 120 may be a movement of the first body 110 and the second body 120 in the directions A2 and A1 relative to the hinge unit 130. Relative movements of the hinge unit 130 and the first body 110 and the second body 120 will now be explained as a movement of the hinge unit 130 relative to the first body 110 and the second body 120. The hinge unit 130 may be movably connected to any one of the first body 110 and the second body 120 and may be fixedly connected to the other of the first body 110 and the second body 120. Alternatively, the hinge unit 130 may be movably connected to both the first body 110 and the second body 120. A structure in which the hinge unit 130 is movably connected to both the first body 110 and the second body 120 will now be explained.

Figure 29:
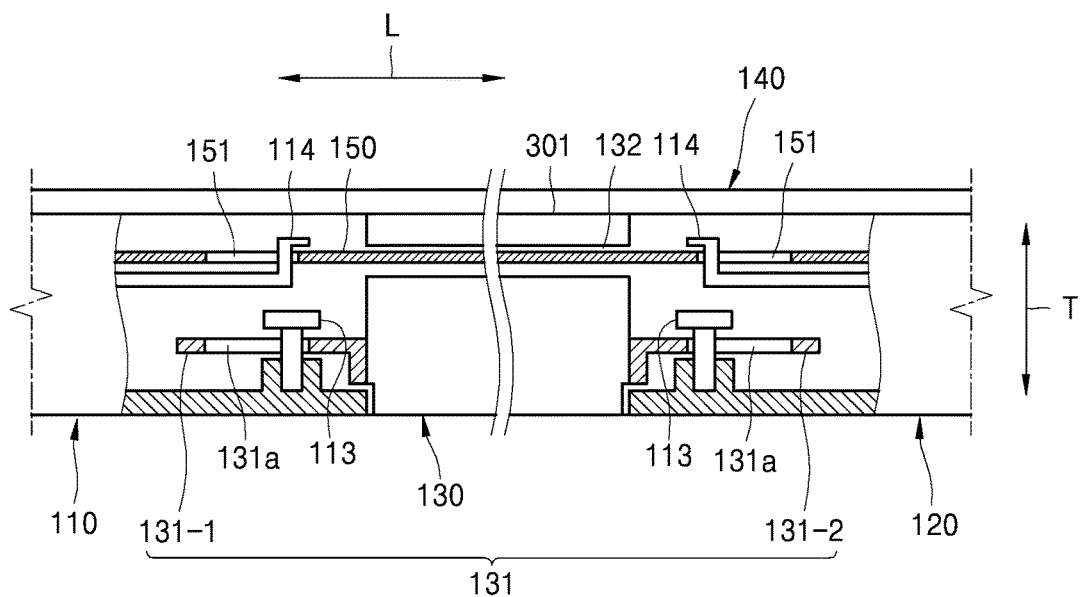
FIG. 29 is a cross-sectional view illustrating the foldable device according to another exemplary embodiment.

FIG. 29 is a cross-sectional view illustrating the foldable device according to another exemplary embodiment. Referring to FIG. 29, in the present exemplary embodiment, the hinge unit 130 is connected to the first body 110 and the second body 120 to slide in the longitudinal direction L. For example, the hinge unit 130 includes a connection bracket 131 on which a first rail 131a is provided. The connection bracket 131 includes first and second connection brackets 131-1 and 131-2. The first and second connection brackets 131-1 and 131-2 are respectively disposed on both sides of the hinge unit 130 in the longitudinal direction L. The first connection bracket 131-1 is connected to the first body 110 and the second connection bracket 131-2 is connected to the second body 120. A second rail 113 that is coupled to the first rail 131a and guides the hinge unit 130 to slide relative to the first body 110 and the second body 120 is provided on each of the first body 110 and the second body 120. For example, the first rail 131a may be a slot that extends in the longitudinal direction L and the second rail 113 may be a protrusion that is inserted into the slot, or vice versa.

In this configuration, when the foldable device changes between the folded position and the unfolded position, the hinge unit 130 slides in the directions A1 and A2 relative to the first body 110 and the second body 120. In this case, since a length of the flexible display device 140 does not change, a stress may be applied to the flexible display device 140 due to a force for making the foldable device fold and unfold.

Referring to FIG. 29, a flexible guide member 150 is disposed on the first body 1 and the second body 2 to cross the hinge unit 130, and reduces a stress applied to the flexible display device 140 by being elastically bent during a folding/unfolding process. The guide member 150 having a flexible sheet shape that is elastically bent may be formed of (e.g., include), for example, a metal thin film or a plastic film. The guide member 150 may be provided on the first body 110 and the second body 120 to slide relative to at least one of the first body 110 and the second body 120. For example, if the hinge unit 130 slides relative to the first body 110, the guide member 150 slides relative to the first body 110. Also, when the hinge unit 130 slides relative to the first body 110 and the second body 120, the guide member 150 also slides relative to the first body 110 and the second body 120. The guide member 150 distributes a stress applied to the flexible display device 140 when the foldable device changes between the folded state and the unfolded state. That is, the guide member 150 reduces a stress applied to the flexible display device 140 by being elastically bent or spread to absorb part of a force for making the foldable device fold and unfold.

The guide member 150 is disposed between the flexible display device 140 and the hinge unit 130 in a thickness direction T of the foldable device. Specifically, the guide member 150 is disposed between a neutral surface NS1 (see FIG. 30) of the flexible display device 140 and a neutral surface NS3 (see FIG. 30) of the hinge unit 130 in the thickness direction T. The guide member 150 extends toward the first body 110 and the second body 120 across the hinge unit 130. A slot 132 through which the guide member 150 passes may be formed in the hinge unit 130. In order to make the guide member 150 easily bend and spread when the foldable device changes between the folded state and the unfolded state, the guide member 150 and the first body 110 and the second body 120 may be connected to each other to relatively move in the longitudinal direction L. For example, the guide member 150 may be connected to the first body 110 and the second body 120 to slide in the longitudinal direction L. A third rail 151 is provided on the guide member 150, and a fourth rail 114 to which the third rail 151 is slidably coupled is provided on each of the first body 110 and the second body 120. For example, referring to FIG. 29, the third rail 151 may be a slot that is formed in the guide member 150 and extends in the longitudinal direction L, and the fourth rail 114 may be a protrusion that is inserted into the third rail 151.

As shown in FIG. 29, the flexible display device 140 is disposed inside and the guide member 150 and the hinge unit 130 are disposed outside. When the foldable device changes between the folded state and the unfolded state, the sliding (movement) amounts of the hinge unit 130 and the guide member 150 relative to the first body 110 and the second body 120 are different from each other.

Figure 30:
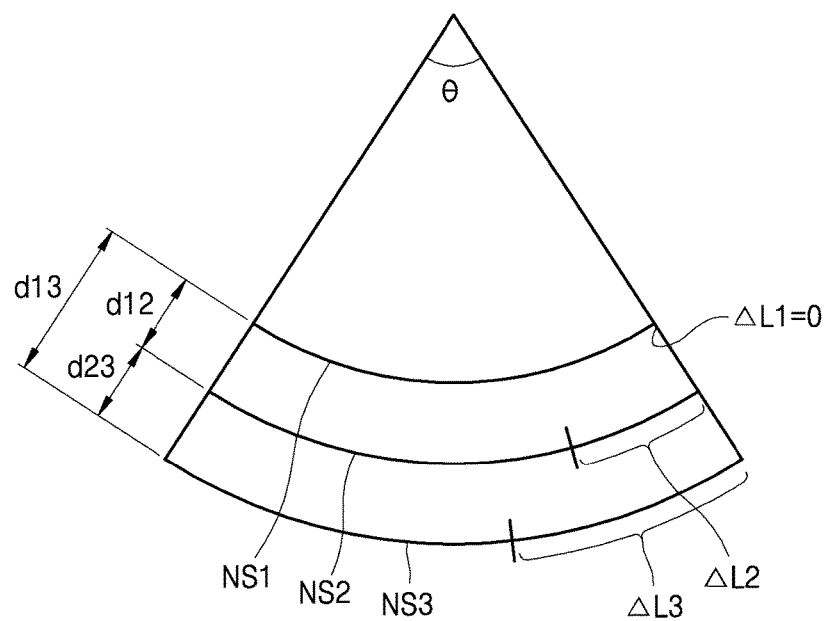
FIG. 30 is a schematic view illustrating the sliding amounts of a hinge unit and a guide member when the first body and the second body in an unfolded state begin to fold to have a predetermined unfolding angle, according to an exemplary embodiment.

FIG. 30 is a schematic view illustrating the sliding amounts of the hinge unit 130 and the guide member 150 when the first body 110 and the second body 120 in an unfolded state begin to fold to have a predetermined unfolding angle θ, according to an exemplary embodiment. In FIG. 30, NS1 is a neutral surface of the flexible display device 140, NS2 is a neutral surface of the guide member 150, and NS3 is a neutral surface of the hinge unit 130. ΔL1, ΔL2, and ΔL3 are respectively the sliding amounts of the flexible display device 140, the guide member 150, and the hinge unit 130 relative to the first body 110 and the second body 120 until the foldable device in the unfolded state reaches the unfolding angle θ. d12, d23, and d13 are respectively distances between the neutral surface NS1 and the neutral surface NS2, between the neutral surface NS2 and the neutral surface NS3, and between the neutral surface NS1 and the neutral surface NS3.

Since a length of the flexible display device 140 does not change, $$\Delta L1=0,$$

$$\Delta L2 = d12 \times \theta, \text{ and}$$

$$\Delta L3 = d13 \times \theta \text{ (where } \theta \text{ is in radians)}.$$

In order to not apply an excessive stress to the flexible display device 140 during a folding/unfolding process, even when the unfolding angle θ changes, the distance d13 is maintained constant. To this end, the distance d23 and ΔL2/ΔL3 are also constant during the folding/unfolding process.

$$d23 = d13 - d12 = C1 \text{ (where } C1 \text{ is a constant)} \quad \text{Equation 1}$$

$$\Delta L2/\Delta L3 = d12/d13 = C2 \text{ (where } C2 \text{ is a constant)} \quad \text{Equation 2}$$

When Equations 1 and 2 are satisfied, d13=C1/(1−C2) and the distance d13 may be maintained constant. In this configuration, a length of the flexible display device 140 may not change during a folding/unfolding process and lengths of the first body 110 and the second body 120 and the hinge unit 130 may naturally change, thereby leading to stable folding/unfolding. Also, a stress applied to the flexible display device 140 during the folding/unfolding process may be reduced due to the guide member 150.

In order to satisfy the above conditions, the foldable device of the present exemplary embodiment includes a sliding amount (movement amount) control unit (e.g., controller) for maintaining constant a ratio of the sliding amount (ΔL3) of the hinge unit 130 and the sliding amount (ΔL2) of the guide member 150 during a folding/unfolding process.

Figure 31:
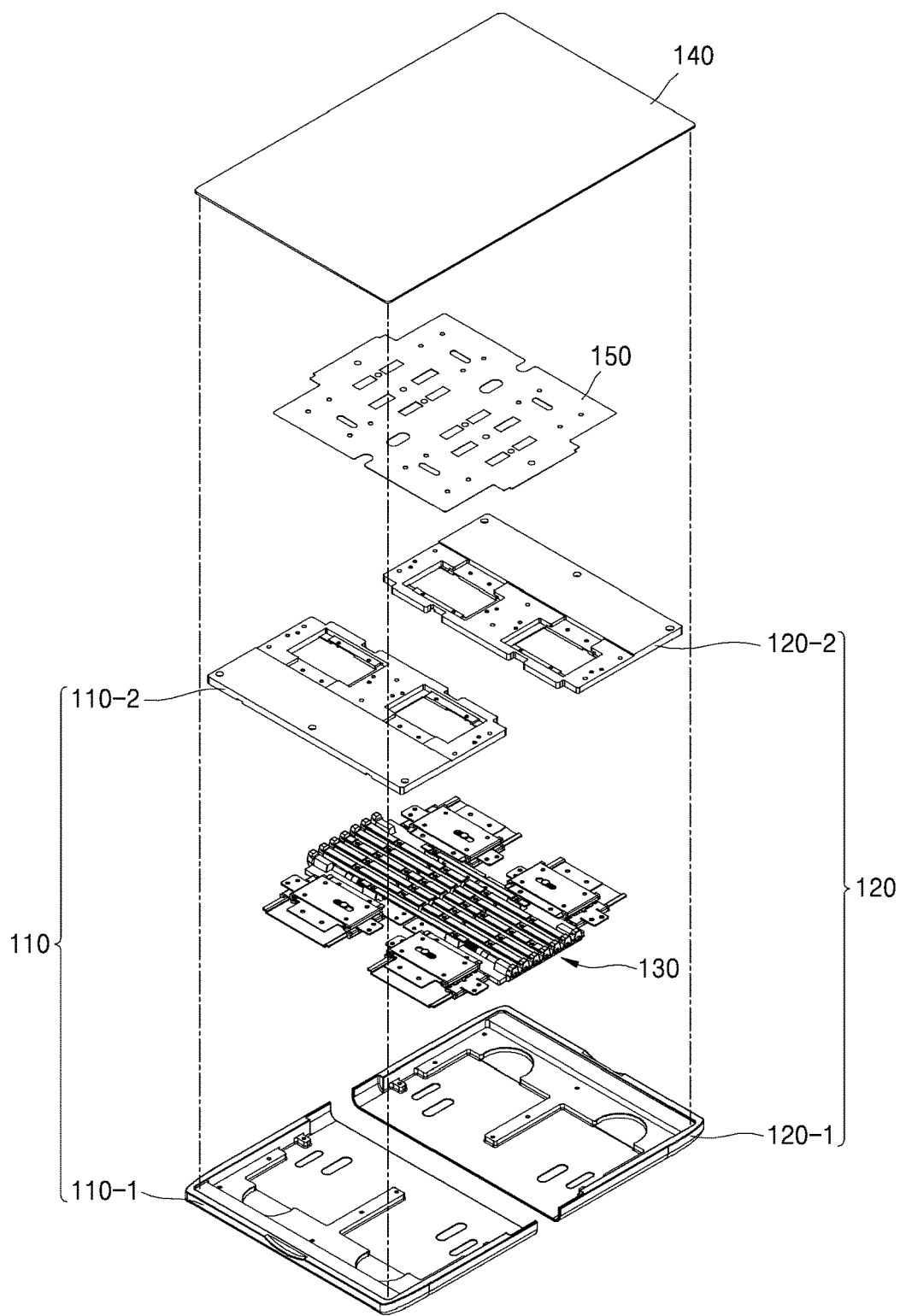
FIG. 31 is an exploded perspective view illustrating the foldable device according to another exemplary embodiment.

FIG. 31 is an exploded perspective view illustrating the foldable device according to another exemplary embodiment. Referring to FIG. 31, the first body 110 includes a base cover 110-1 and a frame 110-2 that is coupled to the base cover 110-1 and supports the first part 4a of the flexible display device 140. The second body 120 includes a base cover 120-1 and a frame 120-2 that is coupled to the base cover 120-1 and supports the second part 4b of the flexible display device 140. For example, the first part 4a and the second part 4b of the flexible display device 140 may be attached to the frames 110-2 and 120-2 by using an adhesive or a double-sided tape.

Figure 32:
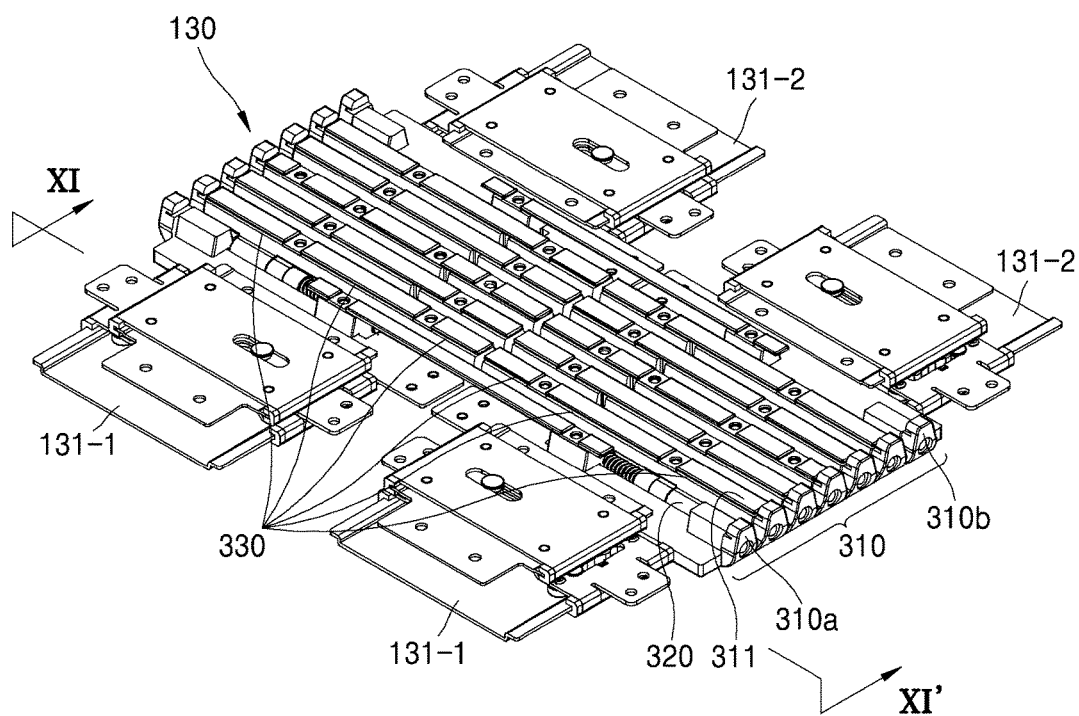
FIG. 32 is a perspective view illustrating the hinge unit according to an exemplary embodiment.
Figure 33:
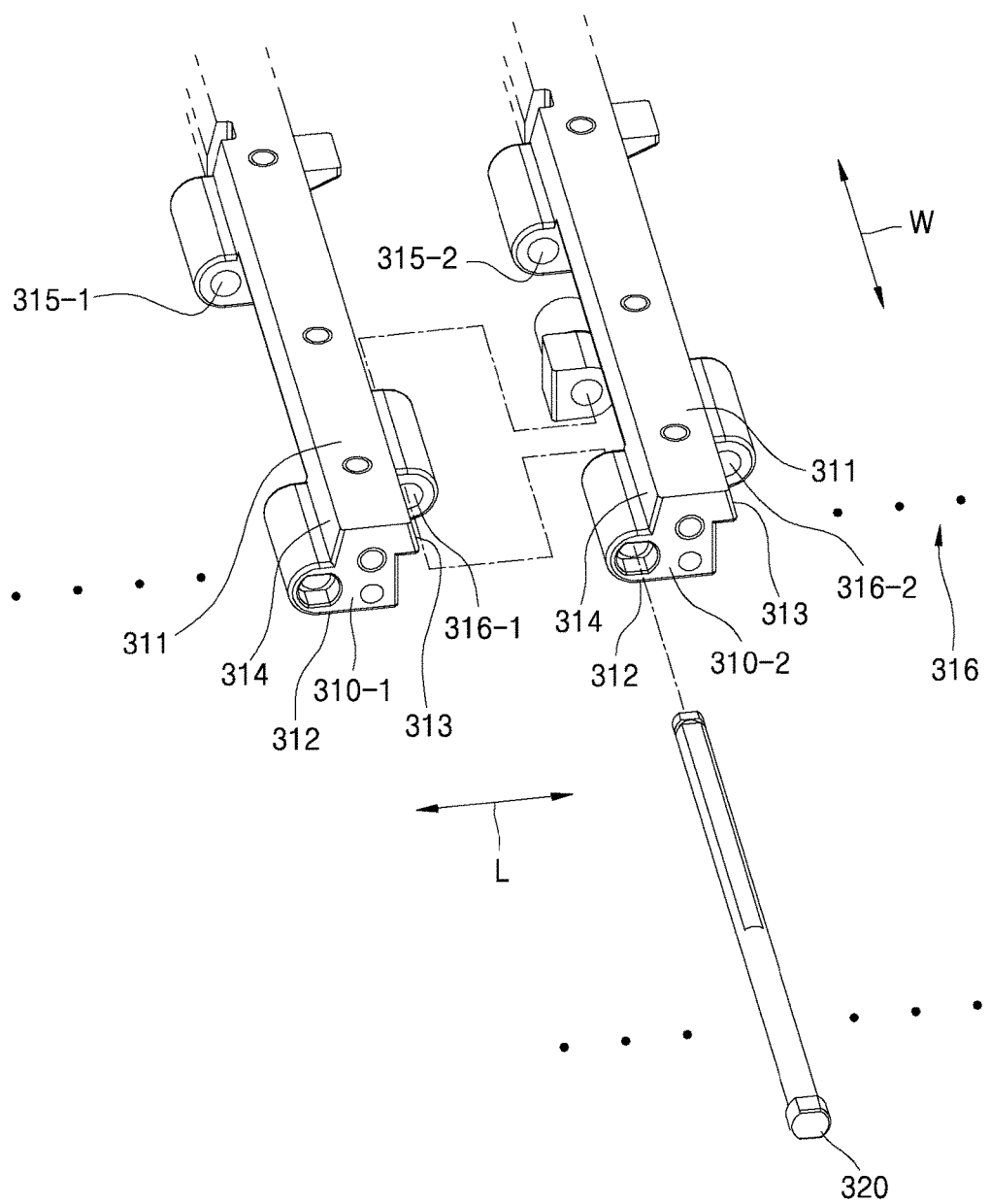
FIG. 33 is an exploded perspective view illustrating a connection relationship between a plurality of segment members, according to an exemplary embodiment.
Figure 34A:
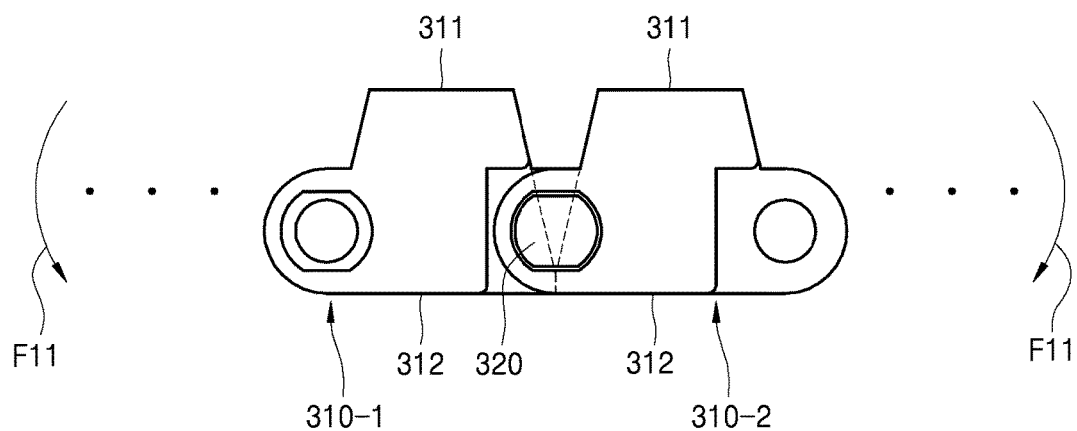
FIGS. 34A and 34B are side views respectively illustrating states where the hinge unit unfolds and folds, according to an exemplary embodiment.
Figure 34B:
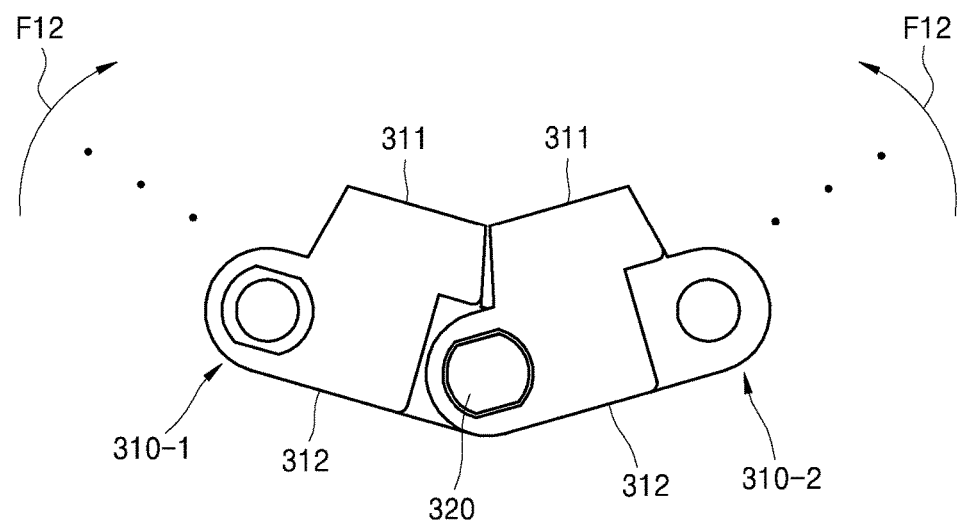

The hinge unit 130 of the present exemplary embodiment has a chain structure. FIG. 32 is a perspective view illustrating the hinge unit 130 according to an exemplary embodiment. FIG. 33 is an exploded perspective view illustrating a connection relationship between a plurality of segment members 310, according to an exemplary embodiment. FIGS. 34A and 34B are side views respectively illustrating states where the hinge unit 130 unfolds and folds, according to an exemplary embodiment.

Referring to FIGS. 32 and 33, the hinge unit 130 includes the plurality of segment members 310 that are arranged in the longitudinal direction L and a plurality of connection members 320 that sequentially pivotably connect the plurality of segment members 310. Two segment members 310a and 310b that are outermost segment members in the longitudinal direction L from among the plurality of segment members 310 are respectively connected to the first body 110 and the second body 120. Slots 132 (see FIG. 29) through which the guide member 150 passes are formed (e.g., provided or included) in the plurality of segment members 310.

Each of the segment members 310 includes an upper end portion 311 and a lower end portion 312. The upper end portion 311 and the lower end portion 312 are respectively inner and outer end portions of the segment member 310 in a direction in which the segment member 310 is bent. One segment member 310 includes a first side portion 313 and a second side portion 314 that connect the upper end portion 311 and the lower end portion 312. The first side portion 313 faces the second side portion of another segment member 310 that is adjacent to the one segment member 310. The upper end portions 311 of the plurality of segment members 310 form a support surface 301 (see FIG. 29) that supports the third part 4c of the flexible display device 140. The third part 4c of the flexible display device 140 may be supported on the upper end portions 311 but may not be attached to the upper end portions 311.

A structure for pivotably connecting the plurality of segment members 310 will now be explained with reference to FIG. 33. A first through-hole 315-1 and a second through-hole 316-1 that extend in the width direction W perpendicular to the folding/unfolding direction, that is, the longitudinal direction L, and are spaced apart from each other in the longitudinal direction L are provided in a segment member 310-1. A first through-hole 315-2 and a second through-hole 316-2 that extend in the width direction W and are spaced apart from each other in the longitudinal direction L are provided in a segment member 310-2 that is adjacent to the segment member 310-1. The second through-hole 316-1 of the segment member 310-1 is aligned with the first through-hole 315-2 of the segment member 310-2. When one connection member 320 having a shaft shape that acts as a pivotal center is inserted into the second through-hole 316-1 and the first through hole 315-2, the segment members 310-1 and 310-2 may be connected to each other to pivot about the connection member 320.

Lengths of the upper end portions 311 of the plurality of segment members 310 are less than lengths of the lower end portions 312 of the plurality of segment members 310. Hence, when the foldable device changes to the folded state, the plurality of segment members 310 pivot so that the upper end portions 311 are closer to each other about the plurality of connection members 320. When the foldable device changes to the unfolded state, the plurality of segment members 310 pivot so that the upper end portions 311 are farther from each other about the plurality of connection members 320.

The lower end portions 312 of the segment members 310-1 and 310-2 that are adjacent to each other contact each other (marked by a dashed line) in the unfolded state of FIG. 34A. Accordingly, even when an external force F11 is applied in the unfolded state, the hinge unit 130 is not bent outward. When the hinge unit 130 is bent outward, a tensile force may be applied to the flexible display device 140 and thus the flexible display device 140 may be separated from the first body 110 and the second body 120 or may be damaged. Such problems may be prevented by using the hinge unit 130 of the present exemplary embodiment that is not bent outward.

In the folded state, the upper end portions 311 of the segment members 310-1 and 310-2 that are adjacent to each other contact each other (see FIG. 34B) or facing side portions of the segment members 310-1 and 310-2, for example, the first side portion 313 of the segment member 310-1 and the second side portion 314 of the segment member 310-2 that is adjacent to the first side portion 313, contact each other. Accordingly, even when an external force F12 is applied in the folded state, the hinge unit 130 may not be bent inward in a state where the curved portion 130a is formed and the third part 4c of the flexible display device 140 may be protected from being sharply bent.

Figure 35:
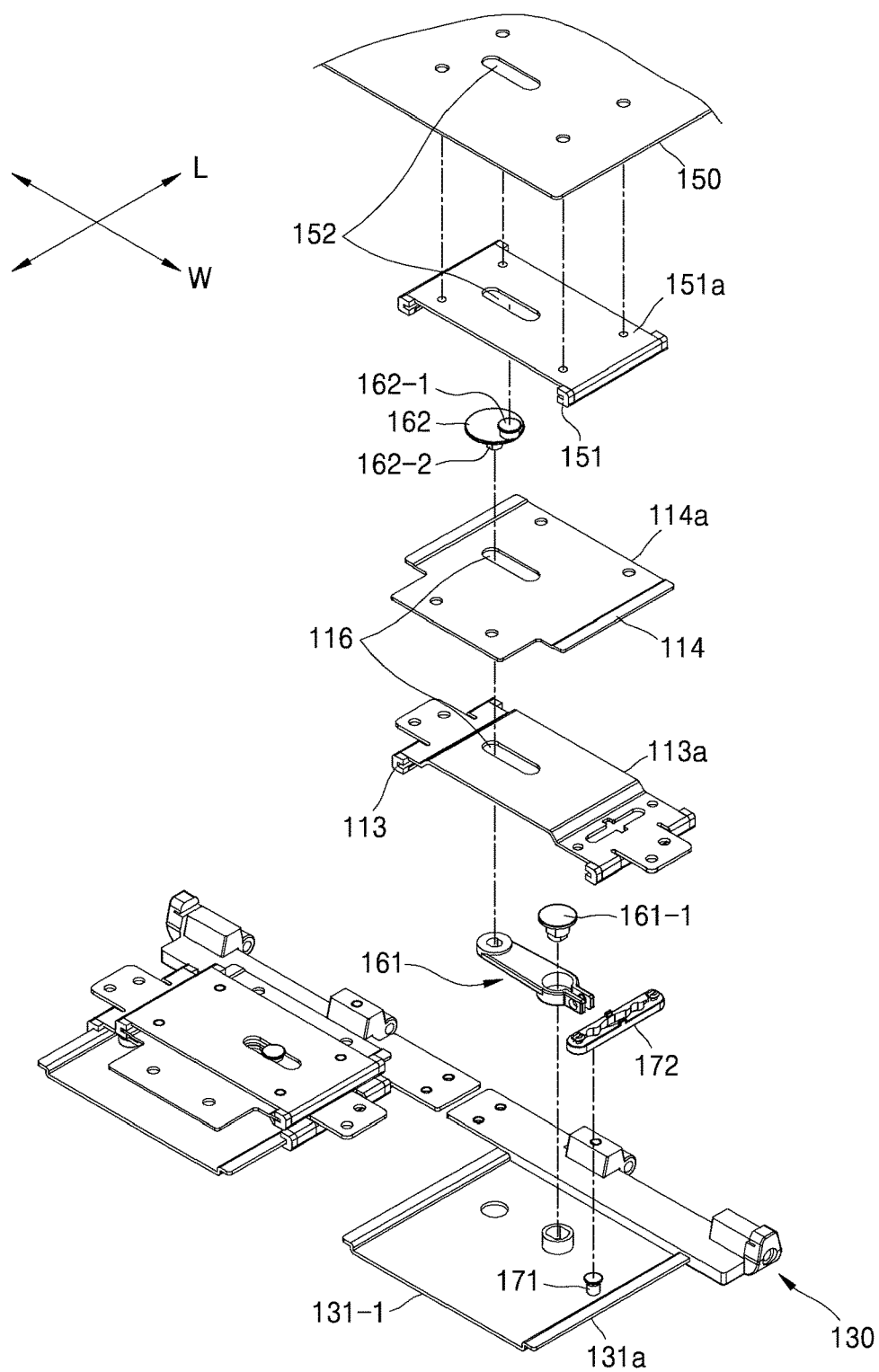
FIG. 35 is an exploded perspective view illustrating a connection relationship between the hinge unit and the guide member and the first body and the second body, according to an exemplary embodiment.
Figure 36:
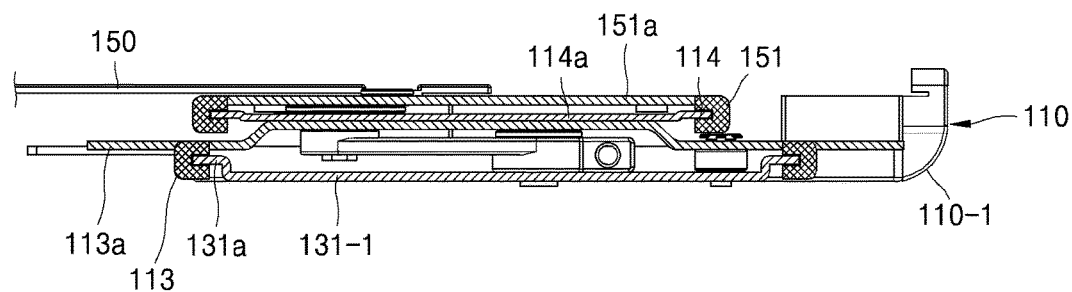
FIG. 36 is a cross-sectional view taken along line X1-X1' of FIG. 32, according to an exemplary embodiment.

The hinge unit 130 may be slidably connected to the first body 110 and the second body 120 as described above. Also, the guide member 150 may be slidably connected to the first body 110 and the second body 120. FIG. 35 is an exploded perspective view illustrating a connection relationship between the hinge unit 130 and the guide member 150 and the first body 110 and the second body 120, according to an exemplary embodiment. Although a connection relationship between the hinge unit 130 and the guide member 150 and the first body 110 is shown in FIG. 35, a connection relationship between the hinge unit 130 and the guide member 150 and the second body 120 is the same as the connection relationship between the hinge unit 130 and the guide member 150 and the first body 110. FIG. 36 is a cross-sectional view taken along line X1-X1' of FIG. 32, according to an exemplary embodiment.

Referring to FIGS. 32, 35, and 36, the first connection bracket 131-1 and the second connection bracket 131-2 are respectively formed on one end portion and the other end portion of the hinge unit 130 in the longitudinal direction L. The first rail 131a is provided on each of the first connection bracket 131-1 and the second connection bracket 131-2. The second rail 113 that is slidably connected to the first rail 131a is provided on the first body 110 and the second body 120. For example, the first rail 131a has an "L"-like cross-sectional shape and extends in the longitudinal direction L and the second rail 113 has a "⊂"-like cross-sectional shape and extends in the longitudinal direction L. In the present exemplary embodiment, the second rail 113 is formed of (e.g., includes) a material having a low friction coefficient such as polyacetal resin or oil-impregnated plastic resin and is coupled to a rail bracket 113a. The rail bracket 113a is coupled to the base cover 110-1.

The third rail 151 is provided on the guide member 150, and the fourth rail 114 to which the third rail 151 is slidably coupled is provided on the first body 110 and the second body 120. For example, the third rail 151 has a "⊂"-like cross-sectional shape and extends in the longitudinal direction L and the fourth rail 114 has an "L"-like cross-sectional shape and extends in the longitudinal direction L. In the present exemplary embodiment, the third rail 151 is formed of (e.g., includes) a material having a low friction coefficient such as polyacetal resin or oil-impregnated plastic resin and is coupled to a rail bracket 151a, and the rail bracket 151a is coupled to the guide member 150. The fourth rail 114 may be formed on a rail bracket 114a that is coupled to the base cover 110-1.

In this configuration, the hinge unit 130 and the guide member 150 may be slidably connected to the first body 110 and the second body 120.

A sliding amount control unit (e.g., controller) for maintaining constant a ratio between the amount of sliding $\Delta L3$ of the hinge unit 130 and the amount of sliding $\Delta L2$ of the guide member 150 will now be explained. Referring to FIG. 35, a first lever 161 is provided on the hinge unit 130 and slides relative to the first body 110 and the second body 120 along with the hinge unit 130. For example, the first lever 161 is pivotably connected to a shaft 161-1 that is provided on the first connection bracket 131-1. A first post 161-2 is provided on the other end portion of the first lever 161. The first post 161-2 is inserted into first slots 116 formed (e.g., included or provided) in the first body 110. For example, the first slots 116 may be formed by cutting the rail brackets 113a and 114a.

Figure 37:
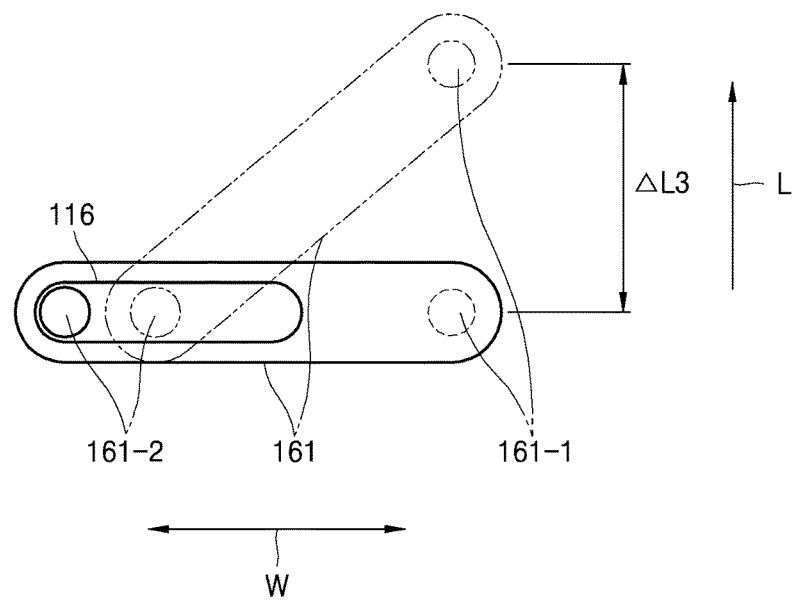
FIG. 37 is a view for explaining an operation of a first lever when the foldable device folds at the unfolding angle, according to an exemplary embodiment.

FIG. 37 is a view for explaining an operation of the first lever 161 when the foldable device folds at the unfolding angle θ, according to an exemplary embodiment. Referring to FIG. 37, the first post 161-2 and the first slots 116 operate as a pivoting unit for making the first lever 161 pivot as the hinge unit 130 slides. When the foldable device folds, the hinge unit 130 moves by the sliding amount $\Delta L3$ in the longitudinal direction L relative to the first body 110, and the shaft 161-1 also moves by the sliding amount $\Delta L3$ in the longitudinal direction L along with the hinge unit 130. Since the first post 161-2 is inserted into the first slots 116 formed in the first body 110, the first post 161-2 does not move in the longitudinal direction L and moves in the width direction W along the first slots 116. Accordingly, the first lever 161 pivots about the shaft 161-1.

Figure 38:
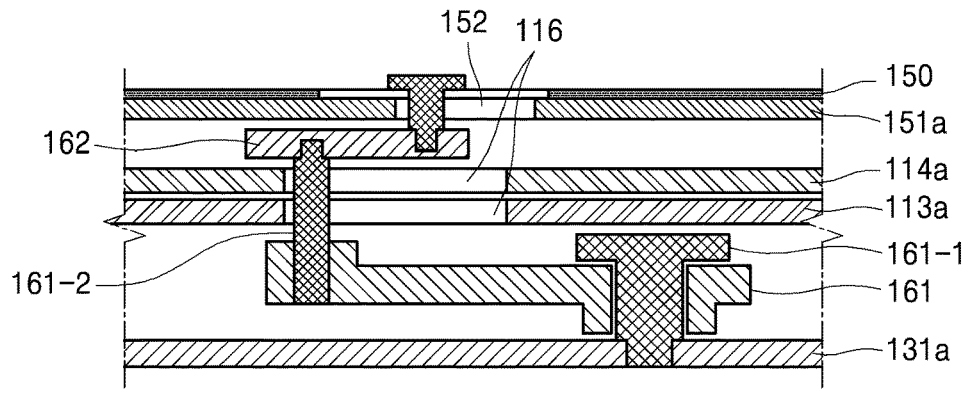
FIG. 38 is a cross-sectional view illustrating a connection relationship between the first lever and a second lever, according to an exemplary embodiment.

FIG. 38 is a cross-sectional view illustrating a connection relationship between the first lever 161 and a second lever 162, according to an exemplary embodiment. Referring to FIGS. 35 and 38, the second lever 162 is connected to the first lever 161. The second lever 162 is fixed to the first lever 161. That is, the second lever 162 pivots along with the first lever 161, and does not pivot relative to the first lever 161. For example, one end portion of the second lever 162 is fixed to the first post 161-2. The second lever 162 pivots as the first lever 161 pivots. A second post 162-1 is provided on the other end portion of the second lever 162. The second post 162-1 is inserted into a second slot 152 formed in the guide member 150. For example, the second slot 152 may be formed by cutting the rail bracket 151a to which the guide member 150 is coupled.

Figure 39A:
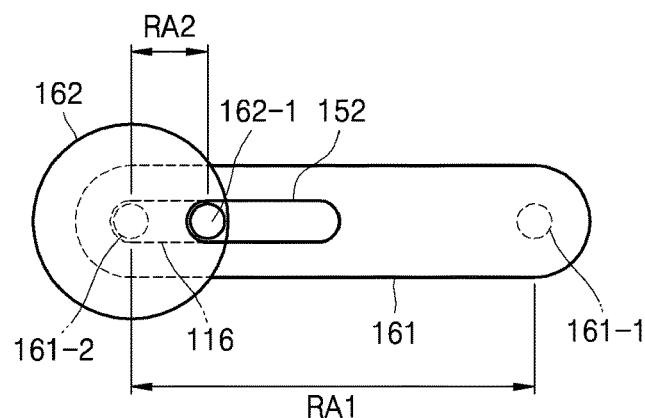
FIGS. 39A and 39B are views for explaining an operation of the second lever when the hinge unit slides, according to an exemplary embodiment.
Figure 39B:
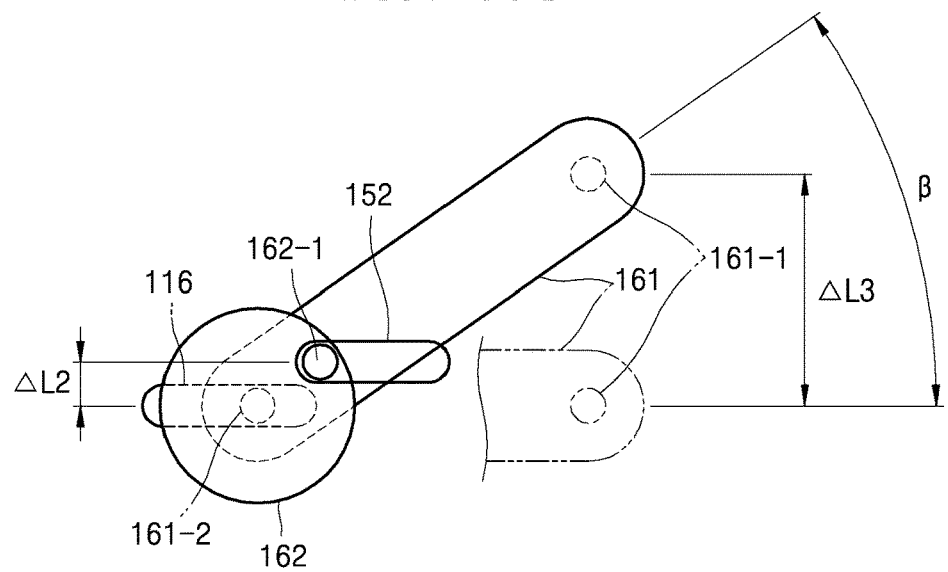

FIGS. 39A and 39B are views for explaining an operation of the second lever 162 when the hinge unit 130 slides, according to an exemplary embodiment. FIGS. 39A and 39B respectively illustrate states of the first lever 161 and the second lever 162 when the foldable device is in the unfolded state and states of the first lever 161 and the second lever 162 when the foldable device is at the unfolding angle θ. When the foldable device folds at the unfolding angle θ from the state of FIG. 39A, the hinge unit 130 slides by the sliding amount $\Delta L3$ in the longitudinal direction L as described with reference to FIG. 37 and the first lever 161 pivots. In this case, the second lever 162 also pivots along with the first lever 161 and the second post 162-1 pushes the second slot 152 in the longitudinal direction L. Accordingly, the second slot 152 moves by the sliding amount $\Delta L2$ in the longitudinal direction L. As a result, the guide member 150 also slides by the sliding amount $\Delta L2$ in the longitudinal direction L.

Since the first lever 161 and the second lever 162 pivot by the same angle β, the sliding amounts $\Delta L3$ and $\Delta L2$ depend on a length of a pivot arm. A length of a pivot arm of the first lever 161, that is, a distance between the shaft 161-1 and the first post 161-2, is RA1 and a length of a pivot arm of the second lever 162, that is, a distance between the first post 161-2 and the second post 162-1, is RA2. Hence, in order to satisfy Equation 2, the distances RA1 and RA2 are determined so that $\Delta L2/\Delta L3 = d12/d13 = RA2/RA1$. That is, a ratio between the length of the pivot arm of the first lever 161 and the length of the pivot arm of the second lever 162 is equal to a ratio between the distance d13 between the flexible display device 140 and the hinge unit 130 and the distance d12 between the flexible display device 140 and the guide member 150. Specifically, the distance d12 is a distance between the neural surface NS1 of the flexible display device 140 and the neutral surface NS2 of the guide member 150, and the distance d13 is a distance between the neutral surface NS1 of the flexible display device 140 and the neutral surface NS3 of the hinge unit 130. The neutral surface NS3 of the hinge unit 130 is a surface where there exist central axes of the plurality of connection members 320 about which the plurality of segment members 310 pivot.

In this configuration, when the foldable device changes between the folded position and the unfolded position, the distances d12, d23, and d13 may be maintained always constant. Accordingly, during a folding/unfolding process, a length of the flexible display device 140 may not change, lengths of the first body 110 and the second body 120 and the hinge unit 130 may naturally change to allow stable folding/unfolding, and a stress applied to the flexible display device 140 during the folding/unfolding process may be reduced due to the guide member 150.

Figure 40:
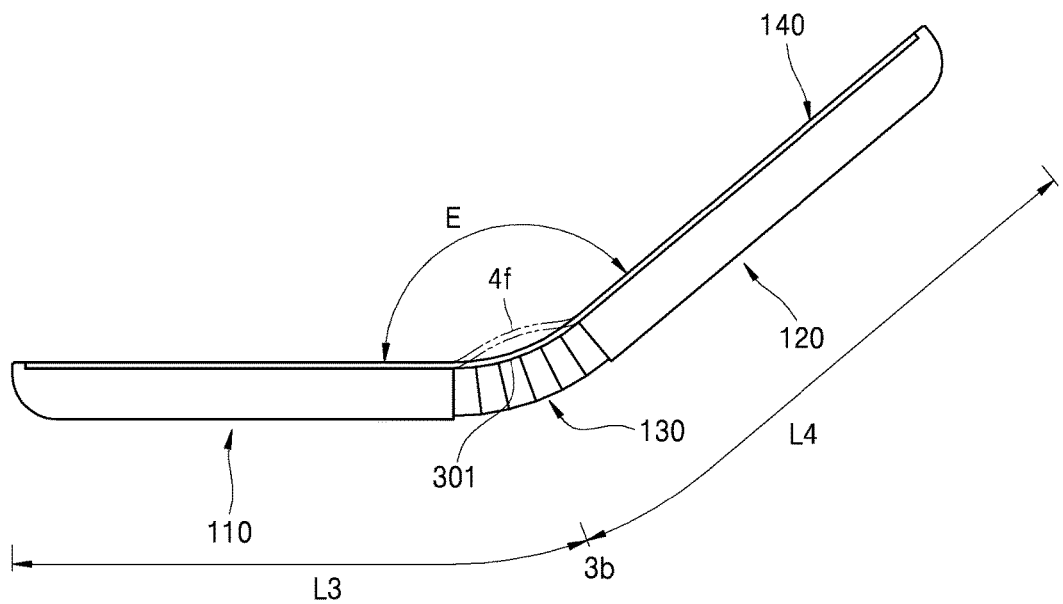
FIG. 40 is a side view illustrating a state where the first body and the second body have a predetermined unfolding angle between the unfolded state and the folded state, according to an exemplary embodiment.

The foldable device may be locked at the unfolded position of FIG. 27 or the folded position of FIG. 28. Also, the foldable device may be locked in a state having the unfolding angle E between the unfolded state and the folded state of the first body 110 and the second body 120 as shown in FIG. 40. The angle E in the folded state is 0° and the angle E in the unfolded state is about 180°. The foldable device of the present exemplary embodiment includes a locking unit (e.g., lock) for locking the first body 110 and the second body 120 in the state having at least one unfolding angle E. For example, the locking unit may be realized so that the hinge unit 130 is stopped and maintained at a predetermined position when the hinge unit 130 slides relative to the first body 110 and the second body 120. Referring to FIG. 35, a locking boss 171 is provided on the connection bracket 131-1. A locking rail member 172 to which the locking boss 171 is slidably connected is provided on the first body 110 and the second body 120. The locking rail member 172 is provided on the rail bracket 113a in the present exemplary embodiment.

Figure 41:
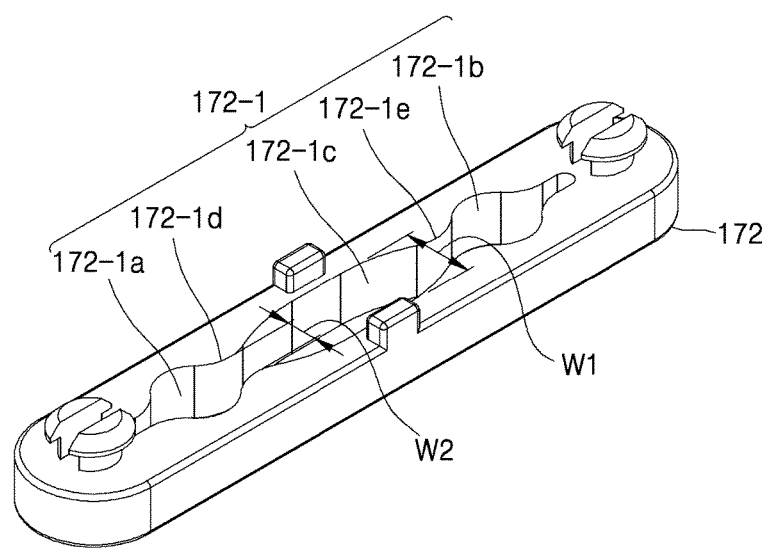
FIG. 41 is a perspective view illustrating a locking rail member according to an exemplary embodiment.

FIG. 41 is a perspective view illustrating the locking rail member 172 according to an exemplary embodiment. Referring to FIG. 41, a locking rail 172-1 into which the locking boss 171 is inserted and slides is provided on the locking rail member 172. The locking rail 172-1 is a slot into which the locking boss 171 is inserted to slide. The locking rail 172-1 may include a first locking portion 172-1*a* on which the locking boss 171 is located in the unfolded state and a second locking portion 172-1*b* on which the locking boss 171 is located in the folded state. The first locking portion 172-1*a* and the second locking portion 172-1*b* are connected to each other via a connection rail 172-1*c*. The first locking portion 172-1*a* and the second locking portion 172-1*b* are shaped to receive the locking boss 171. For example, the first locking portion 172-1*a* and the second locking portion 172-1*b* may have cylindrical shapes having diameters similar to (slightly less or greater than) a diameter of the locking boss 171. The connection rail 172-1*c* is shaped so that the locking boss 171 naturally slides along the connection rail 172-1*c*. For example, a width W1 of the connection rail 172-1*c* may be slightly greater than the diameter of the locking boss 171 in order for the locking boss 171 to smoothly slide. Boundary rails 172-1*d* and 172-1*e* for maintaining the locking boss 171 on the first locking portion 172-1*a* and the second locking portion 172-1*b* may be provided between the first locking portion 172-1*a* and the second locking portion 172-1*b* and the connection rail 172-1*c*. The boundary rails 172-1*d* and 172-1*e* have widths W2 less than the diameter of the locking boss 171. The locking rail member 172 or at least the locking rail 172-1 is formed of (e.g., includes) an elastic material.

When the first body 110 and the second body 120 unfold to have the unfolding angle E of about 180°, the locking boss 171 is located on the first locking portion 172-1*a*. The locking boss 171 is maintained on the first locking portion 171-1*a* due to the boundary rail 172-1*d*. That is, unless an external force having a predetermined magnitude or more for making the first body 110 and the second body 120 fold is applied, since the locking boss 171 may not pass through the boundary rail 172-1*d*, the locking boss 171 is maintained on the first locking portion 171-*la* and is locked when the first body 110 and the second body 120 unfold.

When an external force is applied and thus the first body 110 and the second body 120 begin to fold, the hinge unit 130 slides relative to the first body 110 and the second body 120 and the locking boss 171 also slides. The locking boss 171 enters the boundary rail 172-1*d*, the boundary rail 172-1*d* is elastically widened, and the width W2 of the boundary rail 172-1*d* is increased. Once the locking boss 171 passes through the boundary rail 172-1*d*, the locking boss 171 enters the connection rail 172-1*c*. As the unfolding angle E of the first body 110 and the second body 120 are gradually reduced, the locking boss 171 enters the boundary rail 172-1*e*. The boundary rail 172-1*e* is elastically widened due to the locking boss 171 and the width W2 of the boundary rail 172-1*e* is increased. Once the locking boss 171 passes through the boundary rail 172-1*e*, the locking boss 171 enters the second locking portion 172-1*b*. The first body 110 and the second body 120 reach the folded state having the unfolding angle E of 0° and are locked.

A process of making the first body 110 and the second body 120 change from the folded state to the unfolded state is performed in reverse order. In this configuration, the first body 110 and the second body 120 may be locked between the folded state and the unfolded state.

Figure 42:
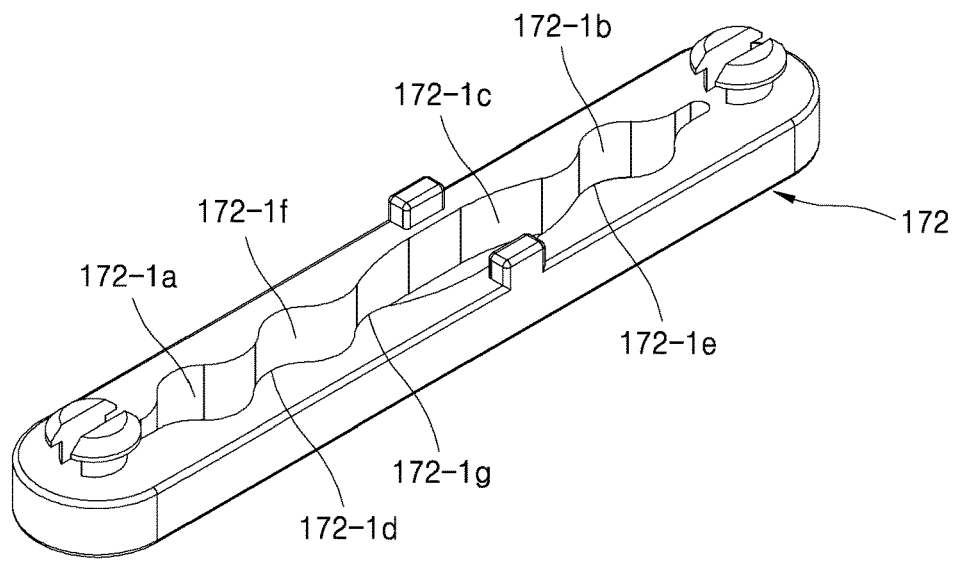
FIG. 42 is a perspective view illustrating the locking rail member according to another exemplary embodiment.

The locking unit may lock the first body 110 and the second body 120 at the unfolding angle E between the folded state and the unfolded state. FIG. 42 is a perspective view illustrating the locking rail member 172 according to another exemplary embodiment. Referring to FIG. 42, a third locking portion 172-1*f* is provided between the first locking portion 172-1*a* and the connection rail 172-1*c*. The third locking portion 172-1*f* is connected to the first locking portion 172-1*a* via the boundary rail 172-1*d* and is connected to the connection rail 172-1*c* via a boundary rail 172-1*g*. For example, the third locking portion 172-1*f* may correspond to the unfolding angle E of about 120°. In this configuration, the first body 110 and the second body 120 may be locked in the unfolded state, the state having the unfolding angle E of about 120°, and the folded state.

Figure 43:
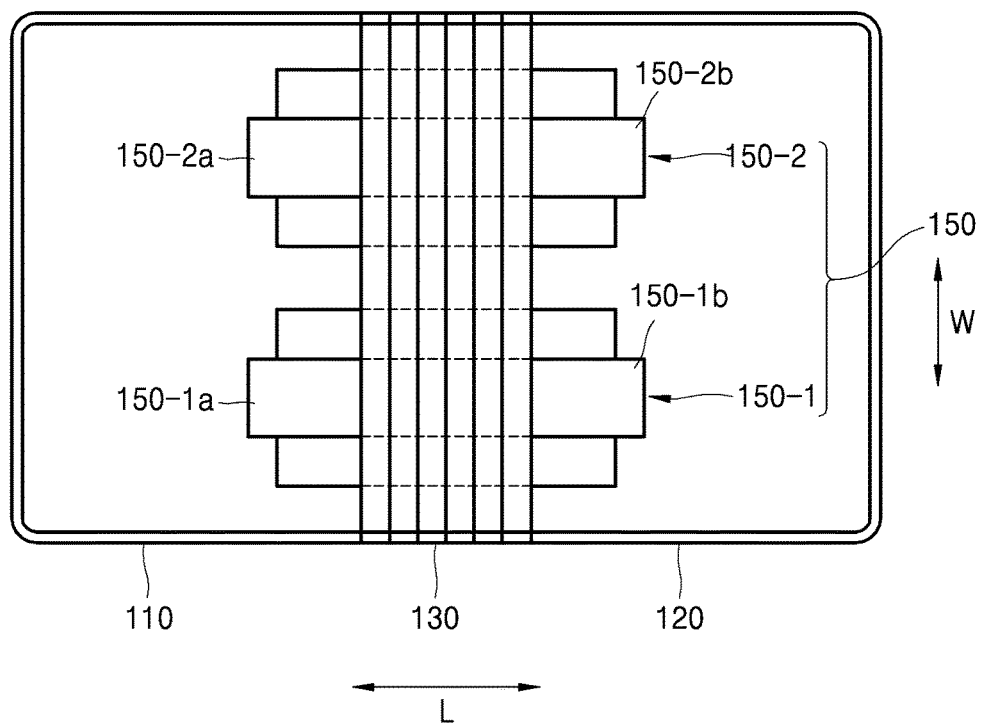
FIG. 43 is a plan view illustrating a connection relationship between the guide member and the hinge unit and the first body and the second body, according to an exemplary embodiment.
Figure 44A:
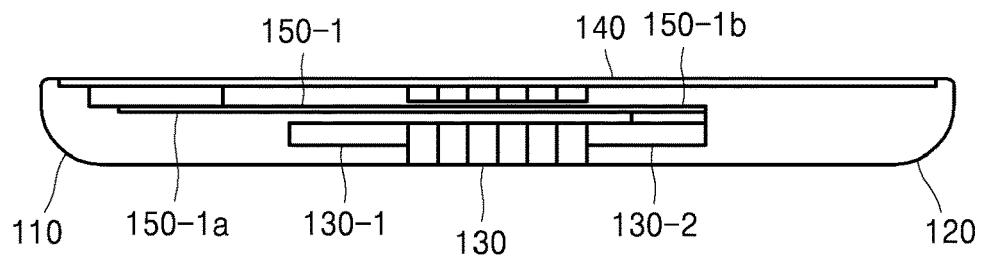
FIG. 44A is a side view illustrating a connection relationship between a first guide member and the first body and the second body and the hinge unit, according to an exemplary embodiment.
Figure 44B:
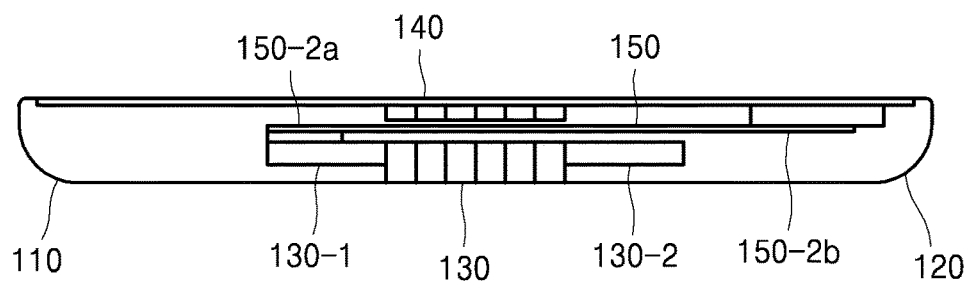
FIG. 44B is a side view illustrating a connection relationship between a second guide member and the first body and the second body and the hinge unit, according to an exemplary embodiment.

FIG. 43 is a plan view illustrating a connection relationship between the guide member 150 and the hinge unit 130 and the first body 110 and the second body 120, according to an exemplary embodiment. FIG. 44A is a side view illustrating a connection relationship between a first guide member 150-1 and the first body 110 and the second body 120 and the hinge unit 130, according to an exemplary embodiment. FIG. 44B is a side view illustrating a connection relationship between a second guide member 150-2 and the first body 110 and the second body 120 and the hinge unit 130, according to an exemplary embodiment. Also, a connection structure between the hinge unit 130 and the first body 110 and the second body 120 of FIGS. 43, 44A, and 44B is the same as or similar to that described above, and thus a redundant description is omitted below.

Referring to FIG. 43, the first body 110 and the second body 120 are foldably connected to each other by the hinge unit 130. The hinge unit 130 is connected to the first body 110 and the second body 120 to slide in the longitudinal direction L. A connection structure between the hinge unit 130 and the first body 110 and the second body 120 may be the same as a connection structure of FIGS. 35 and 36. Also, the locking unit of FIGS. 35, 41, and 42 may be used in order to lock the first body 110 and the second body 120 at the unfolding angle E.

The guide member 150 includes the first guide member 150-1 and the second guide member 150-2. The first guide member 150-1 and the second guide member 150-2 are spaced apart from each other in the width direction W. The first guide member 150-1 and the second guide member 150-2 respectively include one end portions (first end portions) 150-1*a* and 150-2*a* and other end portions (second end portions) 150-1*b* and 150-2*b*. The first end portions 150-1*a* and 150-2*a* and the second end portions 150-1*b* and 150-2*b* are located at both sides of the hinge unit 130. That is, the first guide member 150-1 and the second guide member 150-2 extend from the first body 110 across the hinge unit 130 to the second body 120. The first end portions 150-1*a* and 150-2*a* are located on the first body 110 and the second end portions 150-1*b* and 150-2*b* are located on the second body 120. The slots 132 (see FIG. 29) through which the first guide member 150-1 and the second guide member 150-2 pass are formed in the hinge unit 130.

As shown in FIG. 44A, the first end portion 150-1*a* of the first guide member 150-1 is connected to the first body 110 and the second end portion 150-1*b* is connected to the hinge unit 130. The hinge unit 130 includes a first connection portion 130-1 and a second connection portion 130-2 that are respectively connected to the first body 110 and the second body 120. The first end portion 150-1*a* and the second end portion 150-1*b* of the first guide member 150-1 are respectively connected to the first body 110 and the hinge unit 130. For example, the first end portion 150-1*a* may be connected to the frame 110-2 (see FIG. 31), and the second end portion 150-1*b* may be connected to the second connection portion 130-2 of the hinge unit 130, for example, the second connection bracket 131-2. Accordingly, the second end portion 150-1*b* slides relative to the second body 120 along with the hinge unit 130.

As shown in FIG. 44B, the first end portion 150-2a of the second guide member 150-2 is connected to the hinge unit 130 and the second end portion 150-2b is connected to the second body 120. The first end portion 150-2a and the second end portion 150-2b of the second guide member 150-2 are respectively connected to the hinge unit 130 and the second body 120. For example, the first end portion 150-2a may be connected to the first connection portion 130-1 of the hinge unit 130, for example, the first connection bracket 131-1, and the second end portion 150-2b may be connected to the frame 120-2 (see FIG. 31). Accordingly, the first end portion 150-2a slides relative to the first body 110 along with the hinge unit 130.

Figure 45:
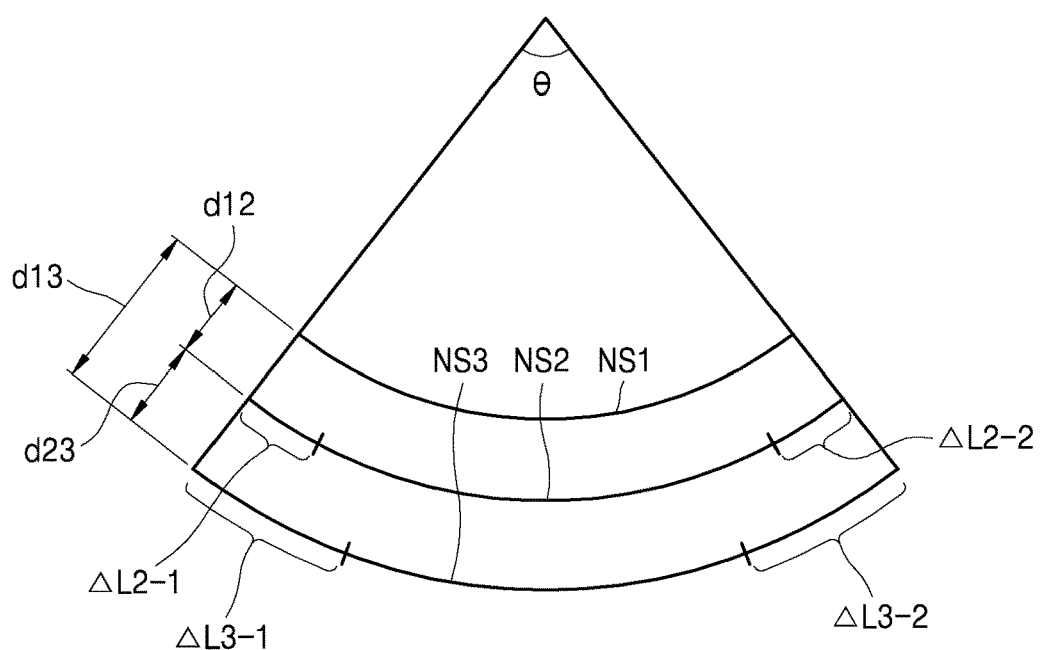
FIG. 45 is a schematic view illustrating the sliding amounts of the first and second guide members and the hinge unit when the first body and the second body in an unfolded state begin to fold to have the predetermined unfolding angle in a connection structure of FIG. 43, according to an exemplary embodiment.

FIG. 45 is a schematic view illustrating the amounts of the hinge unit 130 and the first guide member 150-1 and the second guide member 150-2 that slide when the first body 110 and the second body 120 in the unfolded state begin to fold to have the unfolding angle θ in the connection structure of FIG. 43, according to an exemplary embodiment. In FIG. 45, NS1 is a neutral surface of the flexible display device 140, NS2 is a neutral surface of the first guide member 150-1 and the second guide member 150-2, and NS3 is a neutral surface of the hinge unit 130. ΔL1, ΔL2-1, ΔL2-2, ΔL3-1, and ΔL3-2 are respectively the sliding amount of the flexible display device 140, the sliding amount of the first guide member 150-1 and the second guide member 150-2, and the sliding amount of the hinge unit 130 relative to the first body 110 and the second body 120 until the first body 110 and the second body 120 in the unfolded state reach the state having the unfolding angle θ. d12, d23, and d13 respectively distances between the neutral surface NS1 and the neutral surface NS2, between the neutral surface NS2 and the neutral surface NS3, and between the neutral surface NS1 and the neutral surface NS3.

Since a length of the flexible display device 140 does not change, $$\Delta L1=0,$$

$$\Delta L2=\Delta L2\text{-}1+\Delta L2\text{-}2=d12\times\theta, \text{ and}$$

$$\Delta L3=\Delta L3\text{-}1+\Delta L3\text{-}2=d13\times\theta \text{ (where } \theta \text{ is in radians)}.$$

In order to not apply an excessive stress to the flexible display device 140 during a folding/unfolding process, the distances d13 and d23 are maintained constant even when the unfolding angle θ changes.

In order to maintain the first body 110 and the second body 120 symmetric with each other about the hinge unit 130 during a folding/unfolding process, the sliding amount ΔL3-1 of the hinge unit 130 relative to the first body 110 and the sliding amount ΔL3-2 of the hinge unit 130 relative to the second body 120 are equal to each other, the sliding amounts ΔL2-1 and ΔL2-2 of the first guide member 150-1 and the second guide member 150-2 relative to the second and first bodies 120 and 110 are equal to each other, and the sliding amounts ΔL2-1 and ΔL2-2 are half the sliding amounts of sliding ΔL3-1 and ΔL3-2, respectively.

That is, the following is satisfied:

$$\Delta L3\text{-}1=\Delta L3\text{-}2=\{d13\times\theta\}/2,$$

$$\Delta L2\text{-}1=\Delta L2\text{-}2=\{d12\times\theta\}/2, \text{ and}$$

$$\Delta L2\text{-}1=\Delta L2\text{-}2=\tfrac{1}{2}\Delta L3\text{-}1=\tfrac{1}{2}\Delta L3\text{-}2 \quad \text{Equation 3.}$$

$$\text{Since } d13=d12+d23 \quad \text{Equation 4,}$$

when the distance d13 is removed by substituting Equation 4 into Equation 3, $$d12=d23 \quad \text{Equation 5.}$$

That is, the distance d12 between the first guide member 150-1 and the second guide member 150-2 and the flexible display device 140 in the thickness direction T is equal to the distance d23 between the first guide member 150-1 and the second guide member 150-2 and the hinge unit 130 in the thickness direction T. Strictly, the distance d12 is a distance between the neutral surface NS1 of the flexible display device 140 and the neutral surface NS2 of the first guide member 150-1 and the second guide member 150-2 and the distance d23 is a distance between the neutral surface NS2 of the first guide member 150-1 and the second guide member 150-2 and the neutral surface NS3 of the hinge unit 130. The neutral surface NS3 of the hinge unit 130 is a surface where there exist central axes of the plurality of connection members 320 about which the plurality of segment members 310 pivot.

In this configuration, a stress applied to the flexible display device 140 during a folding/unfolding process may be reduced due to the first guide member 150-1 and the second guide member 150-2. Also, during a folding/unfolding process of the foldable device, the first body 110 and the second body 120 synchronously move relative to the hinge unit 130 and thus the first body 110 and the second body 120 may be maintained symmetric with each other about the hinge unit 130. That is, the first guide member 150-1 and the second guide member 150-2 operate as a movement limiting unit (e.g., movement limiter) for maintaining the first body 110 and the second body 120 symmetric with each other about the hinge unit 130 by limiting the moving amounts of the first body 110 and the second body 120 relative to the hinge unit 130 during a folding/unfolding process. Accordingly, since the flexile display device 140 is not excessively pulled or pushed to one side during a folding/unfolding process, natural folding/unfolding may be achieved and a stress applied to the flexible display device 140 may be reduced.

When the first body 110 and the second body 120 do not synchronously move relative to the hinge unit 130, a movement of the first body 110 relative to the hinge unit 130 is completed and then a movement of the second body 120 relative to the hinge unit 130 may occur during a folding/unfolding process. Then, an excessive tensile force or compressive force may be applied to the flexible display device 140. Also, since a length L3 (see FIG. 40) between a center 3b of the hinge unit 130 and an end portion of the first body 110 and a length L4 (see FIG. 40) between the center 3b of the hinge unit 130 and an end portion of the second body 120 at the unfolding angle E between the folded state and the unfolded state may be different from each other, the foldable device may be asymmetric, and thus the third part 4c of the flexible display device 140 may come off from the support surface 301 that is formed by the hinge unit 130 to have the curved shape 4f of FIG. 40, thereby reducing the beauty of an outer appearance of the foldable device. Also, when the third part 4c of the flexible display device 140 repeatedly comes off to have the curved shape 4f during a folding/unfolding process, the third part 4c may be permanently deformed. Such a tensile force and such a compressive force may be reduced due to synchronous relative movements of the first body 110 and the second body 120 and the hinge unit 130 and may be further reduced due to the first guide member 150-1 and the second guide member 150-2.

According to exemplary embodiments of the foldable device, a flexible display device may be stably supported to not be bent during a folding/unfolding process. Since a guide member that elastically bends is disposed between the flexible display device and a hinge unit, a stress applied to the flexible display device during the folding/unfolding process may be reduced. Since a first body and a second body and the hinge unit move in a symmetric manner, a stress applied to the flexible display device during the folding/unfolding process may be reduced and an outer appearance of the foldable device may be improved.

<Third Exemplary Embodiment>

A mobile terminal device (foldable device) of the present exemplary embodiment improves portability by distributing various electronic parts that are hardly bent on portions corresponding to one side portion and the other side portion of a flexible display device that defines a front surface and disposing a flexible hinge between the portions. The mobile terminal device of the present exemplary embodiment supports the flexible display device so that the flexible display device is maintained in a state having a predetermined curvature during a folding process. The mobile terminal device of the present exemplary embodiment may be firmly maintained in a folded state and an unfolded state, thereby allowing a user to stably input a touch.

A third exemplary embodiment of the foldable device will now be explained.

Figure 46:
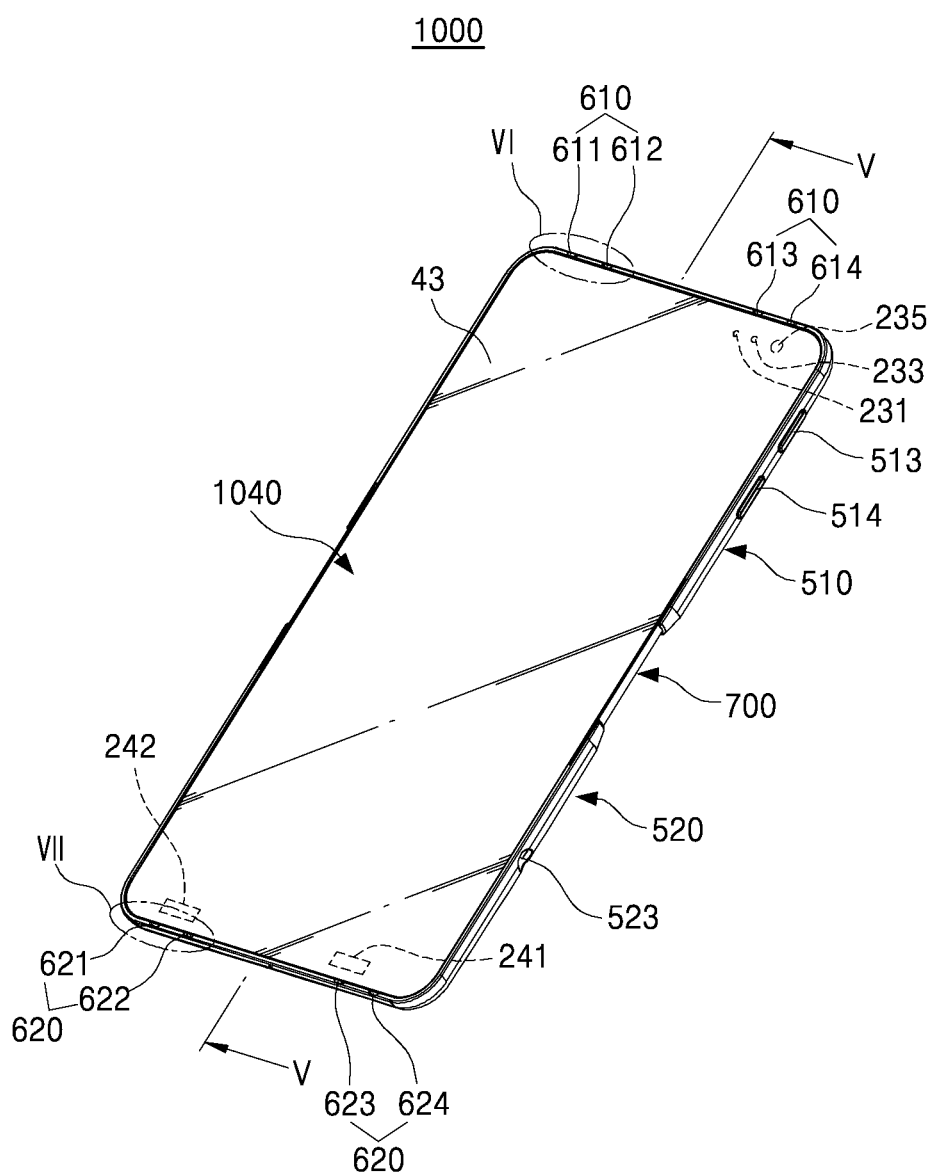
FIG. 46 is a perspective view illustrating a front surface of a mobile terminal device, according to an exemplary embodiment.
Figure 47:
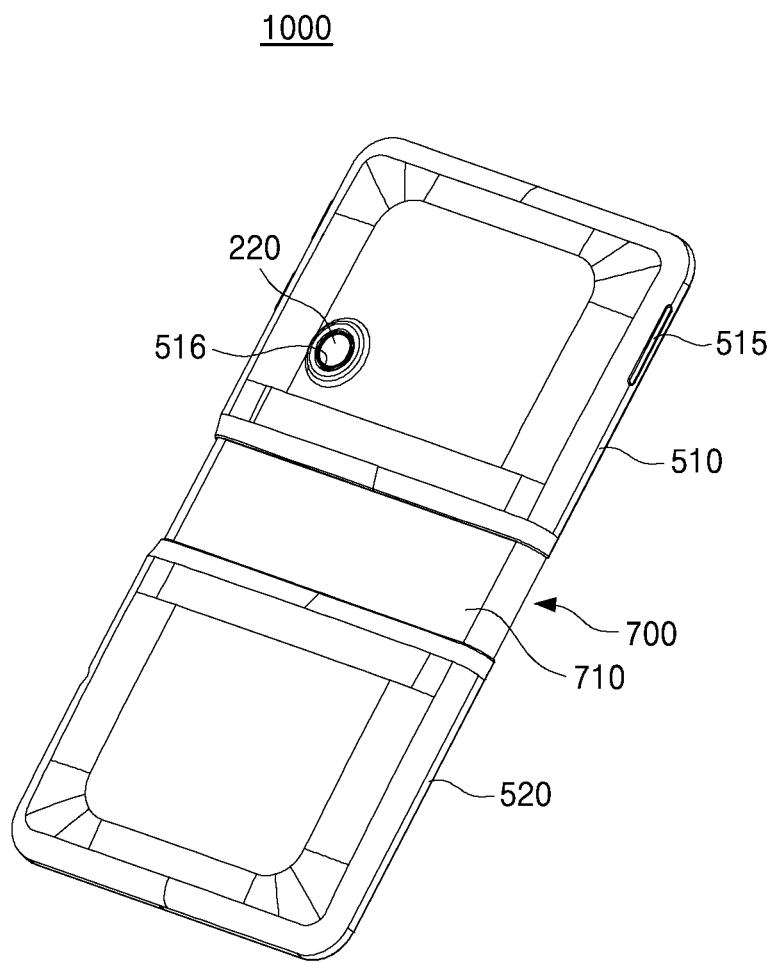
FIG. 47 is a perspective view illustrating a rear surface of the mobile terminal device, according to an exemplary embodiment.
Figure 48:
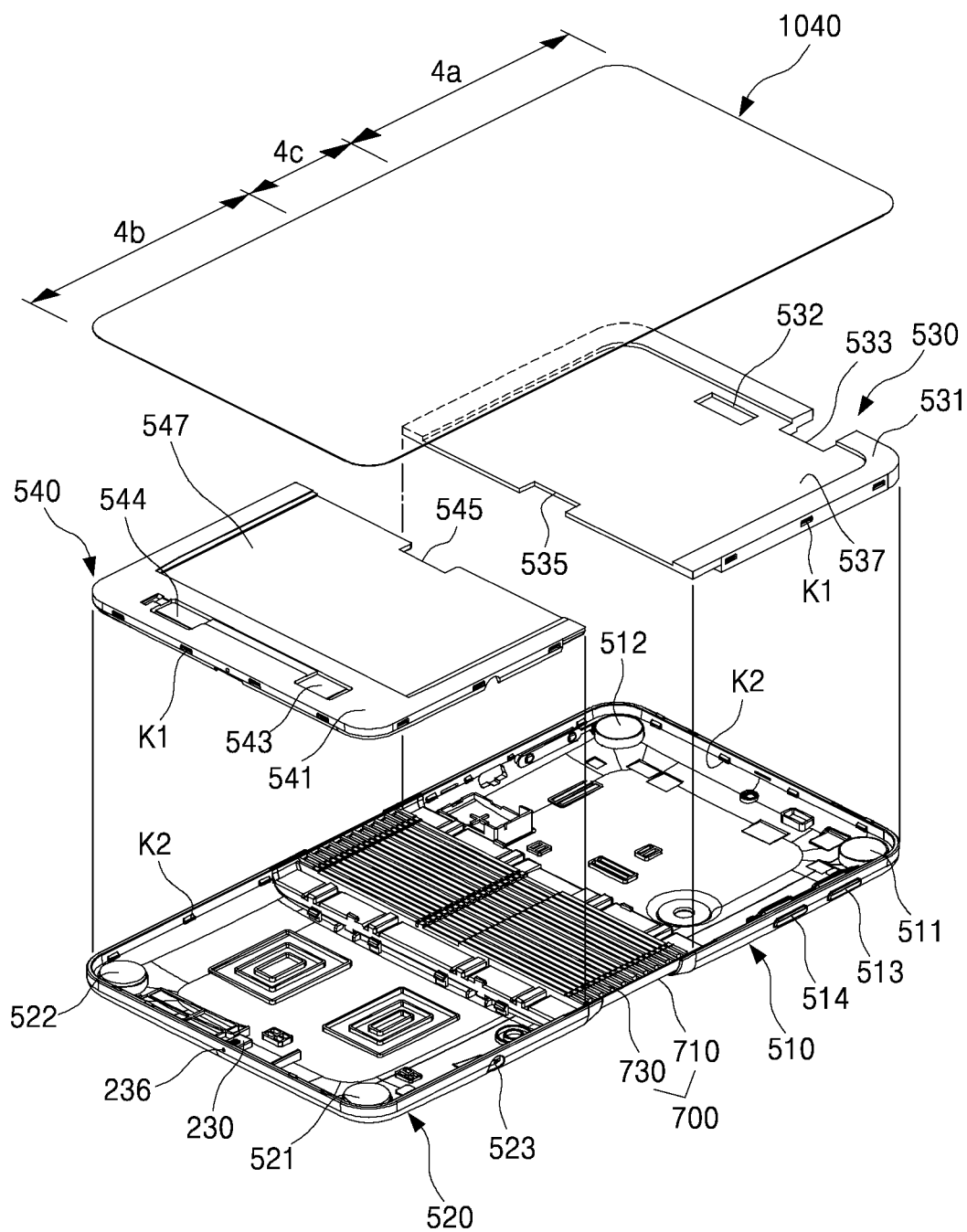
FIG. 48 is an exploded perspective view illustrating the mobile terminal device according to an exemplary embodiment.
Figure 49:
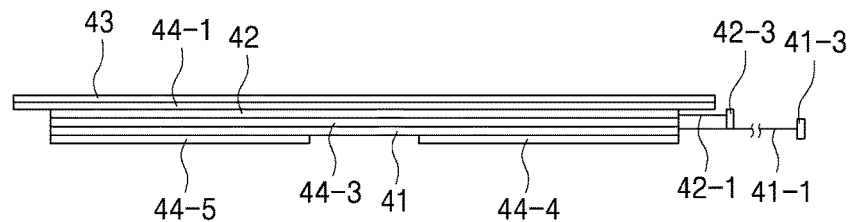
FIG. 49 is a cross-sectional view illustrating a flexible display device of FIG. 48, according to an exemplary embodiment.
Figure 50:
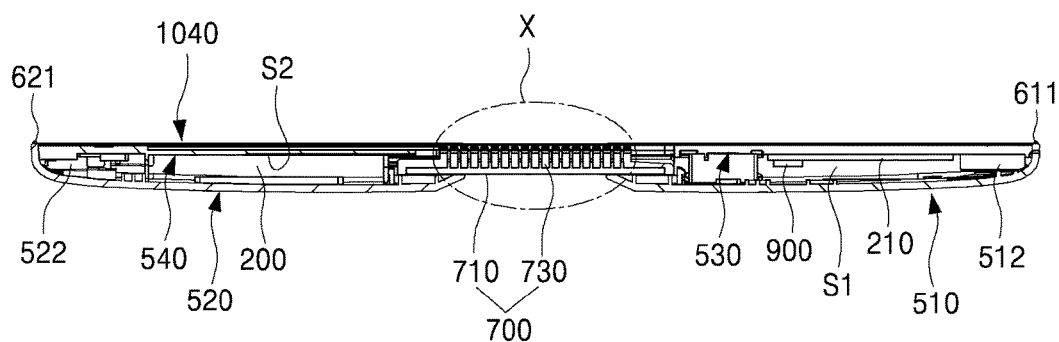
FIG. 50 is a cross-sectional view of the mobile terminal device taken along line V-V of FIG. 46, according to an exemplary embodiment.

FIG. 46 is a perspective view illustrating a front surface of a mobile terminal device 1000 according to an exemplary embodiment. FIG. 47 is a perspective view illustrating a rear surface of the mobile terminal device 1000 according to an exemplary embodiment. FIG. 48 is an exploded perspective view illustrating the mobile terminal device 1000 according to an exemplary embodiment. FIG. 49 is a cross-sectional view illustrating a flexible display device 1040 of FIG. 48, according to an exemplary embodiment. FIG. 50 is a cross-sectional view taken along line V-V of the mobile terminal device 1000 of FIG. 46, according to an exemplary embodiment.

Referring to FIGS. 46 through 50, the mobile terminal device 1000 includes the flexible display device 1040, a first support 530, a second support 540, a first cover 510, a second cover 520, a flexible hinge (e.g., hinge unit) 700, and a communication module 900 (e.g., communication terminal or communicator).

A structure of the mobile terminal device 1000 constructed as described above will be explained below and then elements will be sequentially explained in detail.

The flexible display device 1040 has a degree of freedom high enough to be bent to a predetermined curvature. In the present exemplary embodiment, when the first part 4a that is one portion of the flexible display device 1040 and the second part 4b that is the other portion of the flexible display device 1040 face each other, the third part 4c formed between the first part 4a and the second part 4b is bent. In this case, since the first part 4a and the second part 4b of the flexible display device 1040 are supported by the first support 530 and the second support 540 each formed of (e.g., including) a hard material, even when a user touches a front surface of the flexible display device 1040, the flexible display device 1040 may not be pushed backward and a touch may be stably input.

The first cover 510 and the second cover 520 to which the first support 530 and the second support 540 are respectively coupled are connected to each other via the flexible hinge 700. In this case, referring to FIG. 47, the first cover 510 and the second cover 520 and the flexible hinge 700 form the rear surface of the mobile terminal device 1000. That is, the first cover 510, the second cover 520, and the flexible hinge 700 are integrated to form a single cover unit.

A charged battery 200 (see FIG. 50) and a main printed circuit board (PCB) 210 (see FIG. 50) are disposed between the first cover 510 and the second cover 520 and the first support 530 and the second support 540. In this case, a central processing unit (CPU) and the communication module 900 may be mounted on the main PCB 210 and the communication module 900 is electrically connected to an antenna.

When the mobile terminal device 1000 folds in half, the flexible hinge 700 may be bent so that the third part 4c of the flexible display device 1040 has a predetermined curvature. In this case, the predetermined curvature of the third part 4c may be small enough to not physically damage the flexible display device 1040.

A structure of the mobile terminal device 1000 will now be explained in detail.

Referring to FIG. 49, the flexible display device 1040 is formed by sequentially stacking the transparent protective panel 43 (hereinafter, referred to as a cover window 43), the touch panel 42, and the flexible display panel 41 from the front to the back.

The cover window 43 is a plastic or film cover window. Portions (specifically, outer portions) of the cover window 43 corresponding to the first part 4a and the second part 4b of FIG. 48 are supported by the first support 530 and the second support 540. In this case, the outer portions of the cover window 43 may not be fixed (or attached) to top surfaces 531 and 541 of the first support 530 and the second support 540, or may be fixed (or attached) to the top surfaces 531 and 541 of the first support 530 and the second support 540 to slightly move relative to the first support 530 and the second support 540. This is because when the mobile terminal device 100 folds and the third part 4c of the flexible display device 1040 is bent, a degree of freedom is gained so that the cover window 43 relatively moves as the first support 530 and the second support 540 move, thereby solving the problem that the cover window 43 fails to absorb movements of the first support 530 and the second support 540 and is damaged. The cover window 43 may have a pattern formed of a soft metal mesh, silver nanowires (AgNW), or graphene.

The touch panel 42 is attached to a rear surface of the cover window 43 by using an optically-clear adhesive (OCA) 44-1. The touch panel 42 detects a user's touch gesture and transmits a touch input signal to the main PCB 210. Also, a first flexible printed circuit board (FPCB) 42-1 on which a driving integrated circuit (IC) for driving the touch panel 42 is mounted is electrically connected to one side of the touch panel 42. In this case, the first FPCB 42-1 is electrically connected to a second FPCB 41-1 of the flexible display panel 41 through a first connector 42-3. Here, the first connector 42-3 may be directly connected to the main PCB 210 (see FIG. 50) that is disposed on a rear surface of the first support 530. To this end, the first FPCB 42-1 may have a length greater than that in FIG. 49 so that the first connector 42-3 may pass through a through-hole 532 (FIG. 48) of the first support 530 to be electrically connected to the main PCB 210.

The flexible display panel 41 is attached to the rear surface of the cover window 43, or a rear surface of the touch panel 42 if any, by using an OCA 44-3. The flexible display panel 41 may be an active matrix organic light-emitting diode (AMOLED) panel or a flexible OLED panel. The second FPCB 41-1 on which a driving IC for driving the flexible display panel 41 is mounted is electrically connected to one side of the flexible display panel 41. In this case, a second connector 41-3 may be provided on one end of the second FPCB 41-1, and may pass through the through-hole 532 (FIG. 48) of the first support 530 to be electrically connected to the main PCB 210 (see FIG. 50) that is disposed on the rear surface of the first support 530. Here, the second FPCB 41-1 may have a length enough to allow the mobile terminal device 1000 to fold/unfold. Although the flexible display panel 41 is disposed on the rear surface of the touch panel 42 in the present exemplary embodiment, it is understood that one or more other exemplary embodiments are not limited thereto and the flexible display panel 41 may be stacked on a front surface of the touch panel 42.

The flexible display panel 41 is attached to front surfaces of the first support 530 and the second support 540 by using adhesive members 44-4 and 44-5 that are respectively attached to one side portion and the other side portion of a rear surface of the flexible display panel 41. In this case, the adhesive members 44-4 and 44-5 may be double-sided adhesive tapes thin enough for the mobile terminal device 1000 to have a low thickness or double-sided adhesive tapes having predetermined cushioning properties.

As such, portions of the flexible display panel 41 corresponding to the first part 4a and the second part 4b other than a portion corresponding to the third part 4c of FIG. 48 are respectively fixed to the first support 530 and the second support 540. Accordingly, when the mobile terminal device 100 folds and the third part 4c of the flexible display device 1040 is bent, the flexible display device 1040 is not affected by the adhesive members 44-4 and 44-5, thereby allowing the mobile terminal device 1000 to smoothly fold.

Referring to FIGS. 48 and 50, the first support 530 and the second support 540 are formed of (e.g., include) a hard material and include planar front surfaces in order to stably support the flexible display device 1040.

A plurality of coupling grooves K1 that are arranged at intervals along outer ends of the first support 530 and the second support 540 are formed in the first support 530 and the second support 540. A plurality of coupling protrusions K2 that protrude at intervals along inner ends of the first cover 510 and the second cover 520 are snap-fitted to the plurality of coupling grooves K1. Accordingly, the first support 530 and the second support 540 may be respectively detachably coupled to the first cover 510 and the second cover 520. Accordingly, the charged battery 200, a memory, and a subscriber identity module (SIM) card may be inserted/taken into/from first and second spaces S1 and S2 by respectively separating the first cover 510 and the second cover 520 from the first support 530 and the second support 540.

The first space S1 is formed as the first support 530 is coupled to the first cover 510 and the rear surface of the first support 530 that faces a front surface of the first cover 510 is spaced from the front surface of the first cover 510. The main PCB 210 may be disposed in the first space S1, and various electronic parts such as a rear camera module 220 (e.g., rear camera) (see FIG. 47), a proximity sensor 231, an illumination sensor 233, a front camera module 235 (e.g., front camera), and a speaker may be disposed in the first space S1 (see FIG. 46).

In this case, the proximity sensor 231, the illumination sensor 233, and the front camera module 235 are disposed to face the front of the cover window 43 through a first through-groove 533 (FIG. 48) formed in the first support 530 and the rear camera module 220 is disposed to face the back of the first cover 510 through a through-hole 516 (see FIG. 47) of the first cover 510.

The second space S2 is formed as the second support 540 is coupled to the second cover 520 and a rear surface of the second support 540 that faces a front surface of the second cover 520 is spaced apart from the front surface of the second cover. The charged battery 200 (see FIG. 50) and a tiny microphone 230 (see FIG. 48) may be disposed in the second space S2. In this case, a microphone hole 236 (FIG. 48) is formed in the second cover 520 so that a sound such as voice is input to the tiny microphone 230.

Also, a plurality of concave grooves 543 and 544 on which a plurality of soft keys 241 and 242 for transmitting a touch input signal to a CPU are disposed in order to control the flexible display panel 41 are formed in an outer portion of the front surface of the second support 540. The plurality of soft keys 241 and 242 that are touch sensors are protected by the cover window 43.

A second through-groove 535 and a third through-groove 545 through which a third FPCB 800 (see FIG. 55) passes are respectively formed in facing end portions of the first support 530 and the second support 540. In this case, the third FPCB 800 may electrically connect the charged battery 200, the tiny microphone 230, and the plurality of soft keys 241 and 242 disposed in the second space S2 to the main PCB 210 disposed in the first space S1.

Also, the adhesive members 44-4 and 44-5 are attached to the first support 530 and the second support 540 so that the back of the flexible display device 1040 is fixed to concave grooves 537 and 547 that are respectively formed in the front surfaces of the first support 530 and the second support 540. In addition, the back of the flexible display device 1040 is received in the concave grooves 537 and 547, thereby preventing a thickness of the mobile terminal device 1000 from being increased.

The first cover 510 and the second cover 520 are each formed of (e.g., include) a hard material, and are connected to each other by using the flexible hinge 700.

Referring to FIG. 48, one pair of packings 511 and 512 for supporting the first support 530 are disposed at both corners of a front end portion of the first cover 510. Also, a first control button 513 and a second control button 514 are disposed along one side end of the first cover 510 and a third control button 515 (see FIG. 47) is disposed on the other side end that is opposite to the one side end. The first through third control buttons 513, 514, and 515 may be set to turn on/off a screen of the flexible display device 1040, to control a brightness of the screen, to control a volume of the speaker, etc. Also, the first through third control buttons 513, 514, and 515 may be set to work with various applications of the memory provided in the mobile terminal device 1000.

One pair of second packings 521 and 522 for supporting the second support 540 are disposed at both corners of a front end portion of the second cover 520, like in the first cover 510. Also, an insertion hole 523 into which an earphone jack is inserted may be formed in one side end of the second cover 520 and a plurality of antennas may be disposed on an inner surface of the second cover 520. In this case, examples of the antennas that are for wireless communications may include long-distance antennas that may communicate with other terminals through base stations or access points (APs), and short-distance antenna such as Wi-Fi antennas, near field communication (NFC) antennas, etc.

Referring to FIG. 46, a first locking portion 610 and a second locking portion 620 that are coupled to each other when the mobile terminal device 1000 is closed are respectively disposed on the front end portions of the first cover 510 and the second cover 520. For example, the first locking portion 610 and the second locking portion 620 may be coupled to each other due to a magnetic force.

Figure 51:
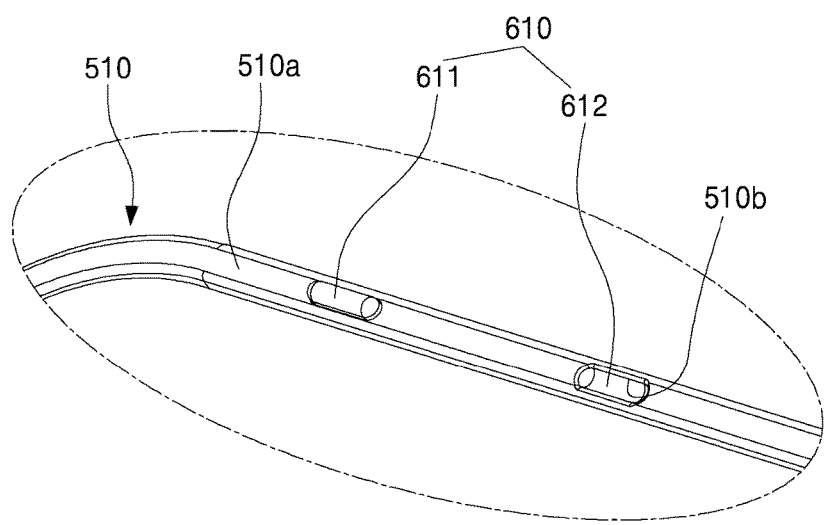
FIG. 51 is an enlarged view illustrating a first locking portion in a portion VI of FIG. 46, according to an exemplary embodiment.
Figure 52:
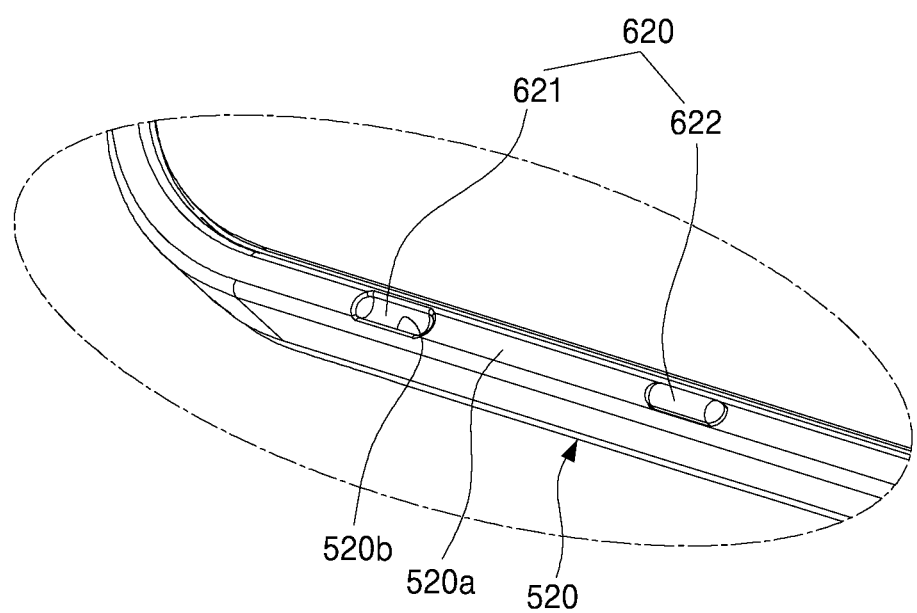
FIG. 52 is an enlarged view illustrating a second locking portion in a portion VII of FIG. 46, according to an exemplary embodiment.
Figure 53:
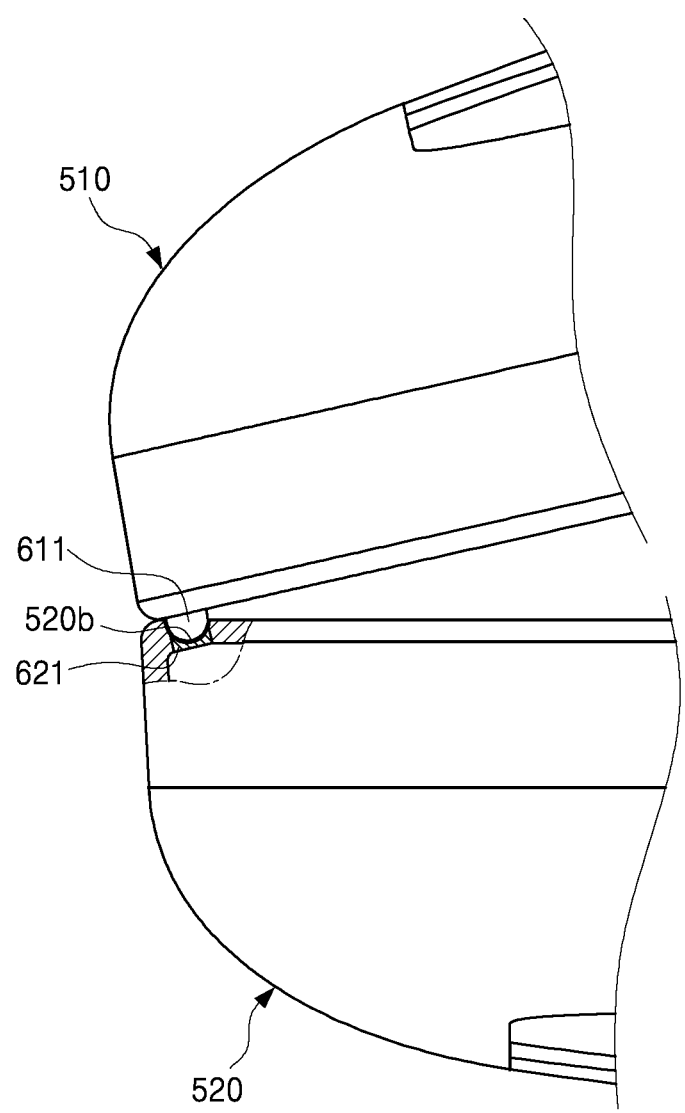
FIG. 53 is an enlarged view illustrating a state where the first and second locking portions of FIG. 46 are coupled to each other due to a magnetic force, according to an exemplary embodiment.

FIG. 51 is an enlarged view illustrating the first locking portion 610 in a portion VI of FIG. 46, according to an exemplary embodiment. FIG. 52 is an enlarged view illustrating the second locking portion 620 in a portion VII of FIG. 46, according to an exemplary embodiment. FIG. 53 is an enlarged view illustrating a state where the first locking portion 610 and the second locking portion 620 of FIG. 46 are coupled to each other due to a magnetic force, according to an exemplary embodiment.

The first locking portion 610 may include a first magnet 611 and a second magnet 612 that are disposed on the left of a front end portion 510a of the first cover 510, and a third magnet 613 and a fourth magnet 614 that are disposed on the right of the front end portion 510a of the first cover 510. Referring to FIG. 51, the first magnet 611 is formed (e.g., provided) to project from the front end portion 510a of the first cover 510. The second magnet 612 is recessed to be exposed through an insertion hole 510b formed in the front end portion 510a of the first cover 510. In this case, the second magnet 612 is concavely formed, unlike the first magnet 611. Also, the third magnet 613 that is disposed on the right of the front end portion 510a of the first cover 510 is formed in the same manner as that of the first magnet 611 and the fourth magnet 614 is formed in the same manner as that of the second magnet 612.

The second locking portion 620 may include a fifth magnet 621 and a sixth magnet 622 that are disposed on the left of a front end portion 520a of the second cover 520, and a seventh magnet 623 and an eighth magnet 624 that are disposed on the right of the front end portion 520a of the second cover 520. Referring to FIG. 52, the fifth magnet 621 is recessed to be exposed through an insertion hole 520b formed in the front end portion 520a of the second cover 520. In this case, the fifth magnet 621 is concavely formed. The sixth magnet 622 is formed to project from the front end portion 520a of the second cover 520, unlike the fifth magnet 621. Also, the seventh magnet 623 that is disposed on the right of the front end portion 520a of the second cover 520 is formed in the same manner as that of the fifth magnet 621 and the eighth magnet 624 is formed in the same manner as that of the sixth magnet 622.

As the mobile terminal device 100 folds and the first locking portion 610 and the second locking portion 620 approach each other, the first locking portion 610 and the second locking portion 620 are attached to each other due to a magnetic attractive force that is applied between the first through fourth magnets 611 through 614 of the first locking portion 610 and the fifth through eighth magnets 621 through 624 of the second locking portion 620.

For example, as shown in FIG. 53, as the first magnet 611 that is convex is attached to the fifth magnet 621 that is concave, the first magnet 611 and the fifth magnet 621 are coupled to each other due to not only a magnetic force but also a convex-concave (uneven) joint structure.

Although each of the first locking portion 610 and the second locking portion 620 includes a plurality of magnets in the present exemplary embodiment, it is understood that one or more other exemplary embodiments are not limited thereto and each of the first locking portion 610 and the second locking portion 620 may include at least one magnet.

Figure 54:
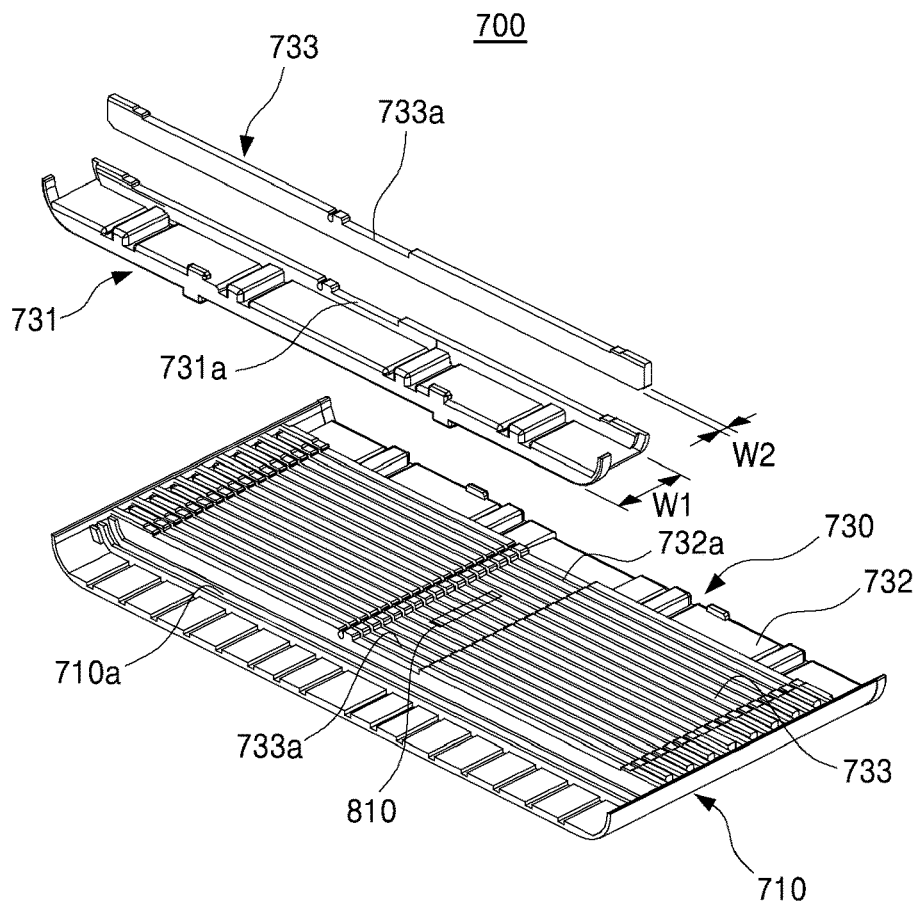
FIG. 54 is a perspective view illustrating a flexible hinge of FIG. 48, according to an exemplary embodiment.
Figure 55:
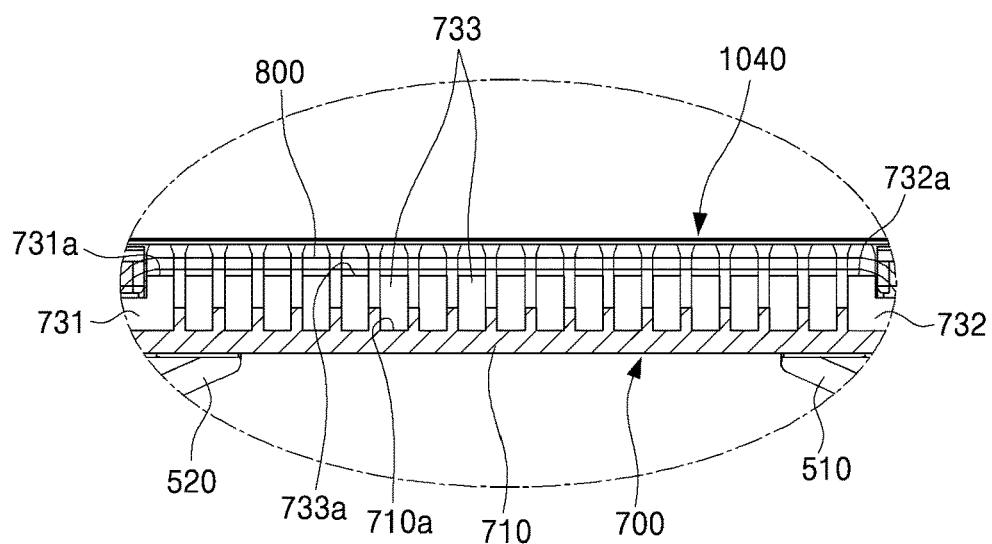
FIG. 55 is an enlarged view illustrating a part of the flexible hinge in a portion X of FIG. 50, according to an exemplary embodiment.
Figure 56:
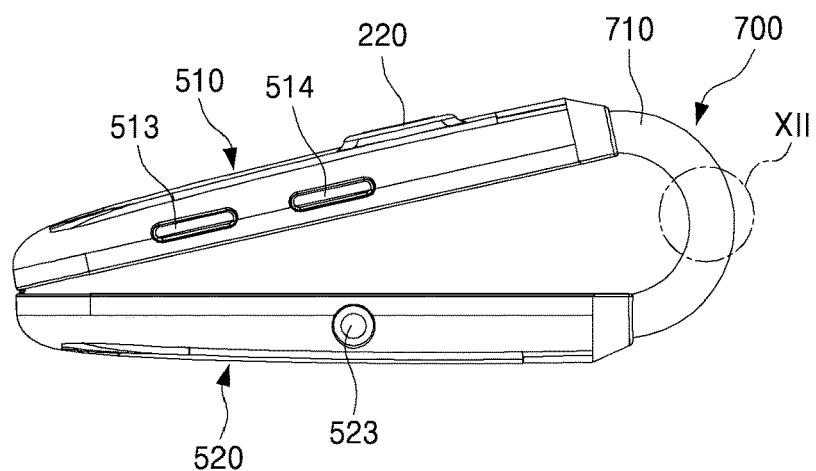
FIG. 56 is a side view illustrating a state where the mobile terminal device folds, according to an exemplary embodiment.
Figure 57:
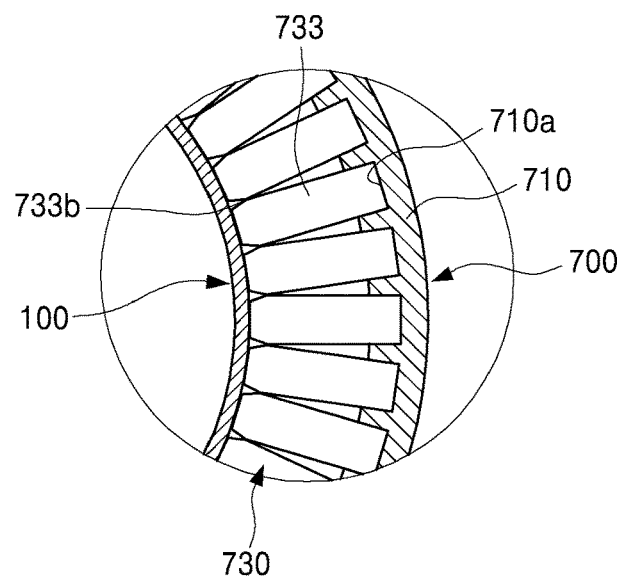
FIG. 57 is an enlarged cross-sectional view illustrating a state where the flexible hinge in a portion XII of FIG. 56 is bent, according to an exemplary embodiment.

FIG. 54 is a perspective view illustrating the flexible hinge 700 of FIG. 48, according to an exemplary embodiment. FIG. 55 is an enlarged view illustrating a part of the flexible hinge 700 in a portion X of FIG. 50, according to an exemplary embodiment. FIG. 56 is a side view illustrating a state where the mobile terminal device 1000 folds, according to an exemplary embodiment. FIG. 57 is an enlarged cross-sectional view illustrating a state where the flexible hinge 700 in a portion XII of FIG. 56 is bent, according to an exemplary embodiment. A configuration of the flexible hinge 700 will now be explained in detail with reference to FIGS. 54 through 57.

Referring to FIG. 54, an outer portion 710 and an inner portion 730 of the flexible hinge 700 may be formed by using double-shot injection molding.

The outer portion 710 may be formed of (e.g., include) a soft material (e.g., soft plastic or polymer). The outer portion 710 may have a stiffness enough to be naturally bent when the mobile terminal device 1000 folds as shown in FIG. 56 and enough to allow the mobile terminal device 1000 to be maintained straight in a longitudinal direction when the mobile terminal device 1000 does not fold as shown in FIG. 50.

The inner portion 730 is integrally formed with an inner peripheral surface of the outer portion 710, and is formed of a hard material (e.g., hard plastic). The inner portion 730 includes a plurality of reinforcing members, that is, first through third reinforcing members 731, 732, and 733 that are arranged at predetermined intervals in a folding/unfolding direction of the flexible display device 1040 of FIG. 56.

Each of the first reinforcing member 731 and the second reinforcing member 732 that are disposed on a front end portion and a rear end portion of the outer portion 710 from among the first through third reinforcing members 731, 732, and 733 is formed to have a width W1 greater than a width W2 of each of the third reinforcing members 733 in consideration of coupling with the first cover 510 and the second cover 520.

Referring to FIG. 55, front end portions of the first through third reinforcing members 731, 732, and 733 support a rear surface of the third part 4c (see FIG. 48) of the flexible display device 1040. In addition, rear end portions of the third reinforcing members 733 are fixedly inserted into a plurality of slits 710a that are formed in the inner peripheral surface of the outer portion 710. Also, receiving grooves 731a, 732a, and 733a in which the third FPCB 800 is mounted are formed in the first through third reinforcing members 731, 732, and 733. In this case, the third FPCB 800 is disposed under the flexible display device 1040.

In addition, a strain gauge sensor 810 may be disposed in the receiving grooves 731a, 732a, and 733a of the first through third reinforcing members 731, 732, and 733. The strain gauge sensor 810 may be connected to the main PCB 210 through a signal line, and may detect the variation of the length of the flexible hinge 700 as the mobile terminal device 1000 folds and may cause the CPU to control the screen of the flexible display device 1040. That is, when the length of the flexible hinge 700 is reduced as the mobile terminal device 1000 folds, the strain gauge sensor 810 may transmit a first signal for turning off the screen of the flexible display device 1040 to the CPU, and when the length of the flexible hinge 700 is increased as the mobile terminal device 1000 unfolds, the strain gauge sensor 810 may transmit a second signal for turning on the screen of the flexible display device 1040 to the CPU.

When the mobile terminal device 1000 folds and the first locking portion 610 and the second locking portion 620 are coupled to each other as shown in FIG. 56, front end portions of adjacent reinforcing members of the first through third reinforcing members 731, 732, and 733 contact each other as shown in FIG. 57. Accordingly, the outer portion 710 is bent to a predetermined curvature. The front end portions of the first and second reinforcing members 731 and 732 may contact the front end portions of the third reinforcing members 733.

As the front end portions of the first through third reinforcing members 731, 732, and 733 contact one another, the outer portion 710 is bent to a predetermined curvature. In this case, a curvature of the flexible hinge 700 may be adjusted according to the number of the first through third reinforcing members 731, 732, and 733 and an interval between the first through third reinforcing members 731, 732, and 733.

The curvature of the flexible hinge 700 may be set in consideration of a desirable amount of bending of the flexible display device 1040. The desirable amount of bending of the flexible display device 1040 is determined so that when the flexible display device 1040 folds, the flexible display device 1040 is not physically damaged and when the mobile terminal device 1000 unfolds (see FIG. 51), the third part 4c is spread flat.

Accordingly, when the mobile terminal device 100 folds, a rear surface of the flexible display device 1040 is stably supported by the first through third reinforcing members 731, 732, and 733 of the flexible hinge 700 as shown in FIG. 57.

The communication module 900 may include an electronic device (see FIG. 50) such as an LED modem chip that may communicate with other terminals through base stations or APs and may be mounted on the main PCB 210. Also, chips for establishing communication such as Wi-Fi, NFC, Bluetooth, etc., may be provided on the main PCB 210.

Although the present exemplary embodiment is described with reference to the mobile terminal device 1000, when the communication module 900 is omitted, the present exemplary embodiment may be applied to a display device for multimedia.

As described above, since the charged battery 200, the main PCB 210, and various electronic parts are hardly bent relative to the flexible display device 1040 that forms a front surface are distributably arranged on a positions corresponding to the first part 4a and the second part 4b that are one side portion and the other side portion of the flexible display device 1040 and the flexible hinge 700 is foldably disposed on position corresponding to the part 4c that is bendably disposed between the first part 4a and the second part 4b, portability may be improved and a large screen may be used when the mobile terminal device 1000 unfolds.

Also, since the flexible display device 1040 is supported by the first support 530 and the second support 540 and the inner portion 730 of the flexible hinge 700 each of which is formed of a hard material, a user's touch (for example, flipping, dragging, or typing) may be stably input by making the mobile terminal device 1000 unfold.

While one or more exemplary embodiments have been described above with reference to the figures, it will be understood by those of ordinary skill in the art that various changes in form and details may be made therein without departing from the spirit and scope as defined by the following claims. Accordingly, the true technical scope of the inventive concept is defined by the appended claims.

What is claimed is:

1. A fordable device comprising:
a flexible display comprising a first part, a second part and a third part between the first part and the second part;
a first body configured to support the first part;
a second body configured to support the second part; and
a hinge configured to foldably connect the first body and the second body and to comprise a plurality of segment members which are pivotably connected to one another and support the third part;
wherein the segment member comprises an upper end portion configured to support the third part;
a lower end portion configured to be positioned to be opposite to the upper end portion; and
side portions configured to connect the upper end portion and the lower end portion and to be inclined;
wherein the hinge further comprises a plurality of connection members that pivotably connect the plurality of segment members,
wherein while the first body and the second body are folded, the upper end portion of the segment member contacts the upper end portion of the adjacent segment member to support the third part to be bent in a certain shape, and the side portion of the segment member contacts the side portion of the adjacent segment member to prevent the third part from being further bent inward, and
wherein as a rotation axis of each of the connection members is spaced apart from the lower end portion of the segment member toward the upper end of the segment member by a predetermined interval, the lower end portion of the segment member contacts the lower end portion of the adjacent segment member to prevent the third part from being further bent outward while the first body and the second body are unfolded.

2. The foldable device of claim 1, wherein the third part is bent to correspond to a shape of the upper end portion of the plurality of segment members.

3. The fordable device of claim 1, wherein each of the plurality of segment members includes the upper end portion whose width is configured to be less than a width of the lower end portion.

4. The fordable device of claim 1, wherein the hinge is slidably connected with respect to the first body and the second body.

5. The foldable device of claim 4, further comprising:
a first connection bracket and a second connection bracket configured to be coupled to opposite ends of the hinge, respectively,
wherein both the first connection bracket and the second connection bracket comprise a first rail, and
wherein the foldable device comprises a second rail configured to be arranged in the first body and in the second body and to be slidably coupled to the first rail.

6. The foldable device of claim 4, further comprising:
a flexible guide member configured to be arranged inside the hinge and to connect the first body and the second body.

7. The fordable device of claim 6, further comprising:
a sliding amount control unit configured to maintain constant a ratio between a sliding amount of the hinge and a sliding amount of the guide member.

8. The foldable device of claim 6, wherein the guide member comprises a first guide member and a second guide member which synchronize a rotation of the first body and of the second body,
wherein one end portion of the first guide member is connected to the first body, and the other end portion of the first guide member is connected to one end of the hinge adjacent to the second body, and
wherein one end portion of the second guide member is connected to the second body, and the other end portion of the second guide member is connected to the other end of the hinge adjacent to the first body.

9. The foldable device of claim 4, further comprising:
a locking unit configured to lock the hinge while the first body and the second body form at least one of unfolding degrees between a degree of an unfolded state and a degree of a folded state.

10. The foldable device of claim 1, wherein the first body comprises a first frame to which the first part is coupled and a first base cover to which the first frame is coupled, and wherein the second body comprises a second frame to which the second part is coupled and a second base cover to which the second frame is coupled.

\* \* \* \* \*